(12) United States Patent
Sekretta et al.

(10) Patent No.: US 8,591,296 B2
(45) Date of Patent: Nov. 26, 2013

(54) MOLLUSC PROCESSING APPARATUS AND RELATED METHODS

(75) Inventors: Gleb Sekretta, Halifax (CA); Ben Garvey, Halifax (CA); Timothy Andrew Burke, Halifax (CA); Bruce Allan Stover, Hatchet Lake (CA); Andrew Neville Cormack, Elmsdale (CA); Gerard Murray Prinsen, Truro (CA); Angus McLarty, Halifax (CA); Jacob MacKinnon, Mahone Bay (CA); Nathaniel Bruce Tynes, Halifax (CA); Louis-Phillipe Frederick Manuge, Hammonds Plains (CA); Tracy Rose, Middle Sackville (CA); David Rose, Upper Tantallon (CA); Lee Babin, Prospect Bay (CA)

(73) Assignee: Clearwater Seafoods Limited Partnership, Bedford, Nova Scotia ( * ) Notice: Subject to any disclaimer, the term of this patent is extended or adjusted under 35 U.S.C. 154(b) by 0 days.

(21) Appl. No.: 13/504,213

(22) PCT Filed: Oct. 27, 2010

(86) PCT No.: PCT/CA2010/001696
§ 371 (c)(1),
(2), (4) Date: Apr. 26, 2012

(87) PCT Pub. No.: WO2011/050462
PCT Pub. Date: May 5, 2011

(65) Prior Publication Data
US 2012/0214389 A1    Aug. 23, 2012

Related U.S. Application Data

(60) Provisional application No. 61/255,512, filed on Oct. 28, 2009, provisional application No. 61/265,056, filed on Nov. 30, 2009, provisional application No. 61/295,427, filed on Jan. 15, 2010, provisional application No. 61/345,297, filed on May 17, 2010.

(51) Int. Cl.
*A22C 29/02* (2006.01)

(52) U.S. Cl.
USPC ............................................ 452/15

(58) Field of Classification Search
USPC ........................................ 452/12, 13, 15, 16
See application file for complete search history.

(56) References Cited

U.S. PATENT DOCUMENTS 3,583,026 A * 6/1971 Peoni .............................. 452/16
3,722,035 A    3/1973 Hanks
(Continued)

FOREIGN PATENT DOCUMENTS

AU    752504    1/1999
CA    916610    12/1972
(Continued)

OTHER PUBLICATIONS

International Search Report and Written Opinion in PCT/CA2010/001696 dated Apr. 4, 2011.
(Continued)

*Primary Examiner* — Richard Price, Jr.
(74) *Attorney, Agent, or Firm* — Woodard Emhardt Moriarty McNett & Henry LLP

(57) ABSTRACT

Mollusc processing apparatus and related methods are disclosed. Molluscs are held in holders by one of their shells, illustratively the bottom shells, and are moved between a series of processing stations. At a shell cut station, an opening is cut into one or both of the shells of each mollusc. The next processing station includes a cutting blade to cut the adductor muscle and viscera of each mollusc away from its non-held shell, illustratively the top shell, and a shell detach mechanism to detach the non-held shell from the held shell. One or multiple air blasts are directed toward the viscera to loosen it from the held shell, and at a vacuum station the loosened viscera is pulled from the held shell. A second muscle cut station includes another cutting blade to cut the adductor muscle from the held shell.

42 Claims, 60 Drawing Sheets

(56) References Cited

U.S. PATENT DOCUMENTS

| | | | |
|---|---|---|---|
| 3,828,398 A | 8/1974 | Harris et al. | |
| 3,934,311 A | 1/1976 | Thompson | |
| 3,964,130 A | 6/1976 | Bertrand | |
| 3,975,797 A | 8/1976 | Grimes et al. | |
| 3,988,805 A | 11/1976 | Martin | |
| 3,991,466 A | 11/1976 | Smith | |
| 4,003,103 A | 1/1977 | Wenstrom et al. | |
| 4,005,504 A | 2/1977 | Lapeyre | |
| 4,030,164 A | 6/1977 | Fick | |
| 4,059,870 A | 11/1977 | Finkelman | |
| 4,069,552 A | 1/1978 | Priggs | |
| 4,073,041 A | 2/1978 | Davis et al. | |
| 4,083,084 A | 4/1978 | Davis | |
| 4,087,887 A | 5/1978 | Hoffman et al. | |
| 4,124,920 A | 11/1978 | Wenstrom et al. | |
| 4,141,114 A | 2/1979 | Carlson | |
| 4,143,444 A | 3/1979 | Cox | |
| 4,148,112 A | 4/1979 | Marvin | |
| 4,198,728 A | 4/1980 | Cohen | |
| 4,236,276 A | 12/1980 | Van Twuyver et al. | |
| 4,249,283 A | 2/1981 | Blakeslee | |
| 4,255,834 A | 3/1981 | Lambert | |
| 4,255,835 A | 3/1981 | Demulder | |
| 4,279,934 A | 7/1981 | Hutchison et al. | |
| 4,301,571 A | 11/1981 | Blakeslee | |
| 4,304,029 A | 12/1981 | Cox | |
| 4,309,793 A | 1/1982 | Martin | |
| 4,312,099 A | 1/1982 | Cohen | |
| 4,313,241 A | 2/1982 | Comparetto | |
| 4,324,020 A | 4/1982 | Garwin et al. | |
| 4,329,761 A | 5/1982 | Olsson | |
| 4,330,904 A | 5/1982 | Lambert | |
| 4,332,057 A | 6/1982 | Smith | |
| 4,348,788 A | 9/1982 | Jurcak | |
| 4,361,933 A * | 12/1982 | Rodman et al. | 452/13 |
| 4,383,348 A | 5/1983 | Comparetto | |
| 4,393,545 A | 7/1983 | O'Donnell | |
| 4,393,546 A | 7/1983 | Ruiz | |
| 4,420,492 A | 12/1983 | Taylor | |
| 4,467,501 A | 8/1984 | Guglielmo et al. | |
| 4,477,943 A | 10/1984 | Grush, Jr. | |
| 4,505,004 A | 3/1985 | Joensen | |
| 4,535,507 A | 8/1985 | Reinke | |
| 4,551,886 A | 11/1985 | Couche et al. | |
| 4,564,978 A | 1/1986 | Reinke | |
| 4,590,644 A | 5/1986 | Maniscaico | |
| 4,610,052 A | 9/1986 | Lubcke | |
| 4,633,547 A | 1/1987 | Caroon | |
| 4,663,805 A | 5/1987 | Adcock | |
| 4,674,154 A | 6/1987 | Gilbert et al. | |
| 4,675,946 A | 6/1987 | Bunge et al. | |
| 4,688,679 A | 8/1987 | Lindgren | |
| 4,691,412 A * | 9/1987 | Brown | 452/14 |
| 4,715,091 A | 12/1987 | Rome | |
| 4,718,145 A | 1/1988 | Silchenstedt | |
| 4,722,117 A | 2/1988 | McGuire | |
| 4,770,894 A | 9/1988 | Usui et al. | |
| 4,787,123 A | 11/1988 | Geddings | |
| 4,796,333 A | 1/1989 | Stinson, Jr. et al. | |
| 4,802,260 A | 2/1989 | Fletcher | |
| 4,870,719 A | 10/1989 | Harris | |
| 4,887,333 A | 12/1989 | Gallant | |
| 4,897,896 A | 2/1990 | Gallant | |
| 4,901,401 A | 2/1990 | Gallant | |
| 4,903,373 A | 2/1990 | Chouinard et al. | |
| 4,916,775 A | 4/1990 | Gallant | |
| 4,924,555 A | 5/1990 | Gifford | |
| 4,935,991 A | 6/1990 | Tourney | |
| 4,939,814 A | 7/1990 | Tillion | |
| 4,951,358 A | 8/1990 | Delplanque | |
| 4,968,523 A | 11/1990 | Usui et al. | |
| 5,059,151 A | 10/1991 | Kiczek | |
| 5,145,448 A | 9/1992 | Ebisuzaki | |
| 5,151,062 A | 9/1992 | Pontow | |
| 5,178,577 A | 1/1993 | Kirk | |
| 5,261,854 A | 11/1993 | Eiriksson | |
| 5,288,263 A | 2/1994 | Ayala | |
| 5,334,080 A | 8/1994 | Webb | |
| 5,399,117 A | 3/1995 | Telford | |
| 5,401,208 A | 3/1995 | Marvis | |
| 5,427,567 A * | 6/1995 | Adcock | 452/13 |
| 5,432,677 A | 7/1995 | Mowatt et al. | |
| 5,482,500 A | 1/1996 | Boettner et al. | |
| 5,580,303 A | 12/1996 | Winslow et al. | |
| 5,599,228 A | 2/1997 | Thibault | |
| 5,679,392 A | 10/1997 | Schegan et al. | |
| 5,773,064 A | 6/1998 | Tesvich et al. | |
| 5,779,530 A | 7/1998 | Agote | |
| 5,788,562 A | 8/1998 | Renaut et al. | |
| 5,800,256 A | 9/1998 | Bermudez | |
| 5,800,257 A | 9/1998 | Craig | |
| 5,836,266 A * | 11/1998 | Watanabe | 119/234 |
| 5,947,808 A | 9/1999 | Adams | |
| 5,976,601 A | 11/1999 | Tesvich et al. | |
| 5,989,117 A | 11/1999 | Lin | |
| 6,010,397 A | 1/2000 | Adams et al. | |
| 6,086,468 A | 7/2000 | Yoshida et al. | |
| 6,099,399 A | 8/2000 | Hearn et al. | |
| 6,110,032 A | 8/2000 | Earnshaw | |
| 6,129,622 A | 10/2000 | Seaman et al. | |
| 6,132,303 A | 10/2000 | Buckhaven | |
| 6,190,247 B1 | 2/2001 | Reimer et al. | |
| 6,193,596 B1 | 2/2001 | Adcock | |
| 6,217,435 B1 | 4/2001 | Voisin | |
| 6,238,716 B1 | 5/2001 | Prins | |
| 6,244,948 B1 | 6/2001 | LiRosi | |
| 6,274,188 B1 | 8/2001 | Ledet et al. | |
| 6,390,911 B1 | 5/2002 | Lombardo | |
| 6,393,977 B1 | 5/2002 | Voisin | |
| 6,398,635 B1 | 6/2002 | DeNezzo | |
| 6,426,103 B2 | 7/2002 | Voisin | |
| 6,468,142 B1 | 10/2002 | Deyerle et al. | |
| 6,537,601 B1 | 3/2003 | Voisin | |
| 6,736,716 B1 | 5/2004 | Sugiyama | |
| 6,776,700 B2 | 8/2004 | Davy | |
| 7,582,005 B1 | 9/2009 | Le | |
| 7,748,313 B2 | 7/2010 | Tyndall | |
| 2001/0041212 A1 | 11/2001 | Tafu et al. | |
| 2002/0009534 A1 | 1/2002 | Voisin | |
| 2002/0019207 A1 | 2/2002 | Maille | |
| 2003/0013400 A1 | 1/2003 | Auguin | |
| 2003/0134585 A1 | 7/2003 | Maloni | |
| 2003/0224709 A1 | 12/2003 | Davy | |
| 2004/0194718 A1 | 10/2004 | McRae | |
| 2004/0219871 A1 | 11/2004 | Hansen | |
| 2005/0282481 A1 | 12/2005 | Banke | |
| 2006/0029922 A1 | 2/2006 | Van Eelen et al. | |
| 2006/0105689 A1 | 5/2006 | Lopez et al. | |
| 2006/0205332 A1 | 9/2006 | Raghubeer et al. | |
| 2007/0042694 A1 | 2/2007 | Enriquez et al. | |
| 2007/0042695 A1 | 2/2007 | Chong et al. | |
| 2007/0049187 A1 | 3/2007 | Le | |
| 2007/0077877 A1 | 4/2007 | Cross | |
| 2007/0128293 A1 | 6/2007 | Lopez et al. | |
| 2007/0224926 A1 | 9/2007 | Adcock | |
| 2007/0254569 A1 | 11/2007 | Jabbour et al. | |
| 2009/0208622 A1 | 8/2009 | Voisin | |

FOREIGN PATENT DOCUMENTS

| | | |
|---|---|---|
| CA | 967314 | 5/1975 |
| CA | 988362 | 5/1976 |
| CA | 1034722 | 7/1978 |
| CA | 1104771 | 7/1978 |
| CA | 1064657 | 10/1979 |
| CA | 1094872 | 2/1981 |
| CA | 1101620 | 5/1981 |
| CA | 1102058 | 6/1981 |
| CA | 1122765 | 5/1982 |
| CA | 1127810 | 7/1982 |
| CA | 1138609 | 1/1983 |
| CA | 1139062 | 1/1983 |
| CA | 1139063 | 1/1983 |
| CA | 141113 | 2/1983 |

(56) References Cited

FOREIGN PATENT DOCUMENTS

| | | |
|---|---|---|
| CA | 1150456 | 7/1983 |
| CA | 1164166 | 3/1984 |
| CA | 1188466 | 6/1985 |
| CA | 1195065 | 10/1985 |
| CA | 1201562 | 3/1986 |
| CA | 1205963 | 6/1986 |
| CA | 1211604 | 9/1986 |
| CA | 1219711 | 3/1987 |
| CA | 1226111 | 9/1987 |
| CA | 1234259 | 3/1988 |
| CA | 1269564 | 5/1990 |
| CA | 2003007 | 5/1990 |
| CA | 2003020 | 5/1990 |
| CA | 2012612 | 1/1991 |
| CA | 1282917 | 4/1991 |
| CA | 2024002 | 4/1991 |
| CA | 2015487 | 5/1991 |
| CA | 2015863 | 5/1991 |
| CA | 4016144 | 1/1992 |
| CA | 1297245 | 3/1992 |
| CA | 2025761 | 3/1992 |
| CA | 2025762 | 3/1992 |
| CA | 1300422 | 5/1992 |
| CA | 2111227 | 12/1992 |
| CA | 2084168 | 6/1993 |
| CA | 1314758 | 9/1993 |
| CA | 2086376 | 12/1993 |
| CA | 2016061 | 10/1996 |
| CA | 2181762 | 1/1997 |
| CA | 2201803 | 5/1997 |
| CA | 2193746 | 6/1997 |
| CA | 2252220 | 10/1997 |
| CA | 2211055 | 2/1998 |
| CA | 2192251 | 6/1998 |
| CA | 1239004 | 7/1998 |
| CA | 2284644 | 10/1998 |
| CA | 2291827 | 12/1998 |
| CA | 2264184 | 9/1999 |
| CA | 2418248 | 11/1999 |
| CA | 2240079 | 1/2000 |
| CA | 238499 | 2/2000 |
| CA | 2245414 | 2/2000 |
| CA | 2310912 | 12/2000 |
| CA | 2345144 | 2/2001 |
| CA | 2377033 | 2/2001 |
| CA | 2383726 | 3/2001 |
| CA | 2111227 C | 8/2002 |
| CA | 2434925 | 2/2004 |
| CA | 2430635 | 12/2004 |
| CA | 2548237 | 6/2005 |
| CA | 2464708 | 10/2005 |
| CA | 2566615 | 12/2005 |
| CA | 2474120 | 1/2006 |
| FR | 2546722 | 12/1984 |
| GB | 976767 | 12/1964 |
| JP | 5428876 | 3/1979 |
| JP | 4207149 | 7/1992 |
| JP | 5176672 | 7/1993 |
| JP | 5308894 | 11/1993 |
| JP | 7274813 | 10/1995 |
| JP | 8009879 | 1/1996 |
| JP | 8322459 | 12/1996 |
| JP | 9275889 | 10/1997 |
| JP | 9308433 | 12/1997 |
| JP | 11127771 | 5/1999 |
| JP | 1151063 | 6/1999 |
| JP | 11206312 A | 8/1999 |
| JP | 2000125758 | 5/2000 |
| JP | 2000270762 | 10/2000 |
| JP | 2002125583 | 5/2002 |
| JP | 2004016019 | 12/2004 |
| JP | 2006104438 | 5/2008 |
| WO | 94/00022 | 1/1994 |
| WO | 99/53771 | 10/1999 |

OTHER PUBLICATIONS

D. E. Martin & S.G. Hall, "Oyster shucking technologies: past and present", International Journal of Food Science and Technology, 2006, 41, pp. 223-232.

F. Wheaton & S. Hall, "Research needs for automated oyster shucking", Aquacultural Engineering 37 (2007) 67-72.

F. Wheaton, "Oyster shell-meat sensor", Aquacultural Engineering 38 (2008) 127-134.

F. Wheaton, "Review of oyster shell properties, Part II. Thermal properties", Aquacultural Engineering 37 (2007) 14-23.

F. Wheaton, "Review of the properties of Eastern oysters, Crassostrea virginica Part I. Physical properties", Aquacultural Engineering 37 (2007) 3-13.

Machine Specifications and Photographs of Machine Used in Scallop Schucking Experiments on Jan. 20, 2009.

R. Hardy & J.G.M. Smith, "Catching and Processing Scallops and Queens", Ministry of Agriculture, Fisheries and Food; http://ww.fao.org/wairdocs/tan/x5923E/x5923e00.htm, 2001, 10 pages.

F.W. Wheaton, Completion Report, Project No. 3-152-D, May 1, 1971 to Jun. 30, 1973, MP 862, Agricultural Experiment Station, Univ. of Maryland, 56 pages.

* cited by examiner

MOLLUSC PROCESSING APPARATUS AND RELATED METHODS

CROSS-REFERENCE TO RELATED APPLICATIONS

This application is a National Stage of International Application No. PCT/CA2010/001696 filed Oct. 27, 2010, which claims the benefit of U.S. Provisional Application No. 61/255,512 filed Oct. 28, 2009, U.S. Provisional Application No. 61/265,056 filed Nov. 30, 2009, U.S. Provisional Application No. 61/295,427 filed Jan. 15, 2010, U.S. Provisional Application No. 61/345,297 filed May 17, 2010. The entire contents and disclosures of these related applications are hereby incorporated herein by reference.

FIELD OF THE INVENTION

This invention relates generally to seafood processing and, in particular, to processing scallops.

BACKGROUND

Removal of the adductor muscle from scallops, also referred to as "shucking", has typically been a manual process. A knife blade is inserted through an opening near the hinge between the two shells of a scallop and used to cut the adductor muscle from the top shell. The top shell and viscera are then pulled away from the bottom shell and discarded, and the adductor muscle is cut from the bottom shell in a second cut.

This type of manual shucking process can be quite physically demanding, and hand and wrist problems and repetitive strain injuries are common. In addition, manual shucking speed is limited to physical capability of a human worker and is often the bottleneck in a factory setting. Product quality consistency can also be an issue. Edible product yields can thus vary from person to person, both in the number of scallops processed and the amount of the adductor muscle that remains attached to the shells after shucking and therefore is wasted.

SUMMARY

According to an aspect of the invention, there is provided an apparatus that includes: a holder to hold a bivalve mollusc by a first shell, the mollusc having a pair of shells, including the first shell and a second shell, and an adductor muscle attached to the shells; a cutting blade, movable from a first position out of contact with the mollusc to a second position in which at least a portion of the cutting blade is between the shells, to cut the adductor muscle from the second shell; a shell detach mechanism to detach the second shell from the first shell; and a controller to control movement of the cutting blade and operation of the shell detach mechanism, the controller causing the cutting blade to remain in its second position, protecting the adductor muscle that has been cut from the second shell against damage by the shell detach mechanism.

The shell detach mechanism could include a striking element, movable from a first position out of contact with the mollusc to a second position, to strike an outside surface of the second shell and detach the second shell from the first shell. Where the shells are further connected at a hinge, the striking element could strike the second shell in an oblique direction relative to a longitudinal axis of the hinge as the striking element is moved from its first position to its second position. In some embodiments, the striking element contacts a surface of the cutting blade as the striking element is moved from its first position to its second position.

In another embodiment, the shell detach mechanism includes a water nozzle located relative to the cutting blade to direct a water stream toward the second shell. The cutting blade could remain in its second position during contact between the water stream and the second shell. The shell detach mechanism might also include a further water nozzle located relative to the cutting blade and the water nozzle to direct a further water stream toward an expected position of the second shell if not detached from the first shell by the water stream.

The holder includes a suction grip to hold the first shell in some embodiments. The apparatus might then include a venturi arrangement coupled to the suction grip.

In some embodiments, the cutting blade is a flexible cutting blade.

The portion of the cutting blade that is between the shells in the second position might contact and follow an inside surface of the second shell as the cutting blade is moved from its first position to its second position. In some embodiments, the portion of the cutting blade is inserted, through an opening cut into one or both of the shells, into contact with the inside surface of the second shell as the cutting blade is moved from its first position to its second position.

The cutting blade has a flared edge in some embodiments.

The holder could be movable from a first position, in which the mollusc is located relative to the cutting blade and the shell detach mechanism to have the adductor muscle cut from the second shell by the cutting blade and the second shell detached from the first shell by the shell detach mechanism, to a second position away from the cutting blade and the shell detach mechanism, after the cutting blade is returned to its first position. In this case, the controller could include a metal plate and a proximity sensor, the metal plate and the sensor being located relative to the holder such that the sensor is actuated when the holder is in its first position.

In another aspect, the invention provides an apparatus that includes: a holder to hold a bivalve mollusc from which one shell has been removed, the mollusc having a remaining shell to be held by the holder and an adductor muscle and viscera attached to the remaining shell; an air outlet located relative to the holder to direct an air stream toward the viscera; an air supply, coupled to the air outlet, to supply a blast of air toward the viscera through the outlet; and a vacuum intake to pull the viscera from the remaining shell, the vacuum intake being located relative to the holder to pull the viscera from the remaining shell initially in a first direction and subsequently in a second different direction. The holder holds the mollusc in an inverted position above the vacuum intake.

The holder includes a suction grip to hold the remaining shell, in some embodiments. The apparatus could then include a venturi arrangement coupled to the suction grip. Where the apparatus includes a source of pressurized air, the venturi arrangement and the air supply could be coupled to the source.

In some embodiments, the air outlet is located relative to the holder to direct the air stream toward the viscera by directing the air stream onto an inside surface of the remaining shell.

The holder could be movable from a first position, in which the mollusc is located proximate the air outlet, to a second position away from the air outlet and toward the vacuum intake, after the air blast. The apparatus might then include a controller to control the air supply, the controller including a metal plate and a proximity sensor, the metal plate and the sensor being located relative to the holder such that the sensor is actuated when the holder is in its first position.

The apparatus might also include a vacuum tube coupled to a vacuum source, the vacuum intake being formed as an opening in a side wall of the vacuum tube, the first direction being through the opening, the second direction being along a longitudinal direction of the vacuum tube. A position of the vacuum intake relative to the holder is adjustable in some embodiments.

A standpipe could be coupled to the vacuum intake to receive the viscera that is pulled from the remaining shell. In some embodiments, a fluid line is coupled to the standpipe to receive the viscera from the standpipe into a fluid flow in the fluid line.

According to a further aspect of the invention, an apparatus includes: a plurality of holders to hold bivalve molluscs by a first shell, each mollusc when fed onto a holder having a pair of shells, including the first shell and a second shell, and an adductor muscle attached to the shells; and a driving arrangement to move the plurality of holders between processing stations for processing the molluscs. The processing stations include a shell cut station to cut an opening into one or both of the shells; a first muscle cut and shell detach station, an air blast station and a vacuum station including apparatus as described above; and a second muscle cut station to cut the adductor muscle from the first shell.

Such an apparatus could also include a second air blast station between the first muscle cut and shell detach station and the vacuum station.

The apparatus might also include a control arrangement to control at least the first muscle cut and shell detach station, the air blast station, and the second muscle cut station. In some embodiments, the control arrangement includes a plurality of metal plates located relative to the holders and a plurality of proximity sensors located relative to each of the first muscle cut and shell detach station, the air blast station, and the second muscle cut station such that the sensors are actuated when the holders are in respective positions for processing of molluscs by the first muscle cut and shell detach station, the air blast station, and the second muscle cut station.

In some embodiments, the holders and the processing stations are located relative to each other such that the holders hold molluscs in respective positions for substantially simultaneous processing by the processing stations. The control arrangement could then include a plurality of metal plates and a proximity sensor, with the plurality of metal plates being located relative to the holders and to the sensor such that a respective one of the plates actuates the sensor when the holders and molluscs are in the respective positions for substantially simultaneous processing by the processing stations.

The apparatus might also include a detector at the second muscle cut station to detect presence of a mollusc.

Where each holder of the plurality of holders includes a suction grip to hold the first shell and a venturi arrangement coupled to the suction grip, the apparatus could also include a shell release station to alter air flow in the venturi arrangement and release the first shell from each suction grip after the adductor muscle is cut from the first shell.

A source of compressed air could be coupled to the venturi arrangement of each holder and to at least one of the air blast station and the vacuum station.

A vacuum source could instead be coupled to the vacuum station and/or to at least one of the air blast station and the venturi arrangement of each holder.

A method according to another aspect of the invention involves: feeding bivalve molluscs onto a plurality of holders that hold the molluscs by a first shell, each mollusc when fed onto a holder having a pair of shells, including the first shell and a second shell, and an adductor muscle attached to the shells; moving the plurality of holders between processing stations; and processing the molluscs at the processing stations. The processing stations include: a shell cut station to cut an opening into one or both of the shells; a first muscle cut and shell detach station, an air blast station and a vacuum station including the apparatus described above; and a second muscle cut station to cut the adductor muscle from the first shell.

Another method involves: providing a plurality of holders to hold bivalve molluscs by a first shell, each mollusc when fed onto a holder having a pair of shells, including the first shell and a second shell, and an adductor muscle attached to the shells; providing processing stations for processing the molluscs; and providing a driving arrangement to move the plurality of holders between the processing stations. The processing stations include: a shell cut station to cut an opening into one or both of the shells; a first muscle cut and shell detach station, an air blast station and a vacuum station including the apparatus described above; and a second muscle cut station to cut the adductor muscle from the first shell.

Such a method could also involve providing a second air blast station between the first muscle cut and shell detach station and the vacuum station.

In some embodiments, the method involves providing a control arrangement to control at least the first muscle cut and shell detach station, the air blast station, and the second muscle cut station.

The method could also involve providing a detector at the second muscle cut station to detect presence of a mollusc.

Each holder of the plurality of holders could include a suction grip to hold the first shell and a venturi arrangement coupled to the suction grip, in which case the method could involve providing a shell release station to alter air flow in the venturi arrangement and release the first shell from each suction grip after the adductor muscle is cut from the first shell. The method could then also involve coupling the venturi arrangement of each holder and at least one of the air blast station and the vacuum station to a source of compressed air.

The method further includes coupling the vacuum station and at least one of the air blast station and the venturi arrangement of each holder to a vacuum source in some embodiments.

Other aspects and features of embodiments of the present invention will become apparent to those ordinarily skilled in the art upon review of the following description.

BRIEF DESCRIPTION OF THE DRAWINGS

Examples of embodiments of the invention will now be described in greater detail with reference to the accompanying drawings.

DETAILED DESCRIPTION

Figure 27:
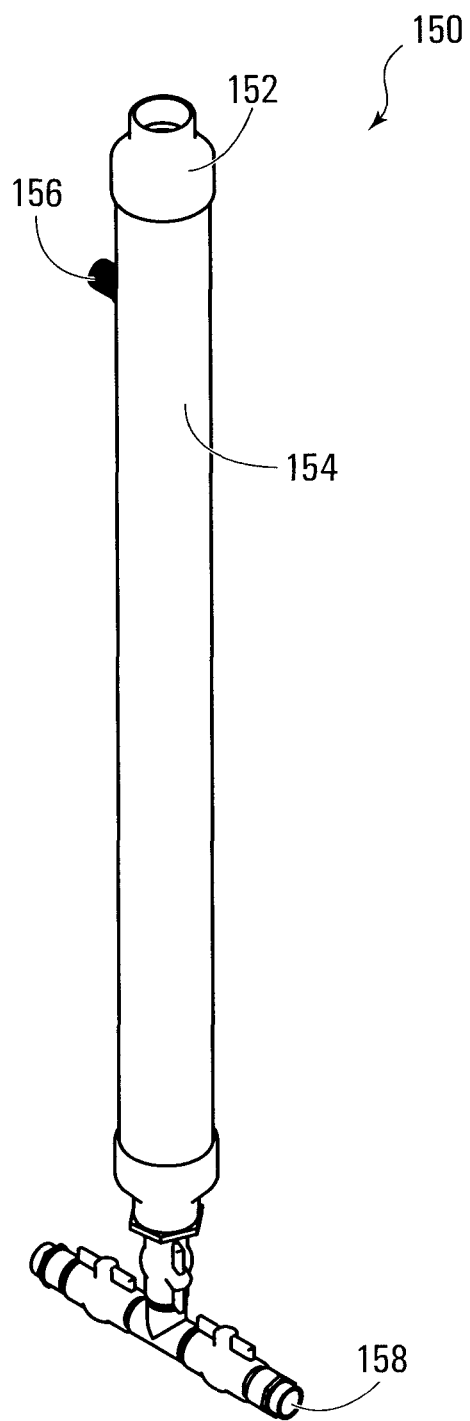
FIGS. 27 and 28 show a processing waste handling arrangement.
Figure 28:
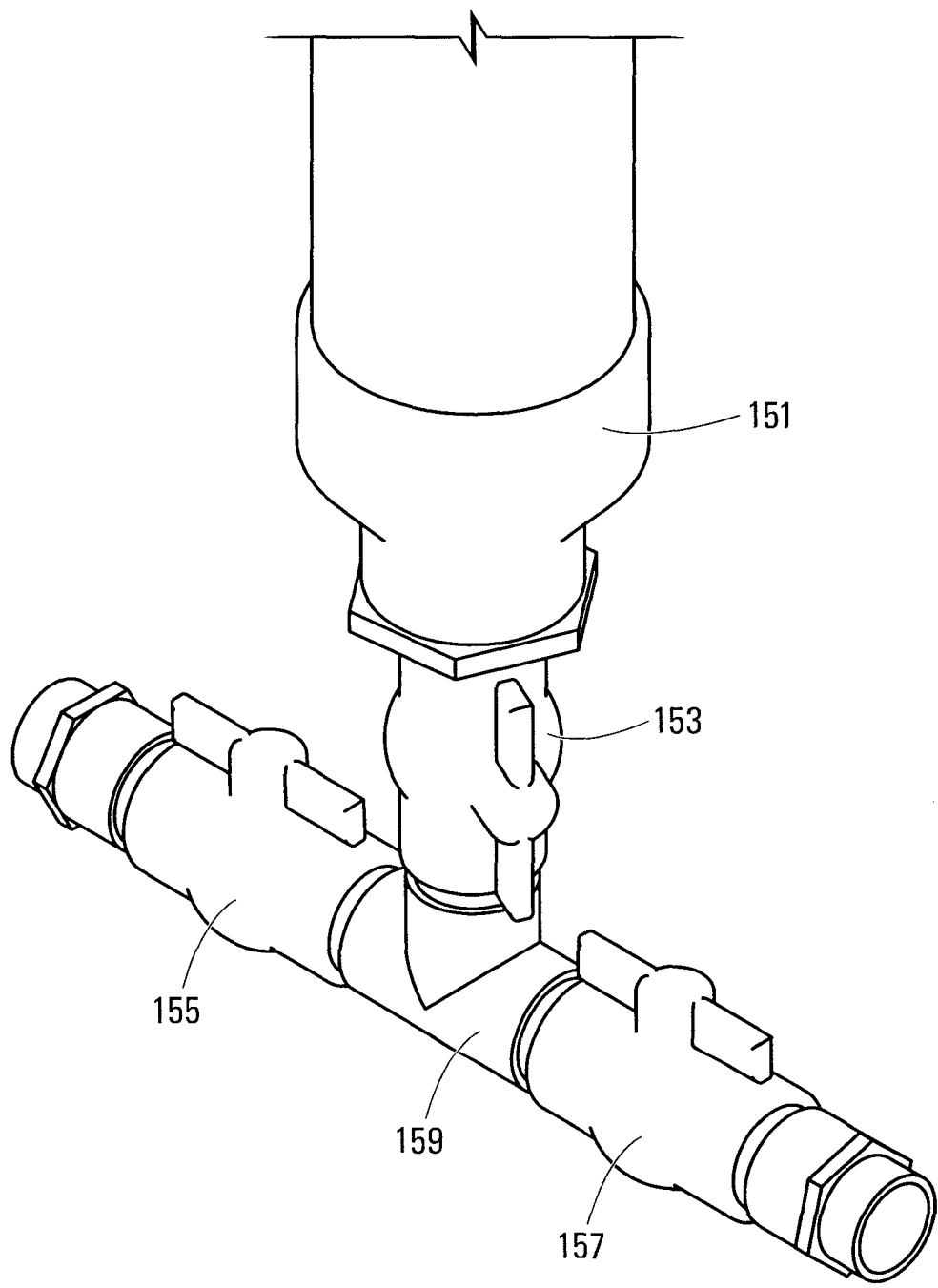
Figure 29:
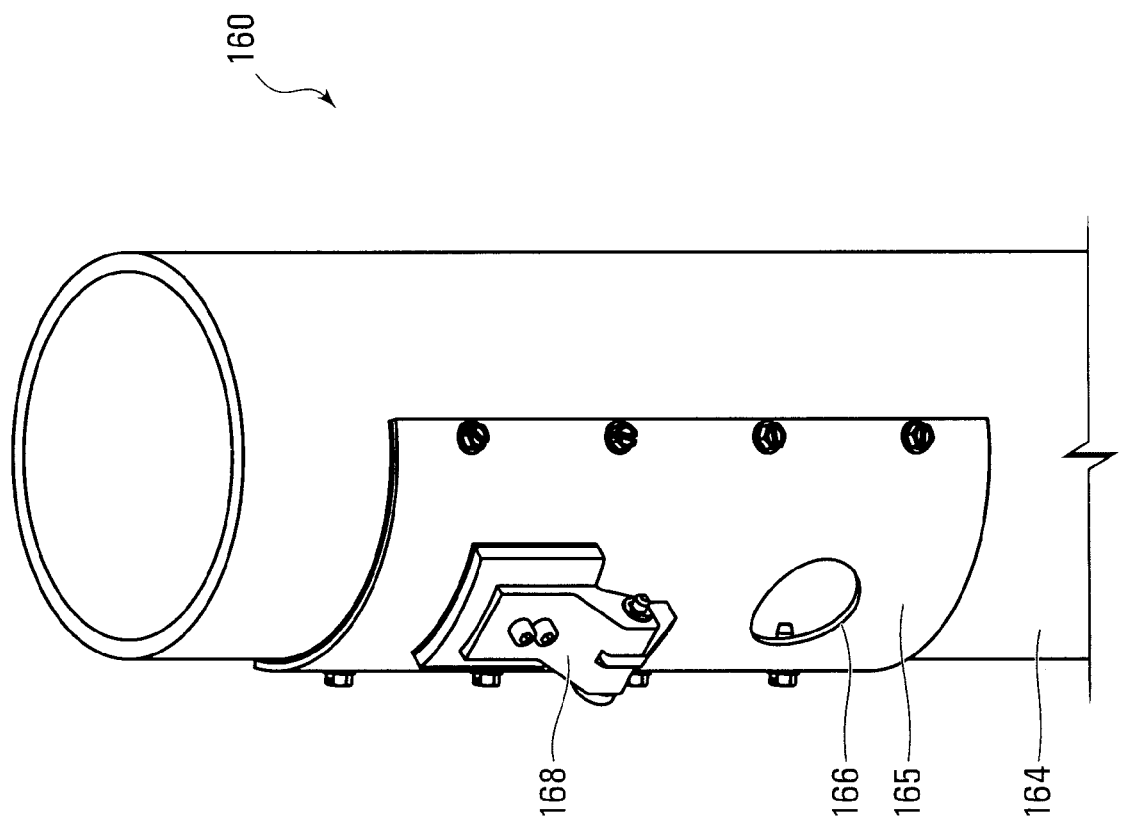
FIGS. 29 to 32 show an example of a float valve.
Figure 30:
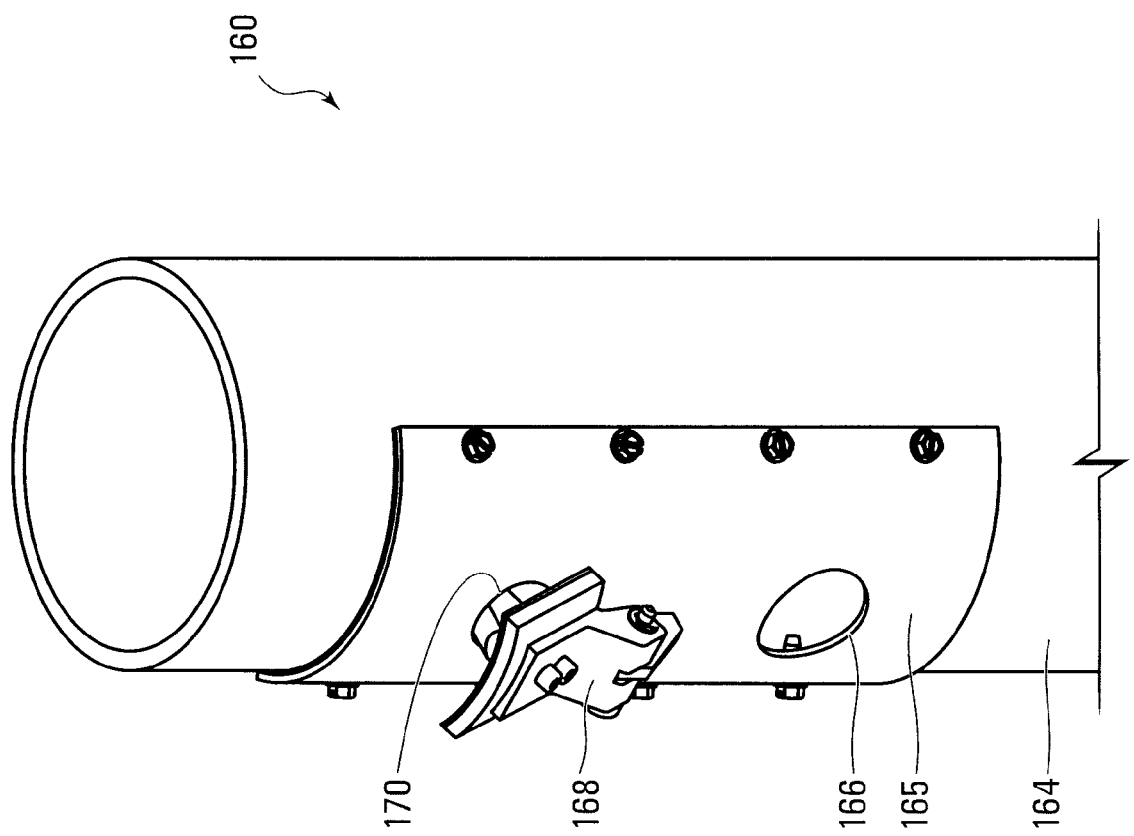

FIGS. 1 to 25 illustrate an example scallop processing machine and various components thereof, FIGS. 27 and 28 show an example waste handling arrangement which could be equipped with a float valve as shown in FIGS. 29 to 32, and FIG. 33 shows an example of a related method. It should be appreciated, however, that the contents of the drawings are intended solely for illustrative purposes, and that the present invention is in no way limited to the particular example embodiments explicitly shown in the drawings and described herein. A machine may include additional, fewer, and/or different components which are arranged in a similar or different manner than shown, and a method may likewise involve performing additional, fewer, or different operations in a similar or different order.

With reference to FIGS. 1 to 6, these drawings respectively show front, rear, top, bottom, and right and left side views of an example scallop processing machine 10. The example machine 10 includes a holder arrangement 12 and processing stations. The processing stations in the example shown include a shell cut station 14, a first muscle cut and shell detach station 16, two air blast stations 18, 20, a vacuum station 22, and a second muscle cut station 24. The holder arrangement 12, the processing stations 14, 16, 18, 20, 22, 24, and various shields and guides are supported on a frame 30.

In operation, scallops are fed onto holders in the holder arrangement 12. The holders hold scallops by a first shell, illustratively the bottom shell. A suction grip, for example, might hold the bottom shell more effectively since the bottom shell typically has virtually no foreign matter such as seaweed, barnacles, etc., which allows the suction grip to establish a better seal against the shell and thus a stronger holding force. When the scallops are fed onto the holders, each scallop has a pair of shells, including the first (illustratively the top) shell which is held by a holder and a second (illustratively the bottom) shell, and an adductor muscle and viscera attached to the shells. A driving arrangement moves the holder arrangement 12, and thus its holders and the scallops in those holders, between the processing stations. The direction of rotation in the example machine 10 is clockwise from the perspective of the front view shown in FIG. 1.

The holder arrangement 12 and each processing station 14, 16, 18, 20, 22, 24 are described in further detail below, with reference to other drawings.

Figure 7:
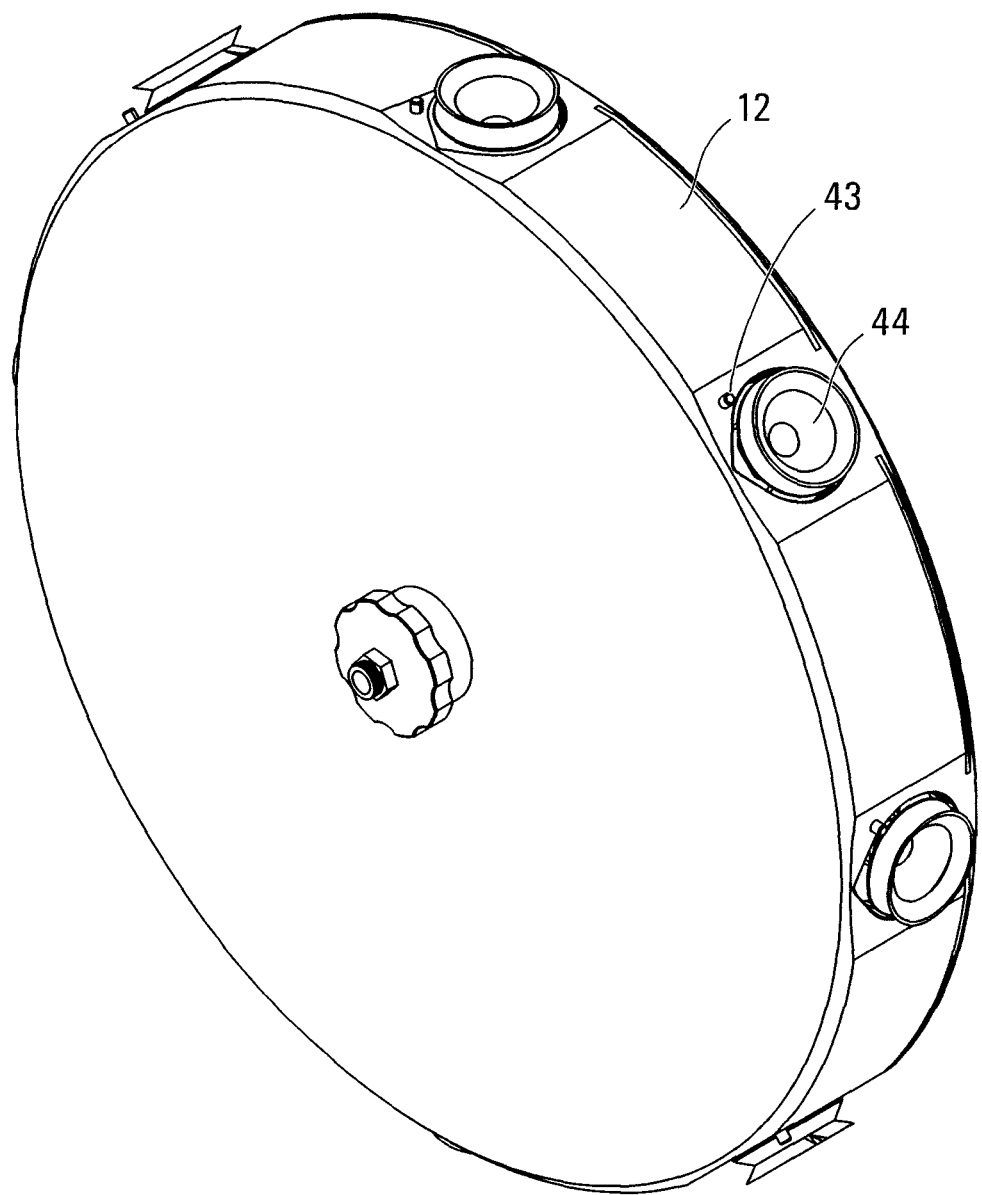
FIGS. 7 to 9 are views of a holder arrangement.
Figure 8:
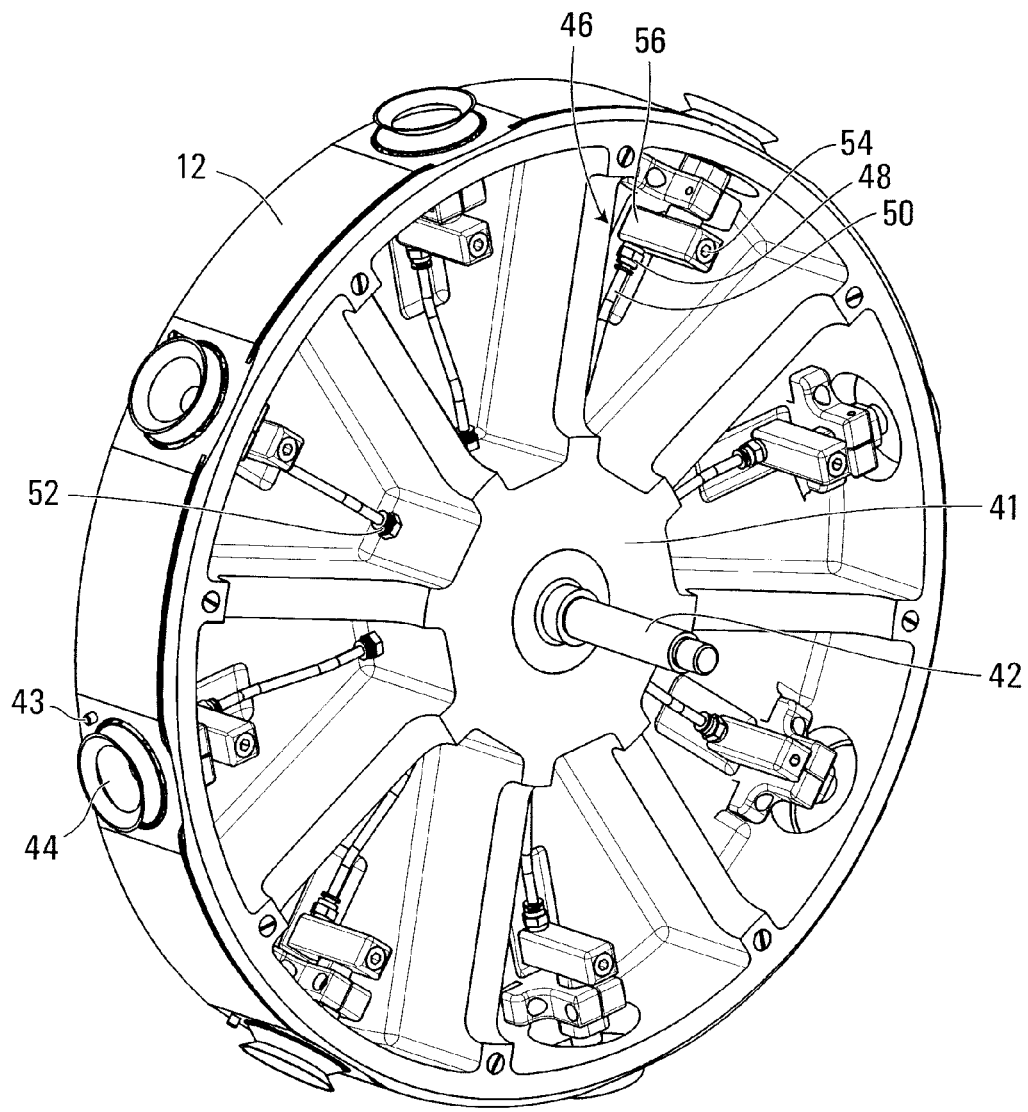

FIGS. 7 and 8 are front and rear views of the example holder arrangement 12. The holder arrangement 12 is rotated about an axle or spindle 42 by a driving arrangement, and carries multiple holders 44, in the form of suction grips in the example shown, and indexing pins 43. The indexing pins 43 facilitate proper placement of scallops on the holders 44 and also provide a stop to prevent rotation of the scallops in the holders during processing as described below.

As shown more clearly in FIG. 8, each suction grip 44 in the example holder arrangement 12 includes a venturi arrangement 46 which in turn includes couplings 48, 52, and an air tube 50 through which a housing 56 which houses a venturi nozzle is coupled to an air source or a vacuum source. Although separate air or vacuum sources could potentially be provided for the suction grips 44, all of the venturi arrangements 46 could potentially be supplied with compressed air from one air source such as a single compressor or could be ultimately coupled to the same vacuum source. In one embodiment, all of the venturi arrangements 46 are coupled to the air or vacuum source through a central cavity in the holder arrangement 12 and a bore in the axle or spindle 42.

In one possible implementation, there is a single, moderate pressure (~60 psi) air feed to the driven spindle 42, connected using a standard, swivel air connector. The hollow spindle 42 has a cross-bore hole inside the area of the hub 41 to allow the pressure to be released into the hollow hub. The hub 41 is sealed with dual, standard O-ring seals on the spindle 42. The hub 41 is thus an air feed chamber supplying the venturi arrangements 46. In this way, air pressure to each venturi arrangement 46 is substantially continuous, and also independent in the sense that roughly the same air flow is provided to the venturi arrangements 46 regardless of whether one or more or all of the holders 44 are blocked by a shell of a scallop. A key operational result is that a vacuum or suction force is generated at the point of use, right at each holder 44, and not before it.

In this example implementation, only pressurized air is fed to the holder arrangement 12 through the spindle 42 as a working fluid. This type of "flow design" anticipates some leakage between shells and the holders 44, and can also operate even when one or more of the holders are not holding shells.

The reference number 54 designates an inlet or outlet of the venturi arrangement 46. If the venturi arrangement 46 is coupled to a vacuum source, then the opening 54 acts as an inlet, and if the venturi arrangement is coupled to a compressed air source, then the opening 54 acts as an outlet. In some embodiments, the venturi nozzles in the housings 56 are directional, and in this case the venturi nozzles would be oriented in opposite directions for vacuum source and compressed air source implementations. In either case, an air flow between the opening 54 and the coupling 48 creates a suction force at the suction grip 44, which is coupled to the air flow path in a direction that is substantially perpendicular to the air flow in the example shown. The opening 54 provides a control point through which air flow in the venturi arrangement 46 can be altered. Blocking the opening 54 or injecting an air blast into the opening when it acts as an outlet, or applying a vacuum force to the opening when it acts as an inlet, for example, reduces the rate of air flow through the venturi arrangement 46 and thus reduces the suction force on a scallop shell that is held by a holder 44. This type of air flow control provides a mechanism to release shells once processing is complete.

While some processing stations of the example processing machine 10 might run continuously, one or more controllers could be provided for other processing stations. For example, the shell cut station 14 and the vacuum station 22 could be run continuously in order to avoid cycle time delays as a cutting mechanism of the shell cut station and a vacuum source to which the vacuum station is coupled come up to speed. In some embodiments, at least the first muscle cut and shell detach station 16, the air blast stations 18, 20, and the second muscle cut station 24 are operated intermittently, when a scallop is properly positioned at each station.

In the context of continuous or intermittent operation, the whole process could also be done with the holder arrangement 12 rotating continuously or intermittently as well. However, continuous rotation of the holder arrangement 12 might provide for higher throughput of scallops, reduced overall machine complexity as a result of using a continuous drive motor rather than an intermittently operated drive which uses mechanical or electrical indexers for instance, and reduced wear and tear by avoiding start-stop accelerations and impacts associated with an intermittent drive.

Several possible controller arrangements involve magnets and one or more magnetically actuated switches, or proximity sensors and metal plates, for example. Magnets, illustratively permanent magnets, could be attached to the holder arrangement 12 at locations relative to the holders 44 to interact with magnetically actuated switches located relative to each of the first muscle cut and shell detach station 16, the air blast stations 18, 20, and the second muscle cut station 24 such that the magnets actuate the switches when the holders are in respective positions for processing of scallops by the controlled stations. In this way, when a scallop is in position for processing by a controlled station, a switch at that station is actuated by a magnet on the holder arrangement 12. The switches could be mounted to the frame 30 (FIG. 1) or to components at a controlled station. It should be appreciated that any of the switches could instead be mounted to the holder arrangement 12, and that any of the magnets could be mounted to the frame 30 or other components.

Another possible option which might be appropriate where the holders 44 and at least the controlled processing stations 16, 18, 20, 24 are located relative to each other such that the holders hold scallops in respective positions for substantially simultaneous processing by those processing stations, would be to have multiple magnets but only one magnetically actuated switch to actuate processing operations at all of the controlled stations. With equal spacing between the holders 44 and the controlled processing stations 16, 18, 20, 24, for example, whenever one holder and its scallop are in position for processing by one of the controlled processing station, three other holders are also holding scallops in position for processing by the other three controlled processing stations. In this type of setup, all four controlled processing stations can be actuated at the same time, and therefore a single switch could be used.

More generally, a single switch or multiple switches or sensors (such as proximity sensors) could be provided and actuated at the appropriate time(s) by magnets or plates on the holder arrangement 12.

With reference again to FIG. 1, the holder arrangement 12 is rotated to move scallops between the processing stations 14, 16, 18, 20, 22, 24. In the example processing machine 10 and the view shown in FIG. 1, the direction of rotation is clockwise, and scallops are fed onto the holders, with their bottom shells on the holders, as the holders pass through roughly the twelve o'clock or top center position. Manual feeding is used in one embodiment, and the indexing pins 43 (FIGS. 7 and 8) aid in properly placing the scallops onto the holders.

Figure 9:
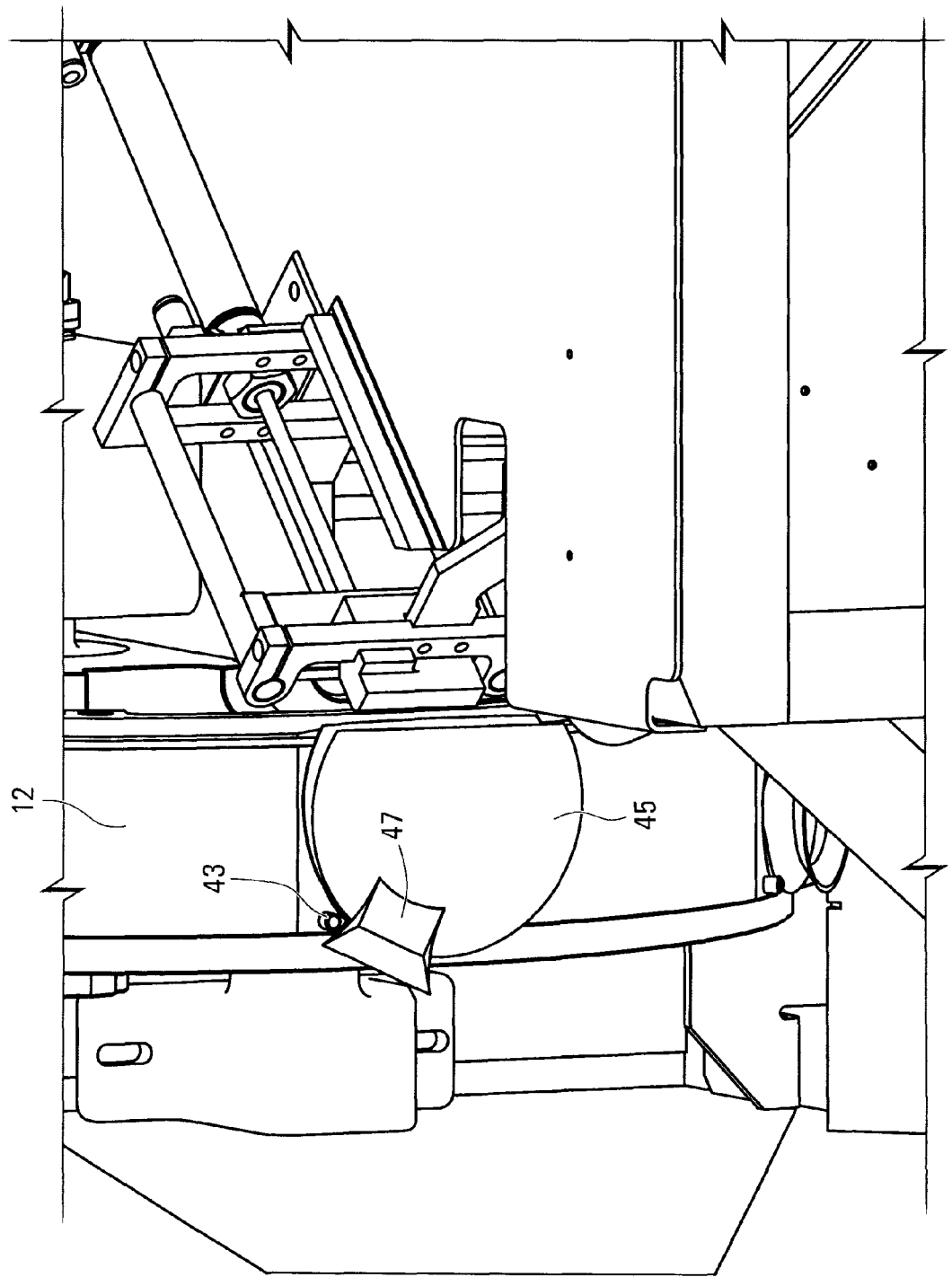

In one embodiment, a scallop is loaded such that the pin 43 is in a corner between the hinge and shell curvature profile. This pin locating feature is shown more clearly in FIG. 9. The location and nature of this notch on this side of the hinge can be an indicator of the position of the adductor muscle inside the shells 45. Using the pins 43 as located on the holder arrangement 12 allows other components to be positioned relative to the holders 44 and thus the loaded scallops to effectively cut and eviscerate without damaging the adductor muscle. FIG. 9 also illustrates that the path of travel of the cutting blade at the first muscle cut and shell detach station need not necessarily be directly opposite to the hinge 47. This feature could be useful in processing species in which the adductor muscle is not located symmetrically within the shells.

Automated feeding is also contemplated, and could similarly use the pins 43 as an aid in properly loading scallops for processing.

Figure 10:
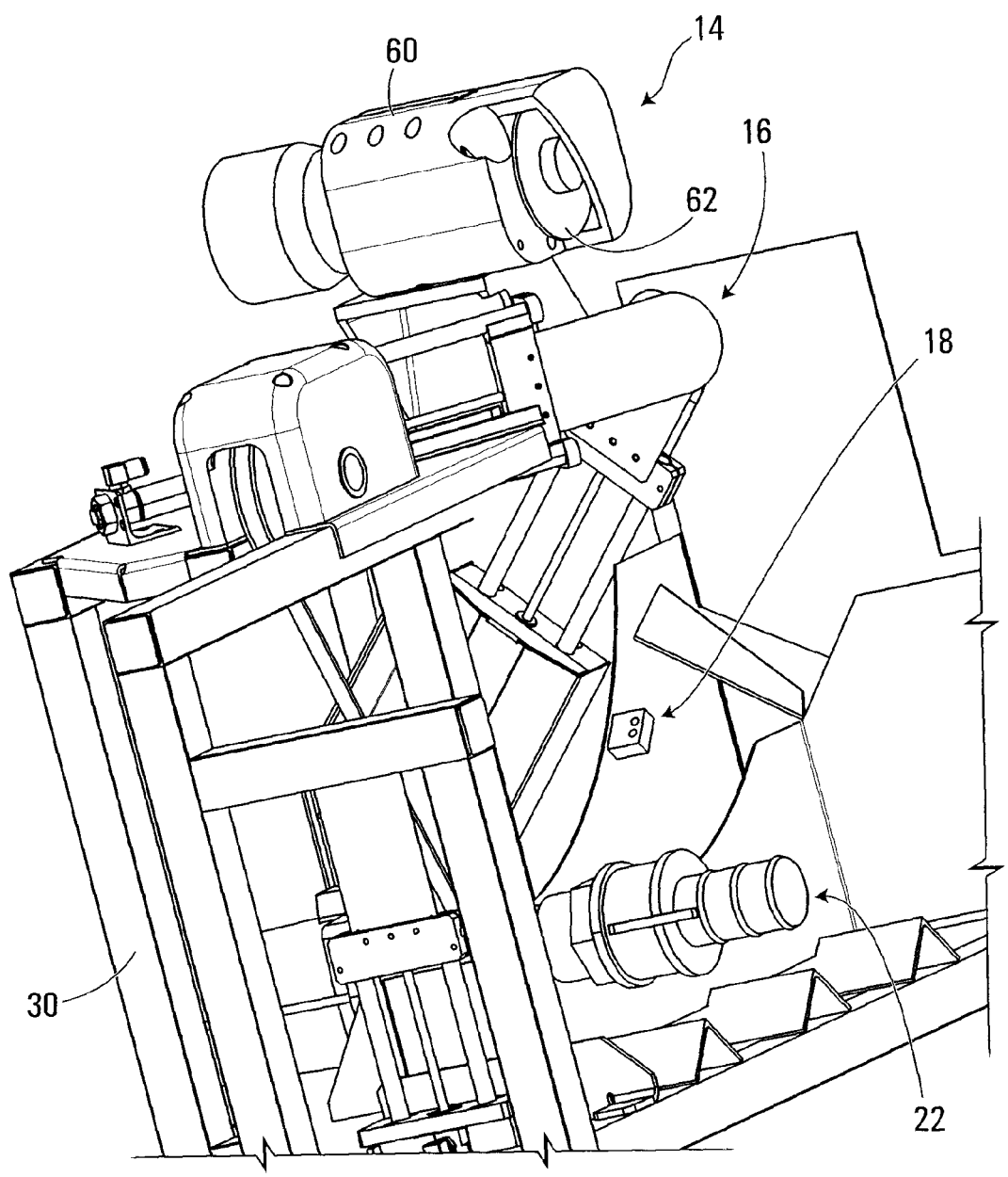
FIG. 10 is a view of a shell cut station.

The first processing station through which scallops are moved is the shell cut station 14. A view of this station is shown in FIG. 10. In order to improve visibility, the holder arrangement 12 is not shown in FIG. 10. This also provides a better view of the first muscle cut and shell detach station 16, the first air blast station 18, and the vacuum station 22.

At the shell cut station 14, a blade 62 is mounted on a spindle which is coupled to a motor 60. The blade 62 is spun by the motor and cuts an opening into each scallop as it passes the shell cut station 14. Abrasive cutting blades and toothed cutting blades are examples of blade types that could be used as the blade 62. A toothed blade is generally able to cut faster than an abrasive blade, and therefore might be used to maximize the rate of processing. In one embodiment, the blade 62 is spun such that its teeth impact the top shell and pass through the bottom shell of a scallop. This not only cuts the shells, but also pushes the scallop onto the suction grip 44 instead of tending to pull it off the suction grip.

The blade 62 might cut the opening partially or entirely through the top shell, and possibly partially or entirely through the bottom shell as well. Although in some embodiments a full cut through both the top and bottom shells is made, a partial cut could be feasible provided such a cut is large enough for the cutting blade at the first muscle cut and shell detach station 16 to pass through the opening and retract without being impeded by uncut portions of the shells.

The opening could be cut substantially perpendicular to a seam between the scallop shells or at an angle to the seam. A substantially perpendicular cut would involve cutting less shell material than an angular cut at the same location on the shell. However, an angular cut could result in an opening in which the top shell overlaps the bottom shell, which might be useful in guiding a cutting blade at the first muscle cut and shell detach station 16, which is described below.

The motor 60 could be implemented in any of various ways. In one embodiment, a spinning blade drive system is in the form of a fully wash-down compatible (high-speed rotating labyrinth sealed shaft, passively cooled), three-phase vector driven spindle. Wash-down compatibility might be particularly important in certain settings, such as in a processing line on board a vessel. Other factors, such as desired blade speed and/or blade holder arbor and guard apparatus, could also be taken into account in selecting or designing a shell cutting blade drive system.

After passing the shell cut station 14, each scallop moves to the first muscle cut and shell detach station 16, views of which are shown in FIGS. 11 to 15. The first muscle cut and shell detach station 16 includes a cutting blade 70 driven by an air cylinder 72, which in some embodiments is ultimately coupled to the same air source, illustratively the same compressor, as the suction grip venturi arrangements 46 (FIG. 8). The cutting blade 70 is made of spring steel in one embodiment. A striking element 74 is similarly driven by an air cylinder 76, and may be made of a similar material as the cutting blade 70. In the example shown, the striking element 74 has two blades. Both the cutting blade 70 and the striking element 74 have guide assemblies as well.

Figure 1:
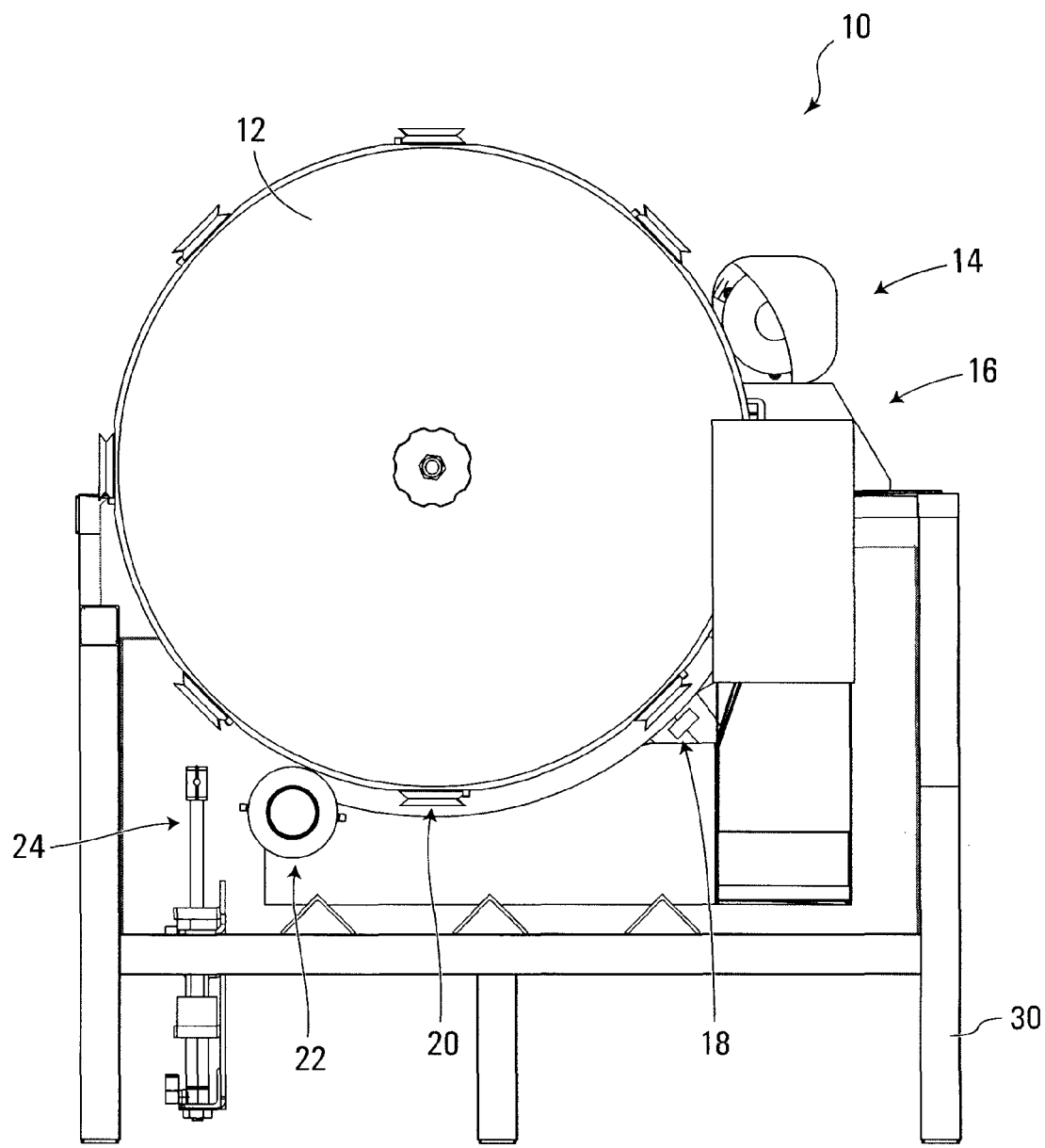
FIGS. 1 to 6 are views of a scallop processing apparatus according to an embodiment of the invention.
Figure 2:
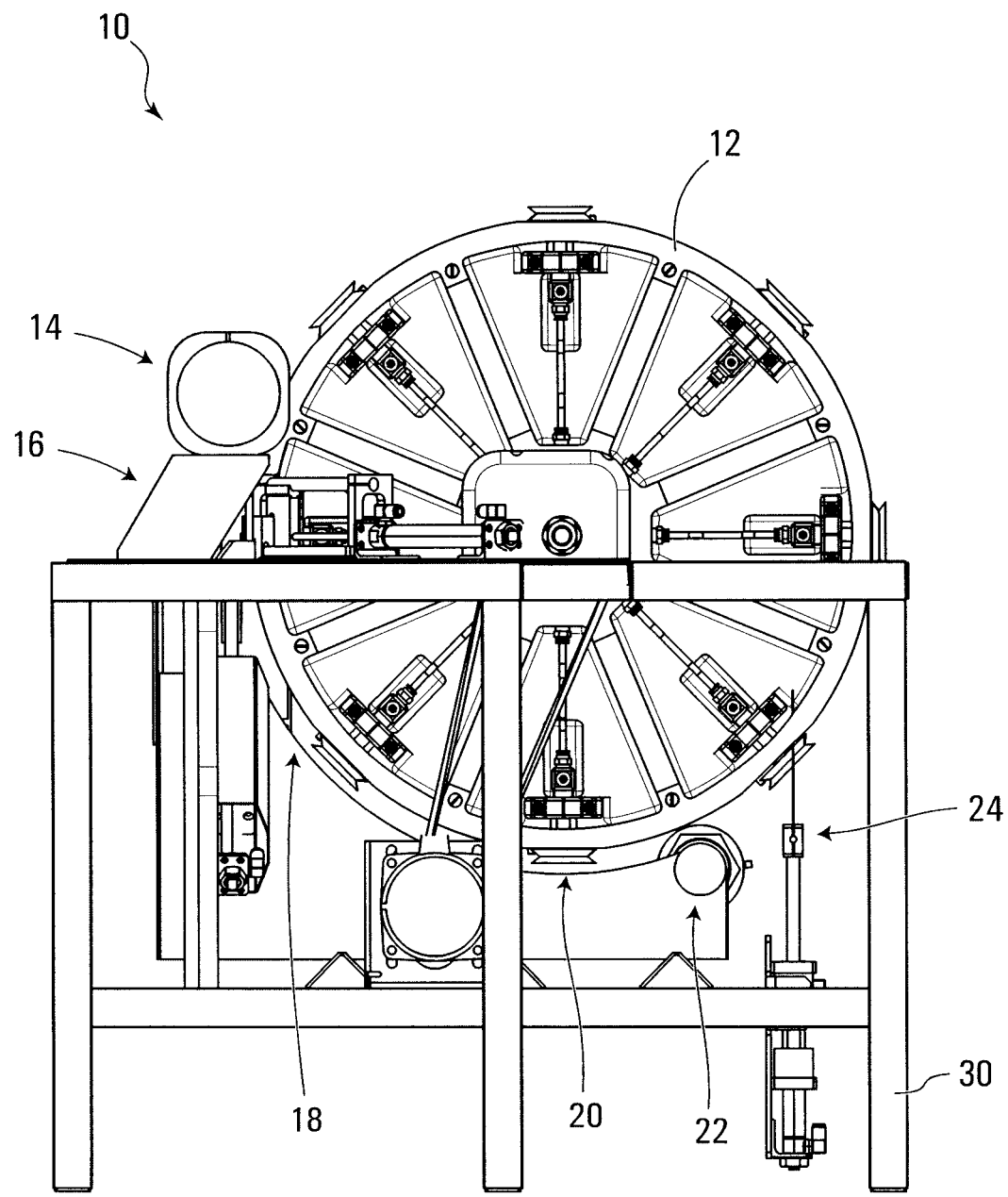
Figure 3:
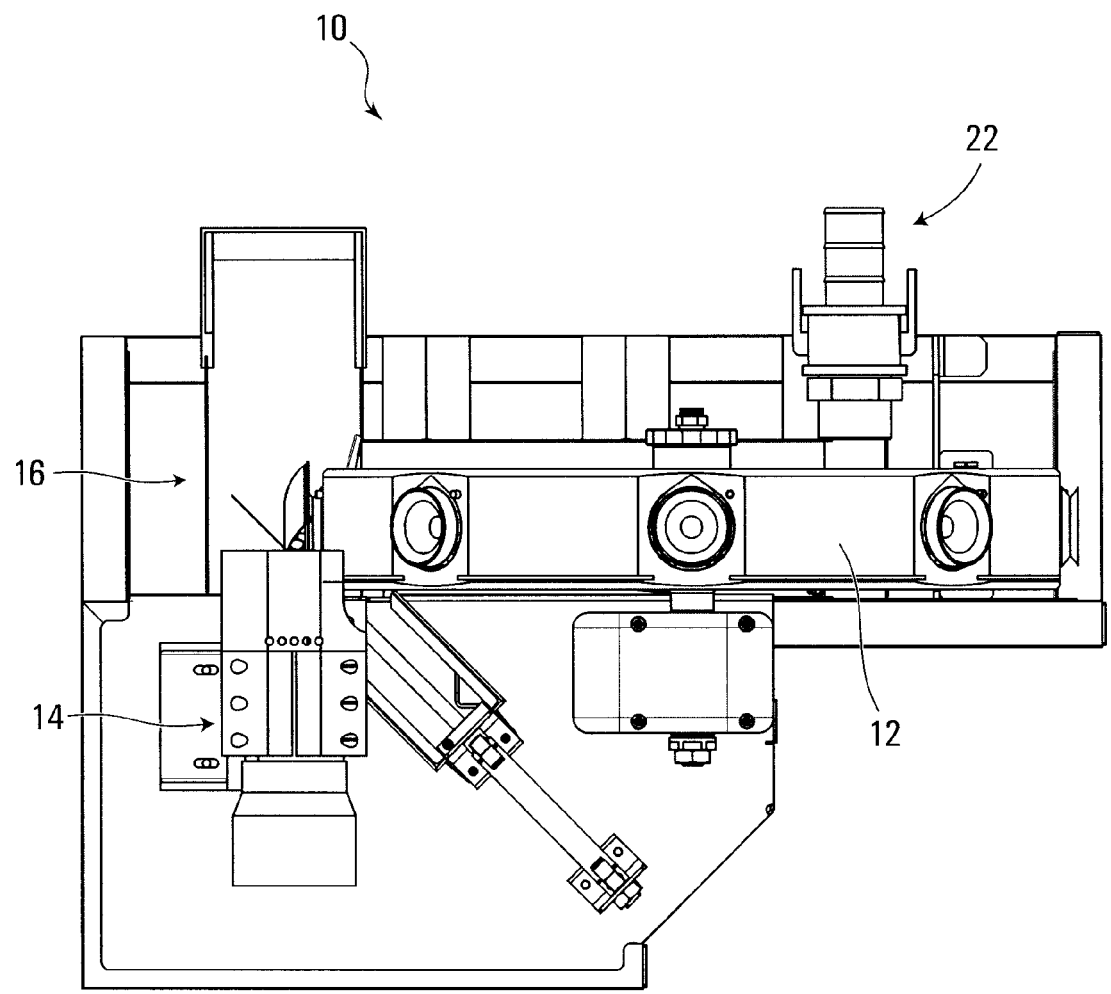
Figure 4:
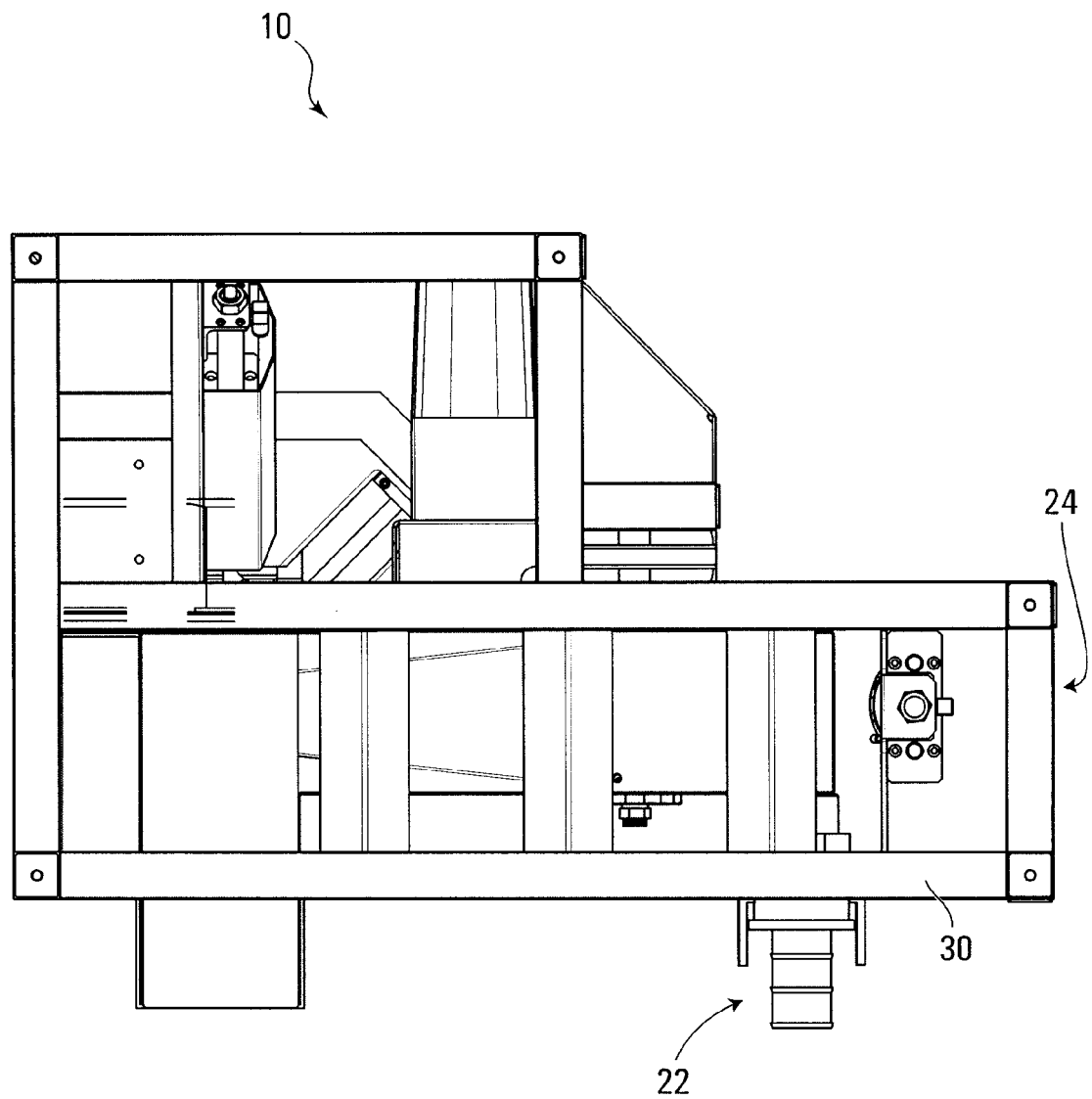
Figure 5:
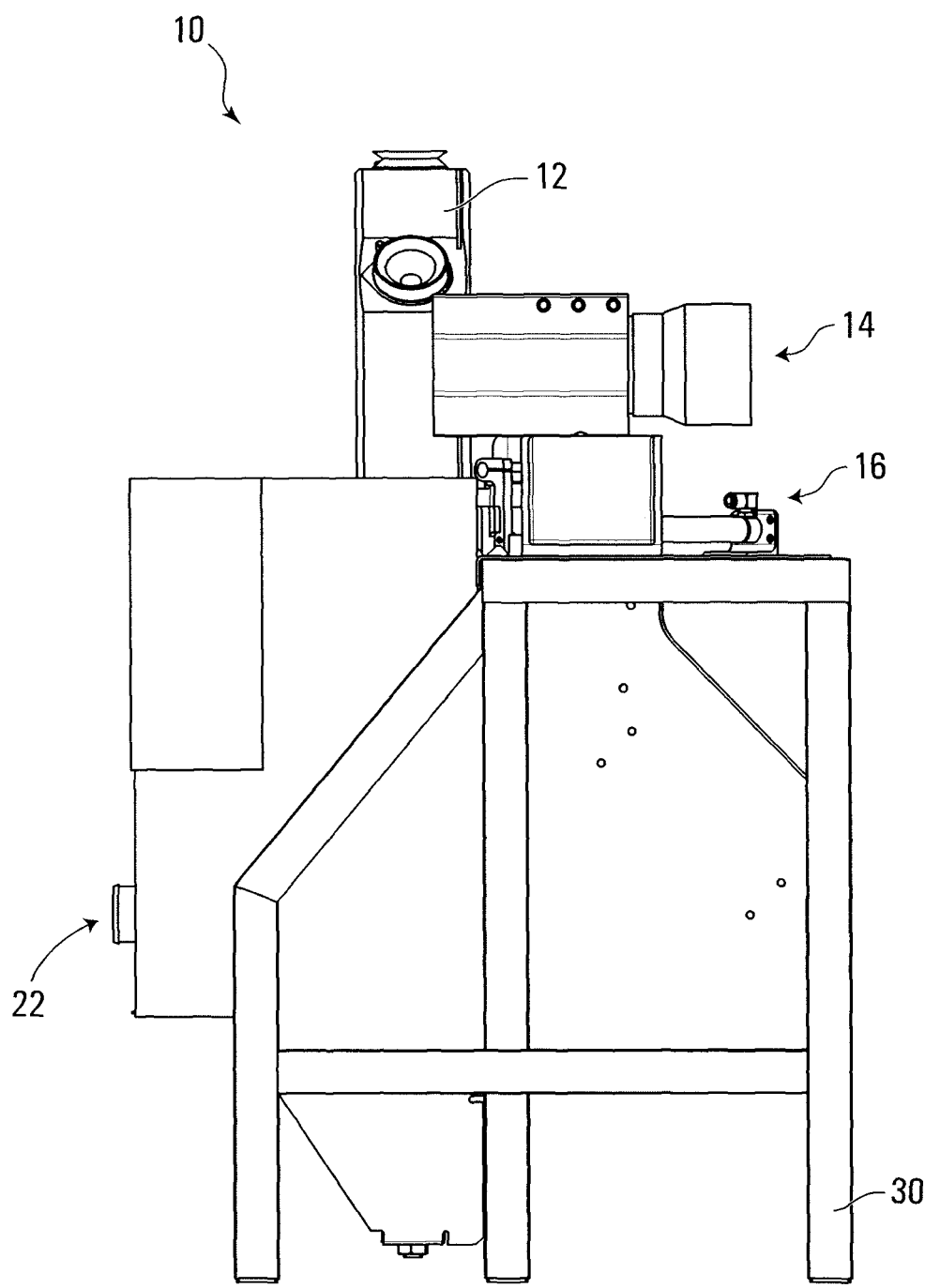
Figure 11:
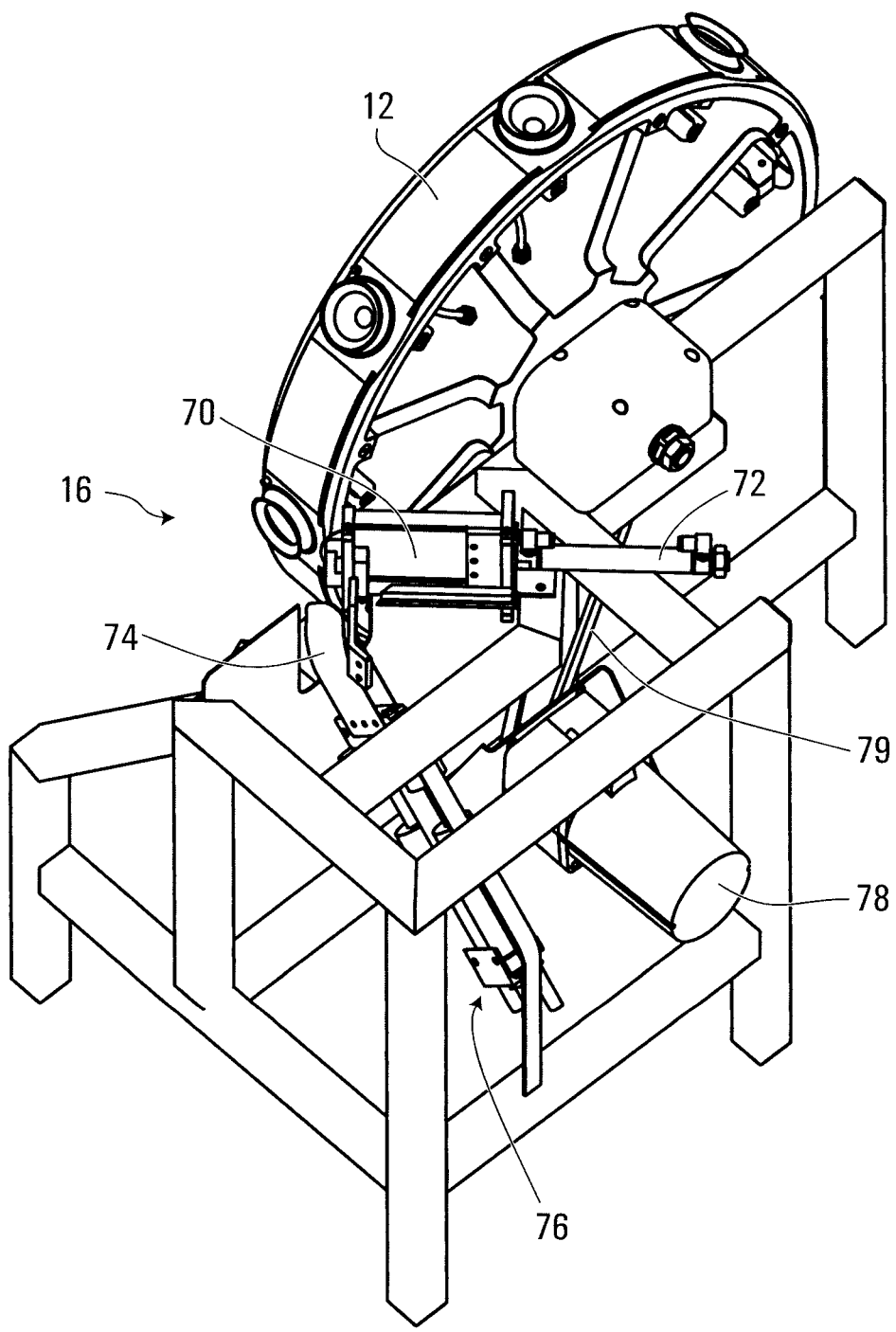
FIGS. 11 to 15 are views of a first muscle cut and shell detach station.

It will be apparent from FIG. 1, for example, that many components of the example machine 10 are not shown in FIG. 11, so that the first muscle cut and shell detach station 16 are more easily viewed. An example driving arrangement in the form of a motor 78 and a belt 79 are also visible.

In operation, the cutting blade 70 is movable from a first position (FIG. 11) out of contact with a scallop to a second position (FIGS. 12, 13) in which at least a portion of the cutting blade 70 would be between the shells, to cut the adductor muscle from the top shell. This portion of the cutting blade is inserted through the opening that is cut into one or both of the shells at the shell cut station 14 as described above. Once the adductor muscle has been cut from the top shell, the striking element 74 is fired. The striking element 74 is similarly movable from a first position out of contact with the scallop (FIGS. 11 to 13) to a second position (FIG. 14). During its movement, the striking element 74 strikes an outside surface of the top shell and shears/detaches the top shell from the bottom shell, which remains held in the holder.

Figure 12:
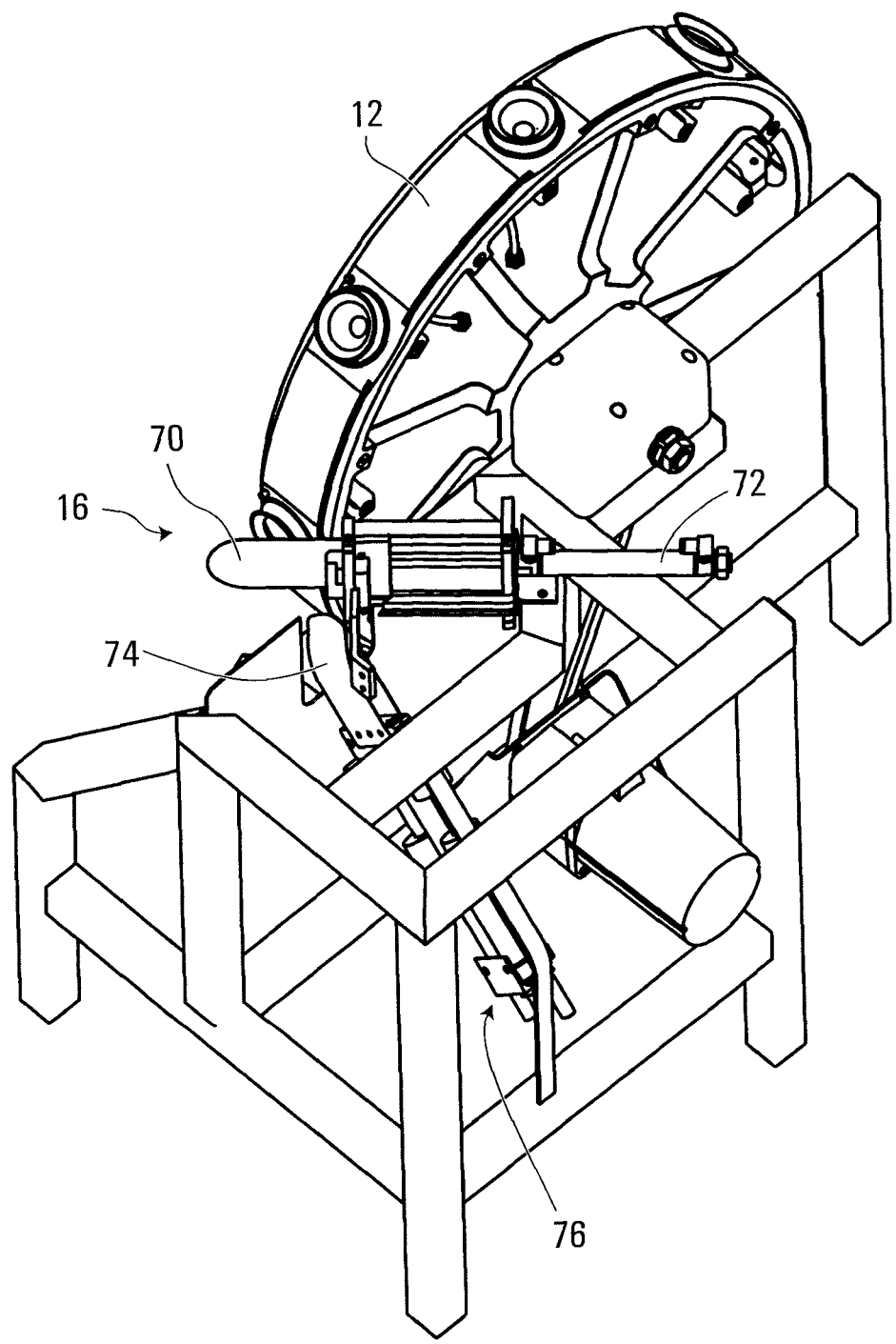

FIG. 12 illustrates the second position of the cutting blade 70 in the absence of a scallop from which the adductor muscle is to be cut. During processing of a scallop, however, the flexible cutting blade 70 would be restrained and deformed by the top shell, into a position as shown in FIG. 13.

A controller controls movement of the cutting blade 70 and the striking element 74, to cause the striking element to move from its first position to its second position while the cutting blade is in its second position. The cutting blade 70 thus remains in its second position to protect the adductor muscle that has been cut from the top shell against damage by the striking element 74 while the top shell is being knocked off.

It should be appreciated that although reference is made herein to a controller, this is not in any way intended to imply that "intelligent" control is required. For example, in one embodiment, open-loop control of the cutting blade 70 and the striking element 74 is provided through magnetically actuated switches and passive air flow control valves. Timing of the firing of the cutting blade 70 and the striking element 74 could then be dependent on relative locations of one or more magnets on the holder arrangement 12 and magnetically actuated switches which in turn actuate air flow control valves associated with the air cylinders 72, 76. No logic need necessarily be involved in this type of implementation, or in controller arrangements for other components of a scallop processing machine. Thus, a controller may, but need not necessarily, involve closed-loop control, more intelligent control, and/or electronic control mechanisms.

Figure 13:
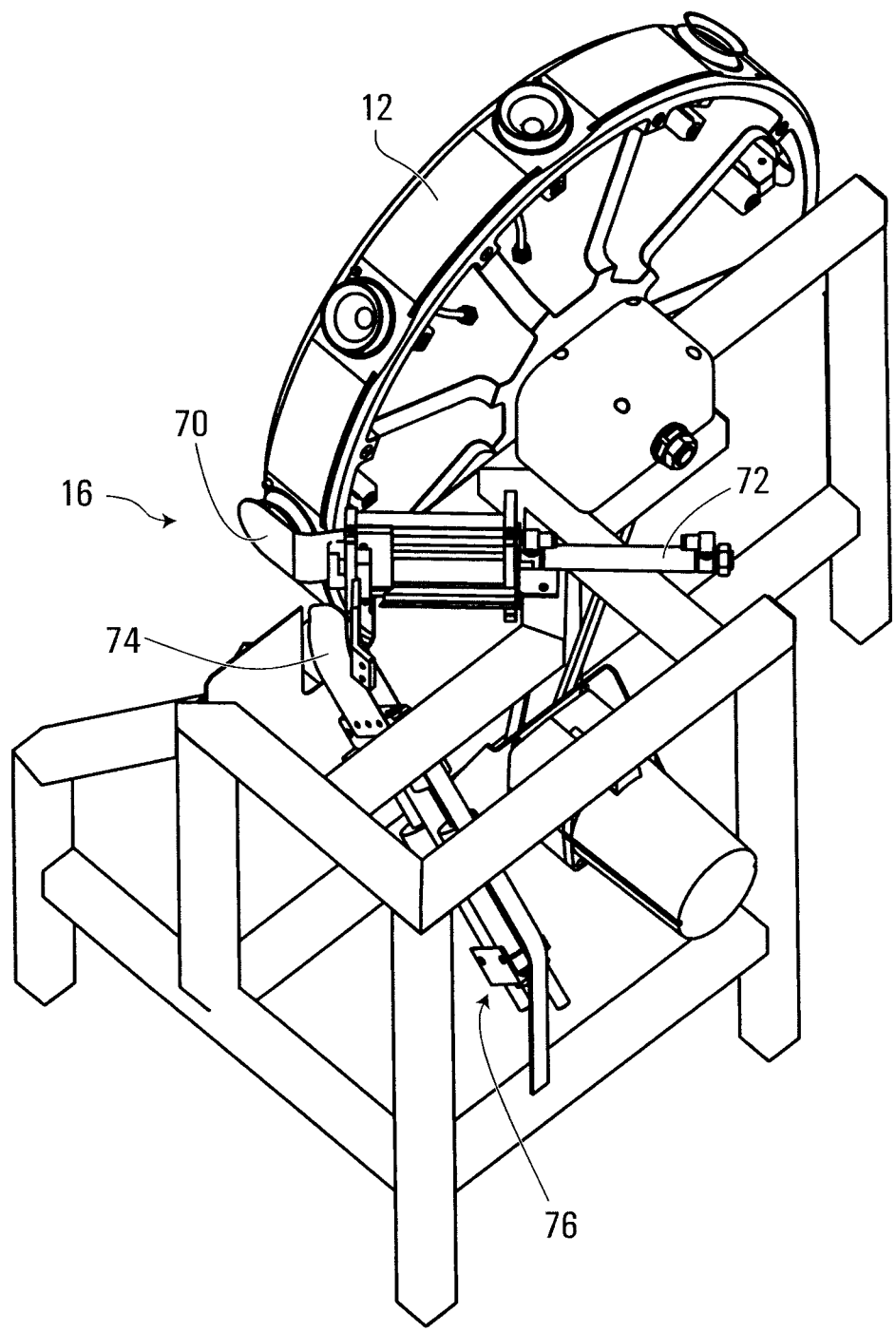
Figure 14:
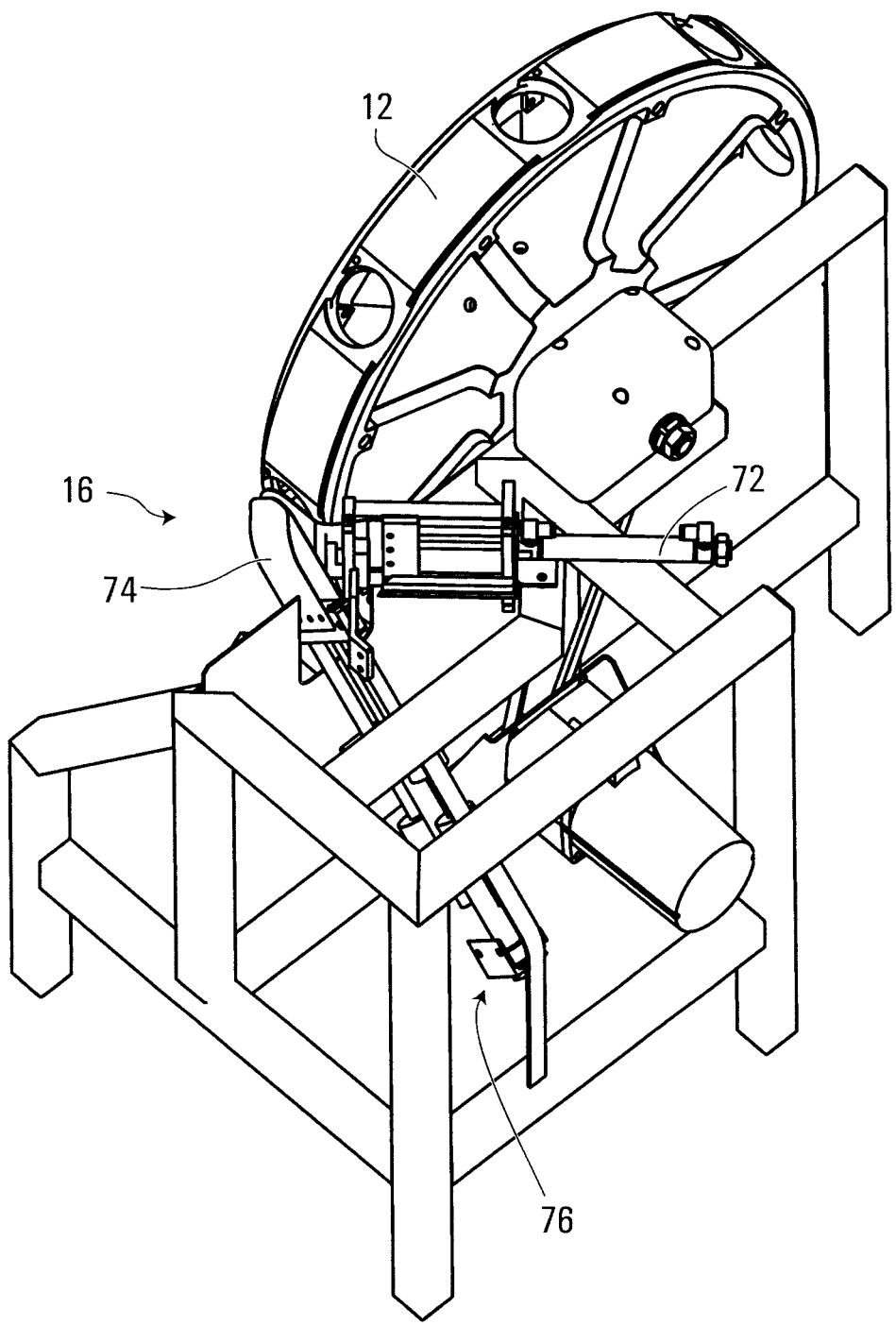

In some embodiments, the cutting blade 70 is flexible, as will be apparent from a comparison of FIGS. 12 and 13. The portion of the cutting blade 70 that cuts the adductor muscle from the top shell can then contact and follow an inside surface of the top shell as the cutting blade is moved from its first position to its second position. This type of "wiping" action of the cutting blade 70 provides a close cut of the adductor muscle from the top shell, which can increase the edible product (i.e., adductor muscle) yield over manual shucking techniques.

As the cutting blade 70 is moved along the inside surface of the top shell, it contacts and begins to cut the adductor muscle. A flat but flexible blade might tend to ride away from the shell surface as it cuts the adductor muscle. A flared leading edge on the cutting blade 70 can counteract this undesirable wander of the cutting blade, and force the edge of the blade toward the inside surface of the top shell as the adductor muscle is being cut. Flaring the leading edge of the cutting blade 70 in a direction that would be toward the surface of the top shell as the first adductor muscle cut is being made effectively exploits the tendency of the adductor muscle to apply force the cutting blade in a manner which causes the cutting blade to be pushed toward the top shell instead of away from the top shell.

In one embodiment, scallops are loaded onto the holder arrangement 12 such that their hinges are toward the front of the holder arrangement and substantially in line with the front edge of the holder arrangement. In this case the cutting blade 70 moves in a direction that is substantially perpendicular to a longitudinal axis of the hinge and toward the hinge to cut the adductor muscle, and the striking element 74 strikes the top shell in an oblique direction relative to the longitudinal axis of the hinge as the striking element is moved from its first position to its second position.

As noted above, the cutting blade 70 in its second position protects the cut adductor muscle from damage by the striking element. In some embodiments, the striking element 74 actually contacts a surface of the cutting blade 70 as the striking element is moved from its first position to its second position.

After the adductor muscle has been cut and the top shell has been detached, the striking element 74 and the cutting blade 70 can be moved back to their respective first positions shown in FIG. 11. Retracting the striking element 74 and the cutting blade 70 in this order further protects the cut adductor muscle, since the cutting blade continues to protect the muscle from damage by the striking element as it is retracted.

With rotation of the holder arrangement, the holder that is holding the currently processed scallop moves from a first position, in which the scallop is located relative to the cutting blade 70 and the striking element 74 to have the adductor muscle cut from the top shell by the cutting blade and the top shell detached from the first shell by the striking element, to a second position away from the cutting blade and the striking element, after the cutting blade and the striking element are returned to their respective first positions.

Overall control of "firing" the cutting blade 70 and the striking element 74 may be through a magnet and switch/solenoid mechanism or a metal plate and proximity sensor mechanism, for example, as described above. As the holder arrangement 12 rotates, its magnets move away from the magnetically actuated switch(es), and the striking element 74 and the cutting blade 70 are moved to their retracted positions.

Control at this point could similarly be triggered by magnets and switches or other sensor types such as proximity sensors. In one embodiment, the cylinders 72, 76 are driven both ways, to fire and retract the cutting blade 70 and the striking element 74. The speeds of the cutting blade 70 and the striking element 74 in both directions could be controlled by manually adjusted needle valves in series with air feed lines which feed the cylinders 72, 76. The locations of magnets on the holder arrangement 12 and switches which actuate air flow valves which are coupled to the air feed lines can be determined in order to provide any desired order of firing and retraction, such as the order described above. More elaborate control methods and mechanisms could be provided in other embodiments.

Figure 15:
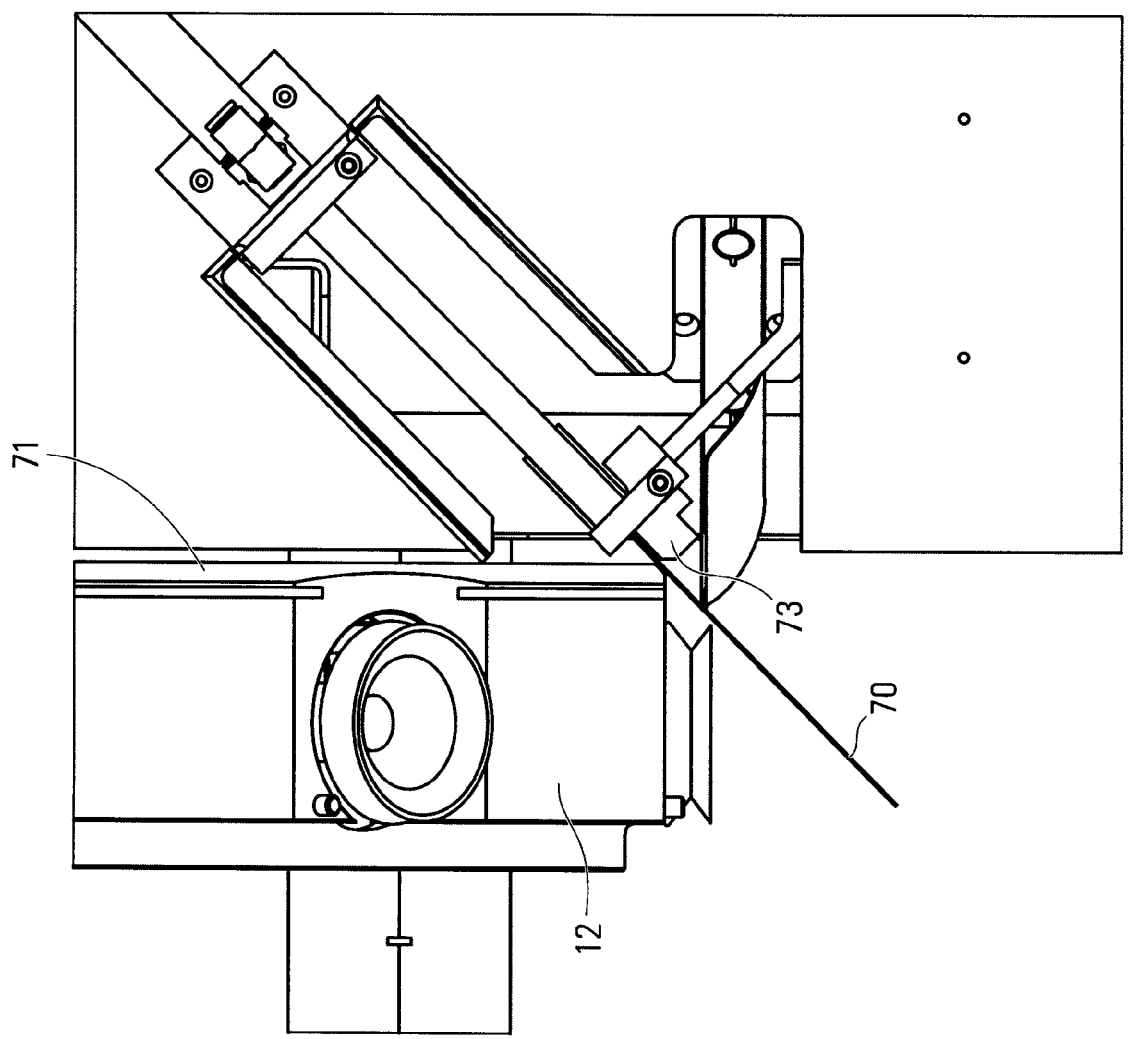

As noted above, the cutting blade 70 is at least partially inserted into a scallop through an opening that is cut at the first cut station 14. In some embodiments, the cutting blade 70 is actually guided into the opening. FIG. 15 shows one possible guide arrangement that involves two elements. One is a bevelled edge surface 71, which in one embodiment is bevelled at 45°, on the main wheel of the holder arrangement 12. The retracted cutting blade 70 can actually ride lightly along this surface 71 without substantially impeding rotation of the wheel. The other guide element in the example shown in FIG. 15 is a guide block 73, which might be made of plastic in some embodiments, that is part of the cutting blade assembly. These two guide elements 71, 73 ensure that the cutting blade 70 is positioned, after each stroke, to correctly enter the opening cut in the next scallop.

Figure 16:
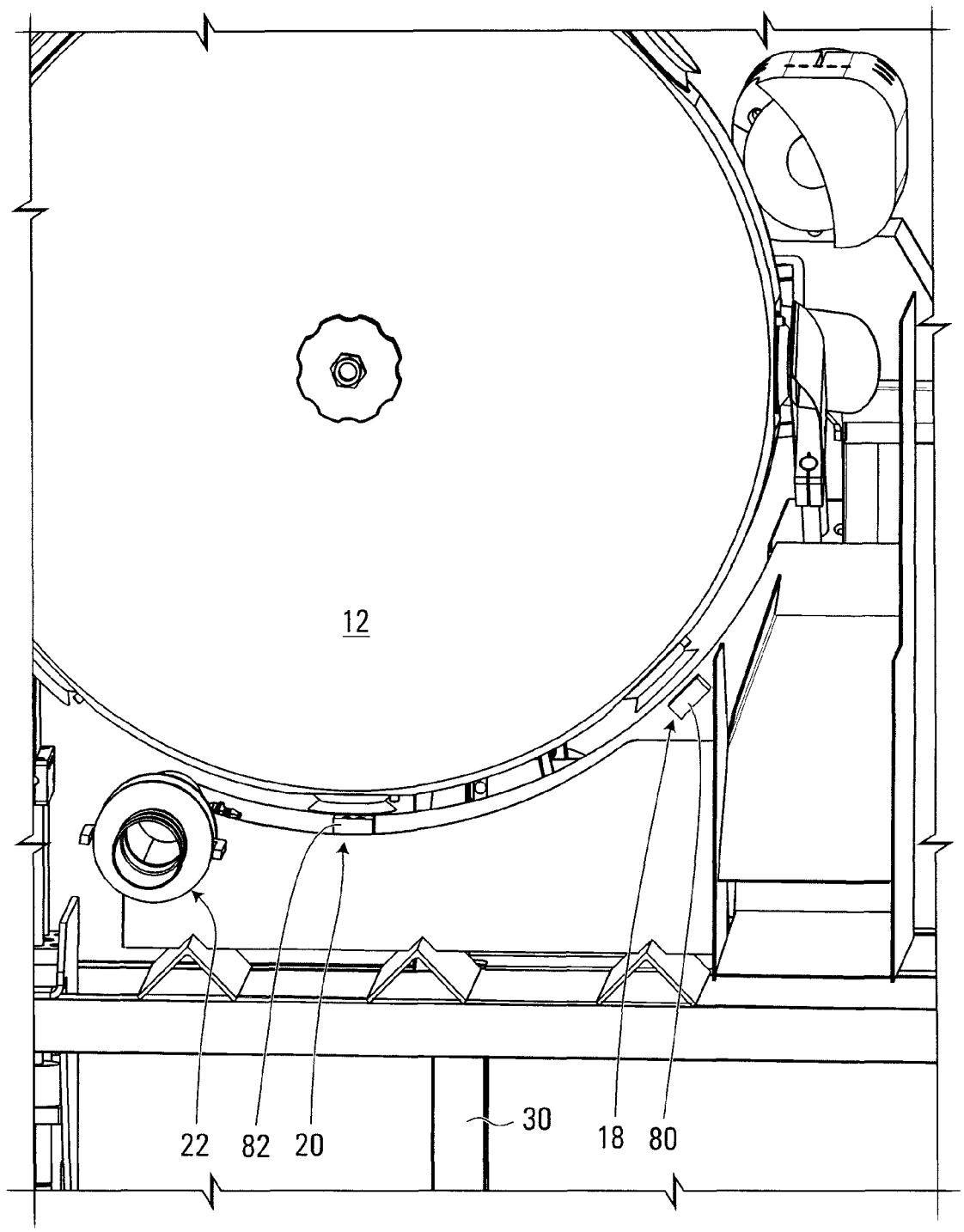
FIGS. 16 and 17 are views of first and second air blast stations.
Figure 17:
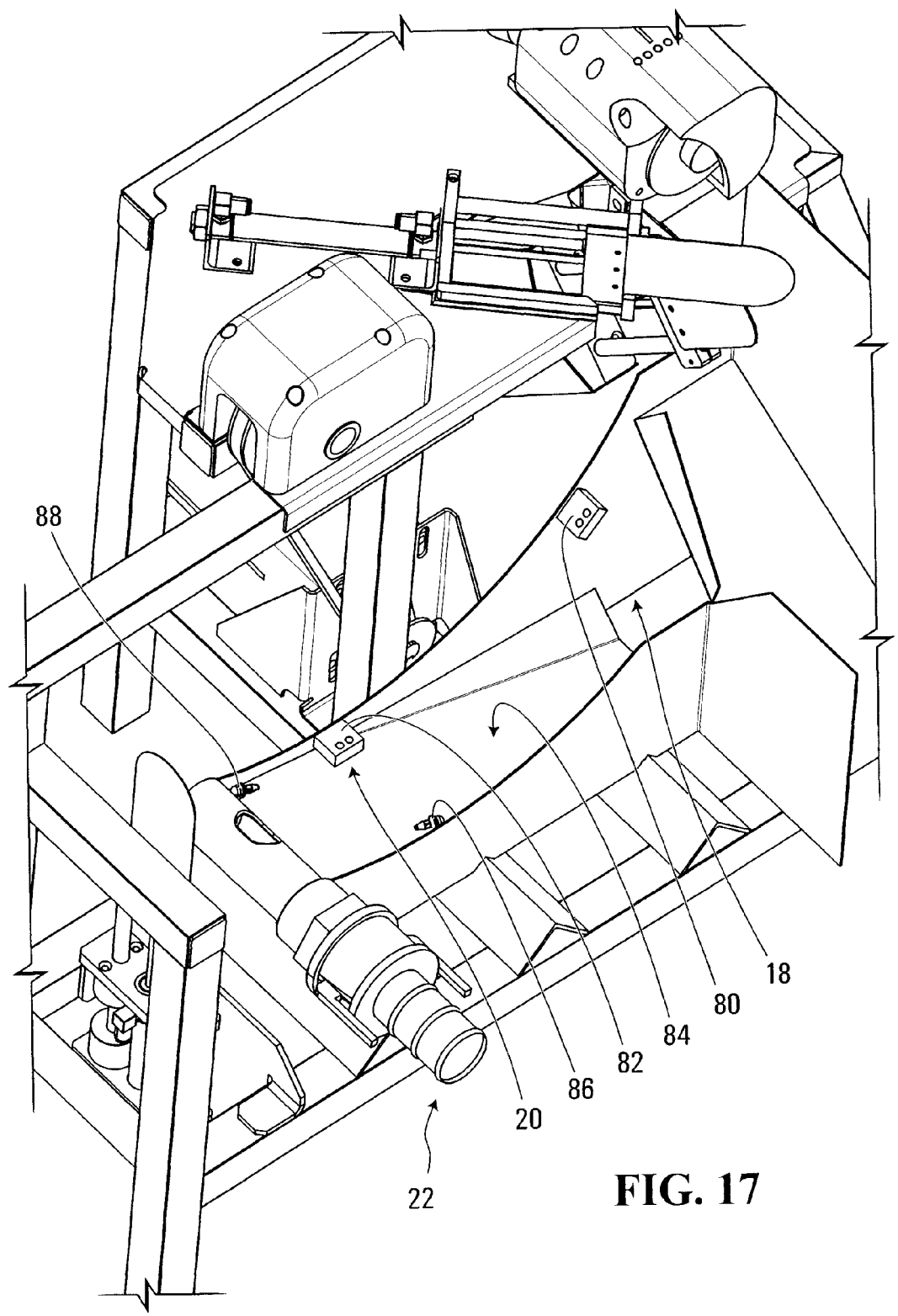

FIGS. 16 and 17 are views of the air blast stations 18, 20. Some components of the example processing machine have been removed to enhance visibility. The vacuum station 22 is also visible in FIG. 16, and additional components are visible in FIG. 17.

A scallop that is moved to the air blast stations 18, 20 has already had one of its shells removed. The scallop therefore has a remaining shell, specifically the bottom shell where scallops are loaded onto holders with their bottom shells down, and an adductor muscle and viscera attached to that shell. Each air blast station 18, 20 includes an air outlet 80, 82 located relative to the holder to direct an air stream toward the viscera. In the example shown, the air outlets 80, 82 are in the form of blocks for holding two air lines that are coupled to an air supply which supplies a blast of air toward the viscera through the outlet. Nozzles could be provided at the ends of the air lines to further direct the air streams. The air lines themselves are not shown in the drawings to avoid further complicating the illustrated views.

The air supply to which the air outlets 80, 82 are ultimately coupled could be the same air supply that is used for the suction grip venturi arrangements. A shared air supply arrangement is not intended to imply that all components are directly coupled to the same air line. Different pressures could be supplied to different air lines, by a single compressor, through different manifolds or flow regulators, for example. In one embodiment, the venturi arrangements 46 (FIG. 8) operate at 60 psi, and the air blast stations 18, 20 and the air cylinders 72, 76 which drive the cutting blade 70 and the striking element 74 operate at 125 psi and are fed from a separate manifold. The cylinders 72, 76 could be controlled using 24 vdc solenoid valves directly; whereas the air blast stations 18, 20 could use full-flow, pilot operated valves to maintain a high enough flow rate to be effective in at least loosening viscera, for instance.

It should be appreciated that the air outlets 80, 82 need not necessarily direct the air blasts onto the viscera. For example, in one embodiment, the air outlets 80, 82 are located relative to the holders to direct the air streams toward the viscera by directing the air stream onto an inside surface of the remaining shell. Positioning the air outlets 80, 82 at locations farthest from the hinge and away from the adductor muscle of each scallop tends to avoid damaging the muscle with the air blast. It should also be noted that the two air blast stations 18, 20 are not necessarily engaging the viscera or shell at the same location. One might be used to start loosening a single location and the other could then push it further, or they could be used to loosen two different locations around the viscera. The air blast stations 18, 20 are located to provide effective frill/viscera separation and minimum disturbance of the adductor muscle.

The air streams loosen the viscera from the remaining shells in the holders. The viscera may be inflated and/or blown away from the shells by the air streams. Inflation of the viscera could be achieved, for example, by directing one or more air blasts at one or both of the air blast stations 18, 20 into water jet channels of the scallops. Inflation of the viscera in this manner might itself detach the viscera from the remaining shell, or at least facilitate detachment of the viscera by a subsequent air blast and/or the vacuum station 22.

After the air stream has been applied at each station 18, 20, a holder is moved away from the air outlet 80, 82 to the next station, which might be another air blast station or the vacuum station 22. In the example shown in FIGS. 16 and 17, two air blast stations 18, 20 are provided, and this has been found to be effective in loosening the viscera. The air blast stations 18, 20 and the vacuum station 22 in the example machine 10 are located toward the bottom of the holder arrangement 12 so that gravity naturally pulls viscera away from the surface of the held shell and makes it "dangle". The circular holder arrangement 12 thus inverts shells at these processing stations to thereby take advantage of gravity during evisceration.

Intermittent firing of air blasts at the air blast stations 18, 20 may be controlled using a magnet and switch or other sensor arrangement, as described above.

At the air blast stations 18, 20 portions of the viscera and/or other matter could be entirely released from the shells. Any such processing residues fall onto the chute 84 (FIG. 17) and are cleaned from the chute by the water nozzles 86, 88. These water nozzles would be coupled to a water source and could be used to deliver continuous or intermittent water streams to wash down the chute 84. Other similar or different wash-down arrangements might also be provided.

Figure 18:
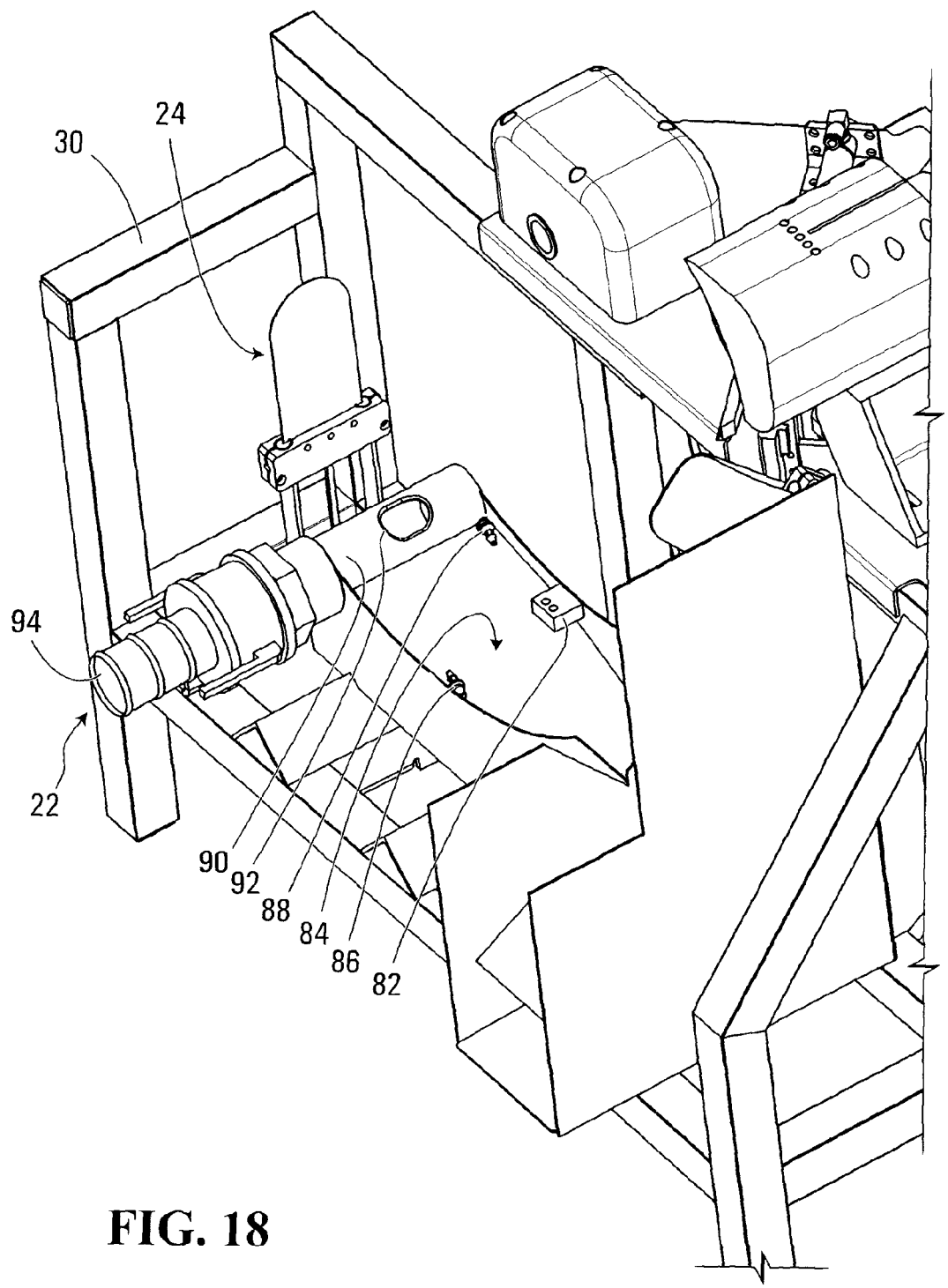
FIG. 18 is a view of a vacuum station.

FIG. 18 is a view of the vacuum station 22, with some components of the processing machine removed. The second muscle cut station 24 is also visible.

The example vacuum station 22 includes a vacuum tube 90, a vacuum intake 92 to pull the viscera from the remaining shell of a scallop, and a coupling 94 to couple the vacuum tube to a vacuum source. A scallop that is positioned for processing by the vacuum station 22 has an adductor muscle attached to the remaining shell, and viscera at least partially detached from the remaining shell as a result of the air streams applied at the air blast stations 18, 20.

The vacuum intake 92 is located relative to the holder to pull the viscera away from the remaining shell initially in a first direction, illustratively perpendicular to the holder, and subsequently in a second different direction. In the example shown, the vacuum intake 92 is formed as an opening in a side wall of the vacuum tube 90. Thus, the first direction is through the opening, and the second direction is along a longitudinal direction of the vacuum tube 90 toward the coupling 94.

It will be apparent from FIG. 1 that the vacuum intake 92 at the vacuum station 22 is positioned below a holder at the vacuum station 22. Evisceration is thus assisted by gravity. The viscera that has been loosened from the remaining shell hangs away from the shell and is pulled into the vacuum intake 92. Once the viscera enters the vacuum tube 90, it is pulled along the vacuum tube. This effectively peels the viscera off the remaining shell, away from the shell and toward the hinge of the shell. Each holder in the holding arrangement 12 thus holds a scallop in an inverted position above the vacuum intake 92. As shown, the inverted position need not orient a shell horizontally, at the bottom of the path of travel of the holders. Gravity assists evisceration even when shells are held in an inverted position that is off-horizontal.

Figure 19:
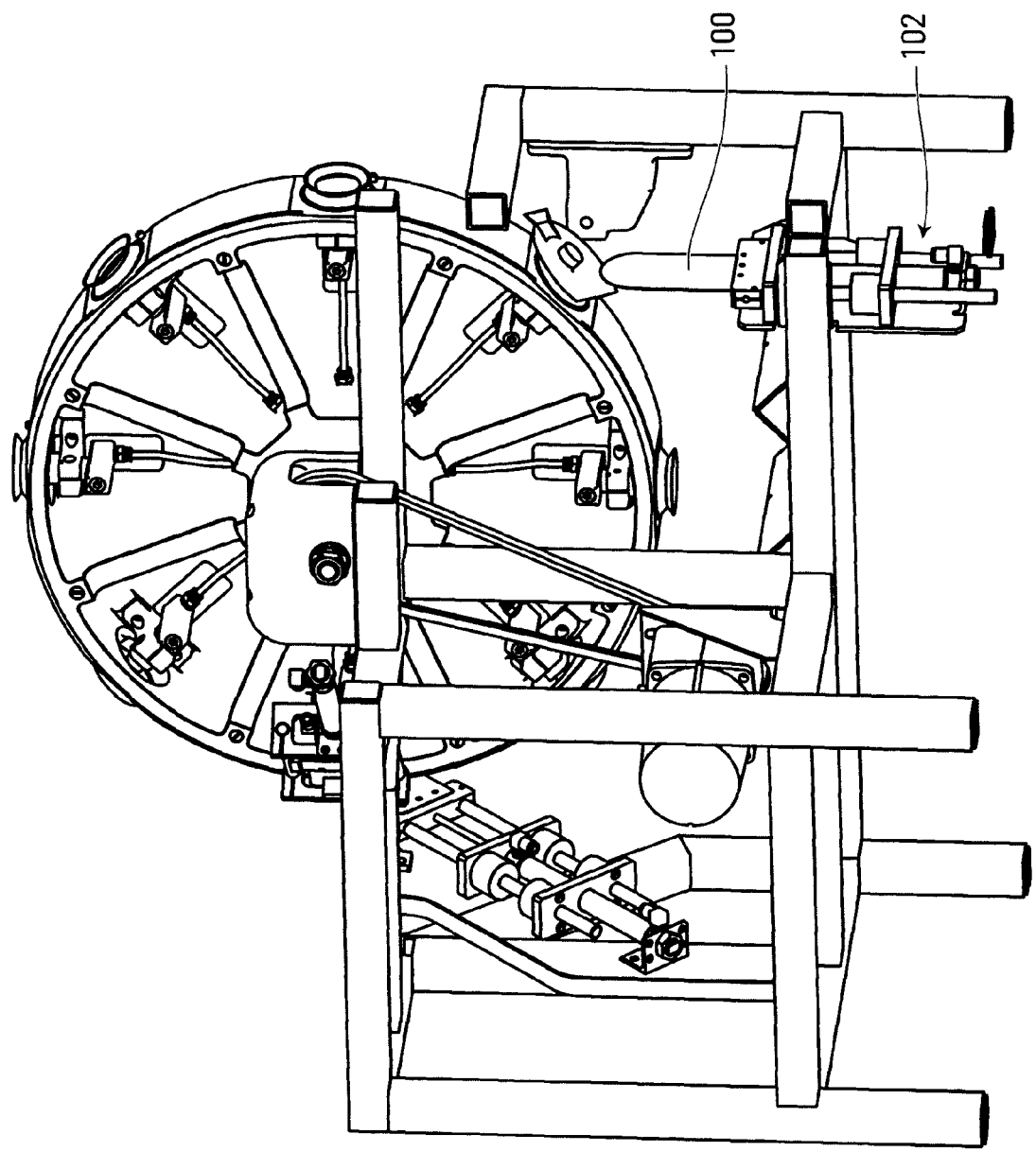
FIGS. 19 to 24 are views of a second muscle cut station.
Figure 20:
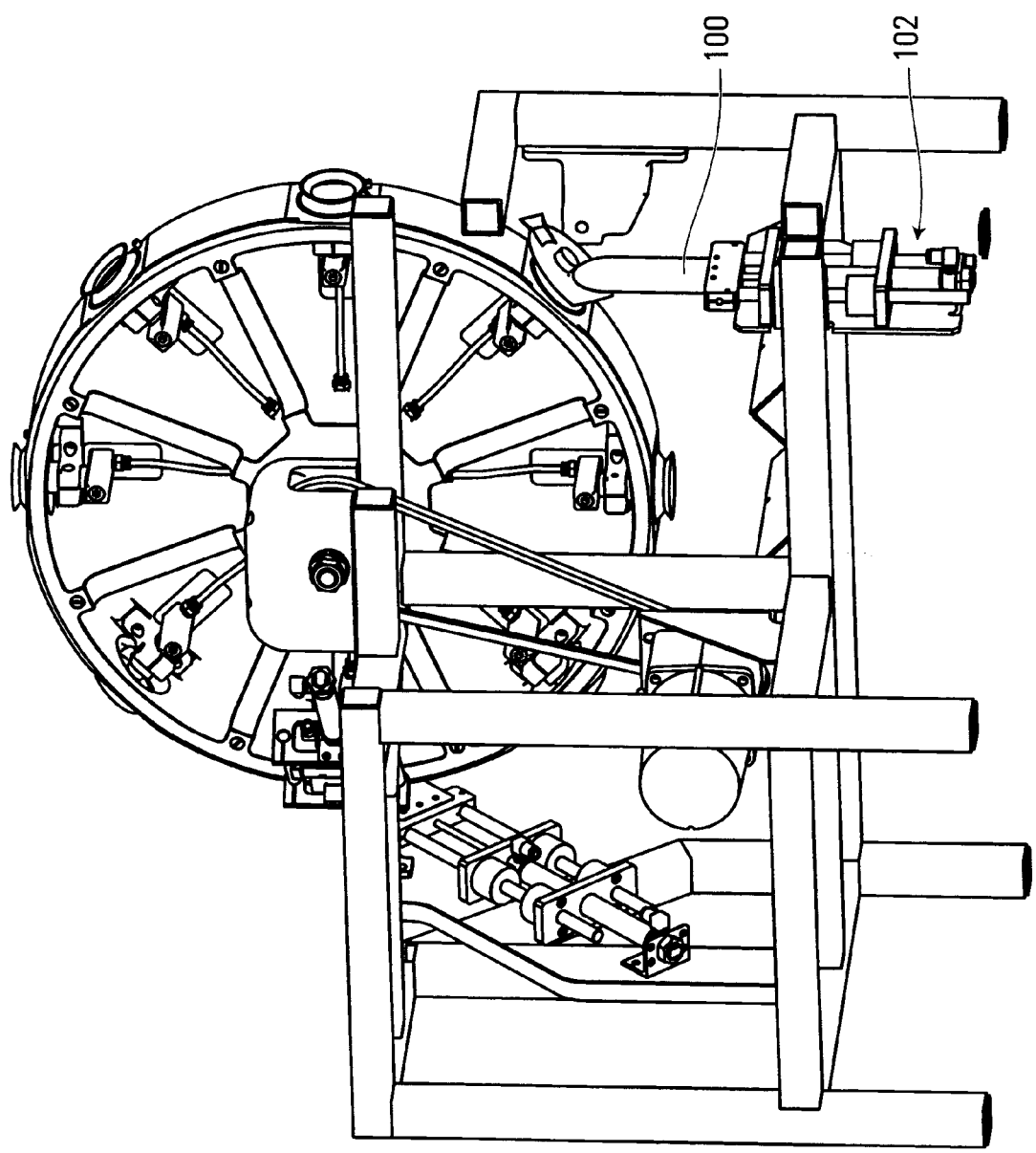
Figure 21:
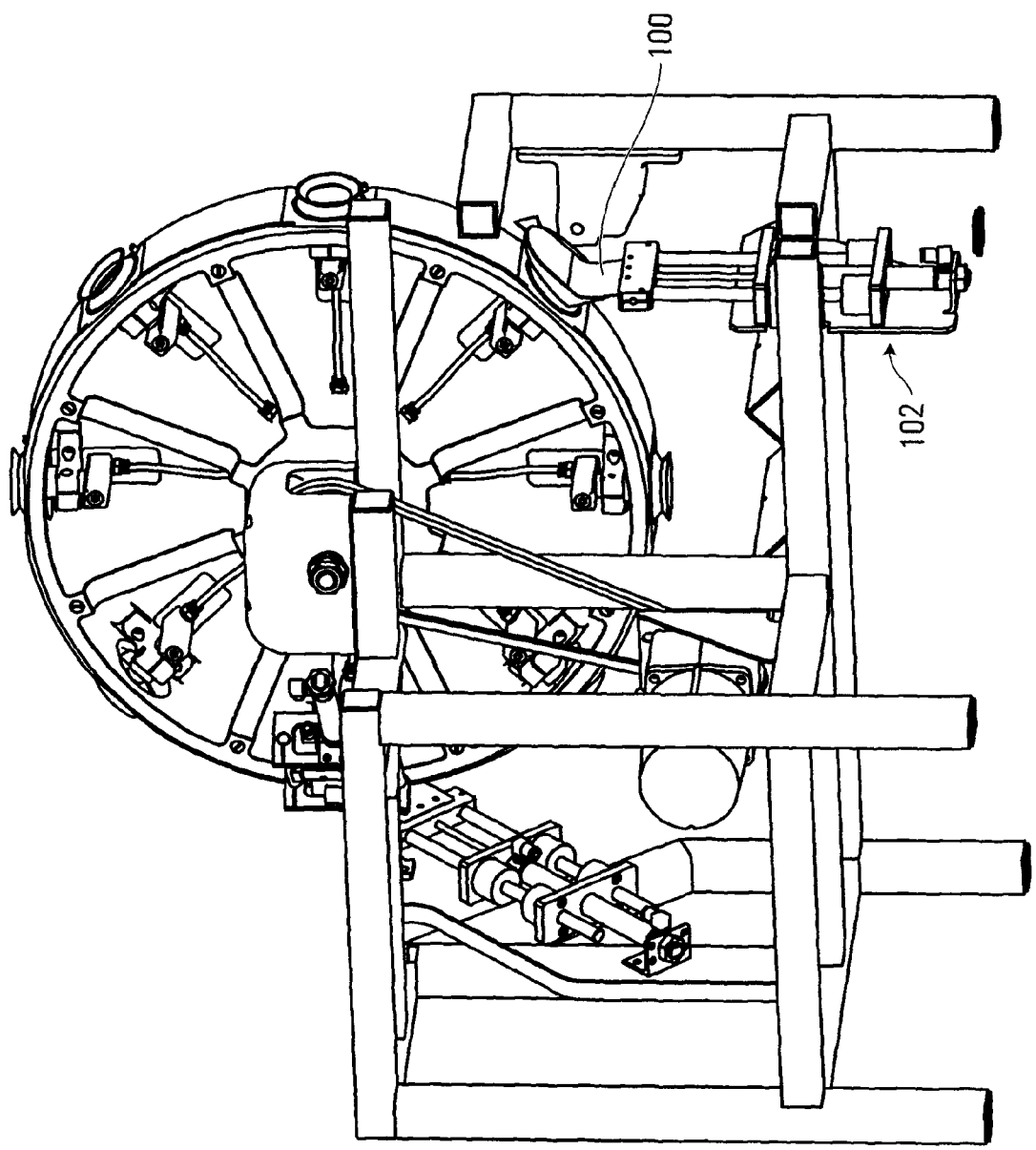

When a scallop arrives at the second muscle cut station 24, which is shown in FIGS. 19 to 21, the top shell and viscera have been removed at preceding processing stations. The adductor muscle is still attached to the remaining shell. The example second muscle cut station 24 includes a cutting blade 100 and an air cylinder and guide arrangement 102. The second muscle cut station 24 may be similar in construction to the cutting blade assembly at the first muscle cut station 16.

The cutting blade 100, when fired, contacts the inside surface of the remaining shell of a scallop in a holder and cuts the adductor muscle from the shell, as shown in FIGS. 20 and 21. The adductor muscle, which has now been fully cut from both scallop shells, falls away from the remaining shell, and could be collected in a container or moved by a chute or a conveyor, for example.

A detector could be provided at the second muscle cut station to detect presence of a scallop. The cutting blade 100 could then be fired only if a scallop is present. This would prevent the cutting blade 100 from being fired if a scallop has fallen from a holder before reaching the second muscle cut station 24.

Figure 22:
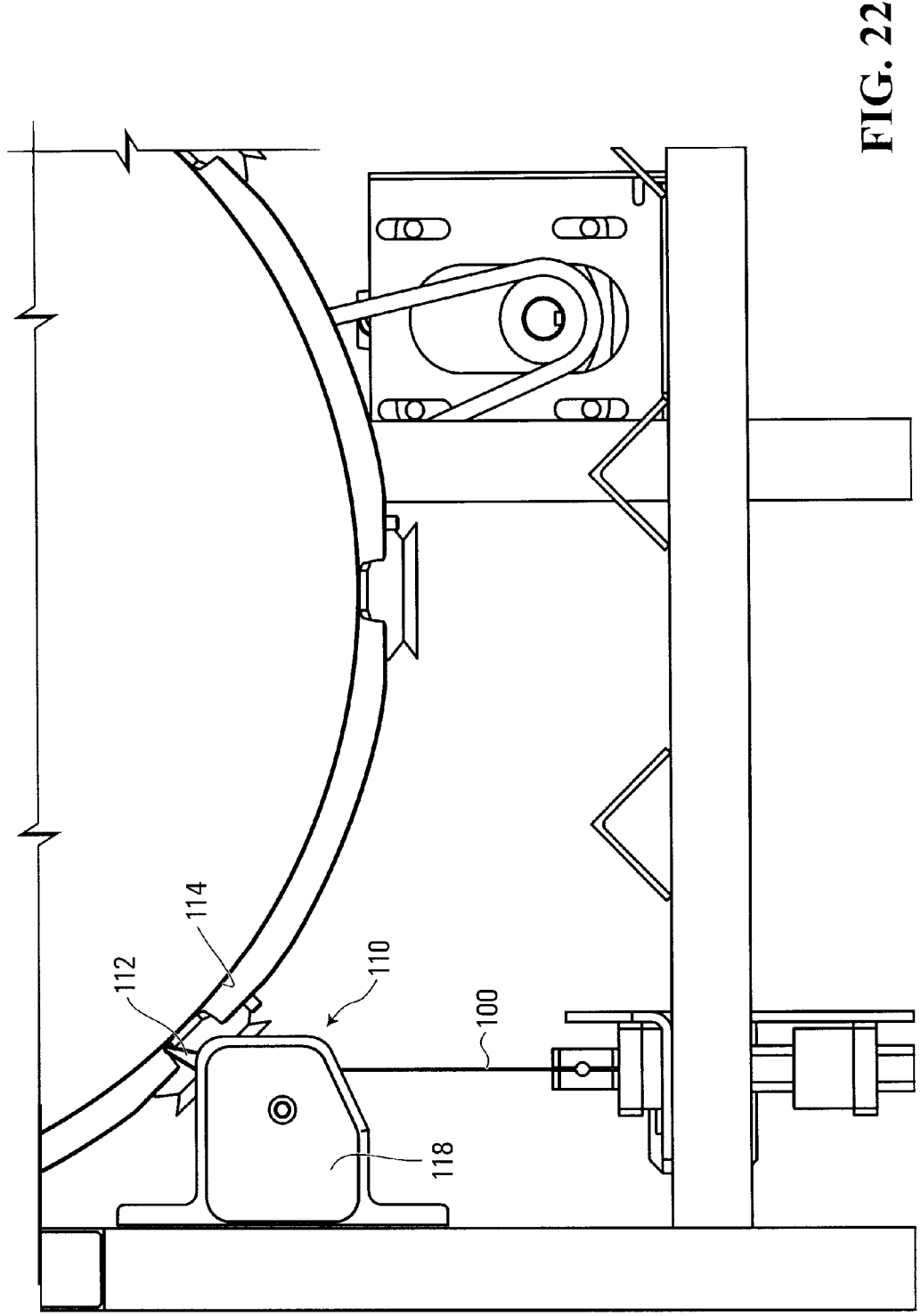
Figure 23:
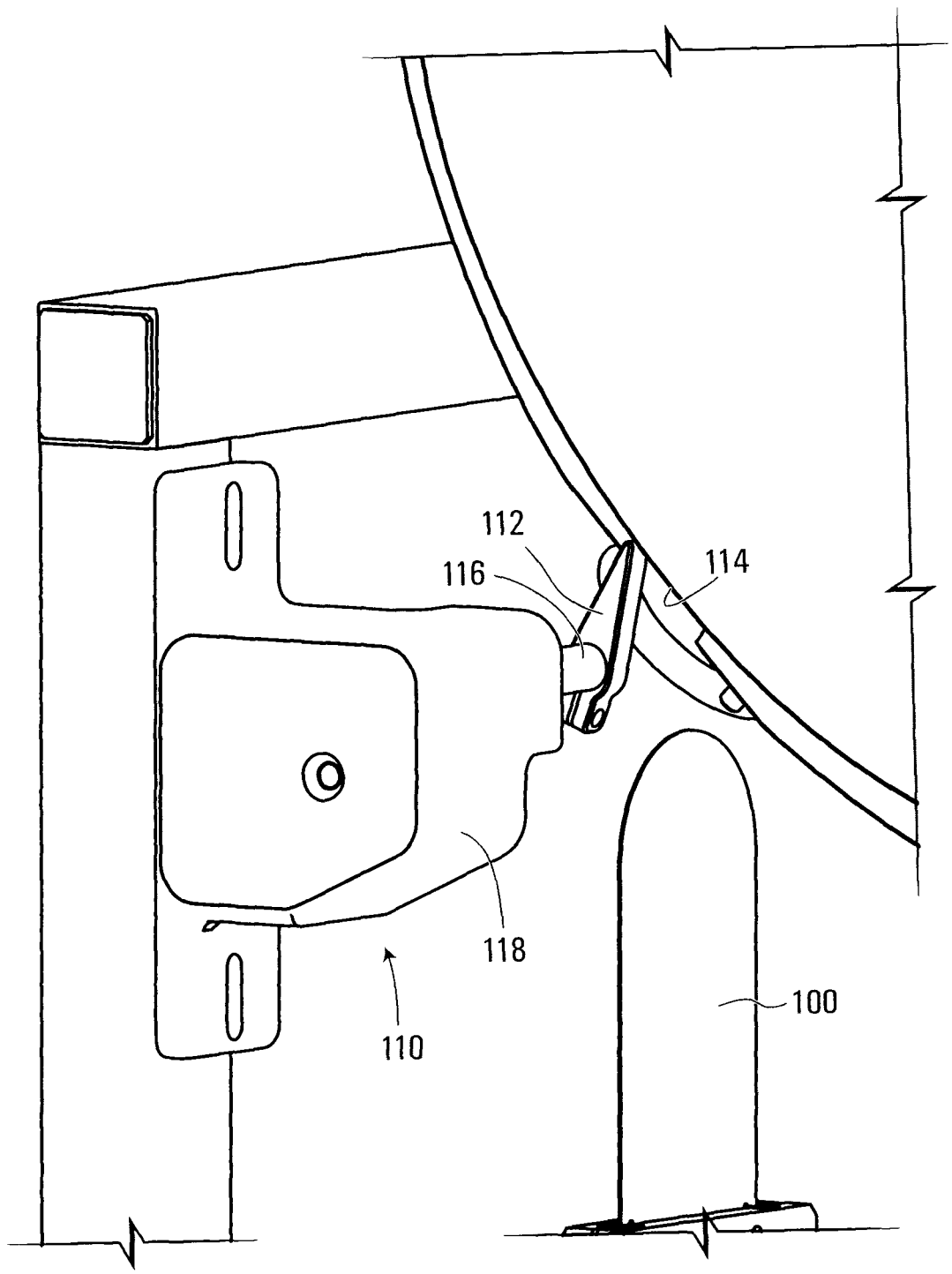
Figure 24:
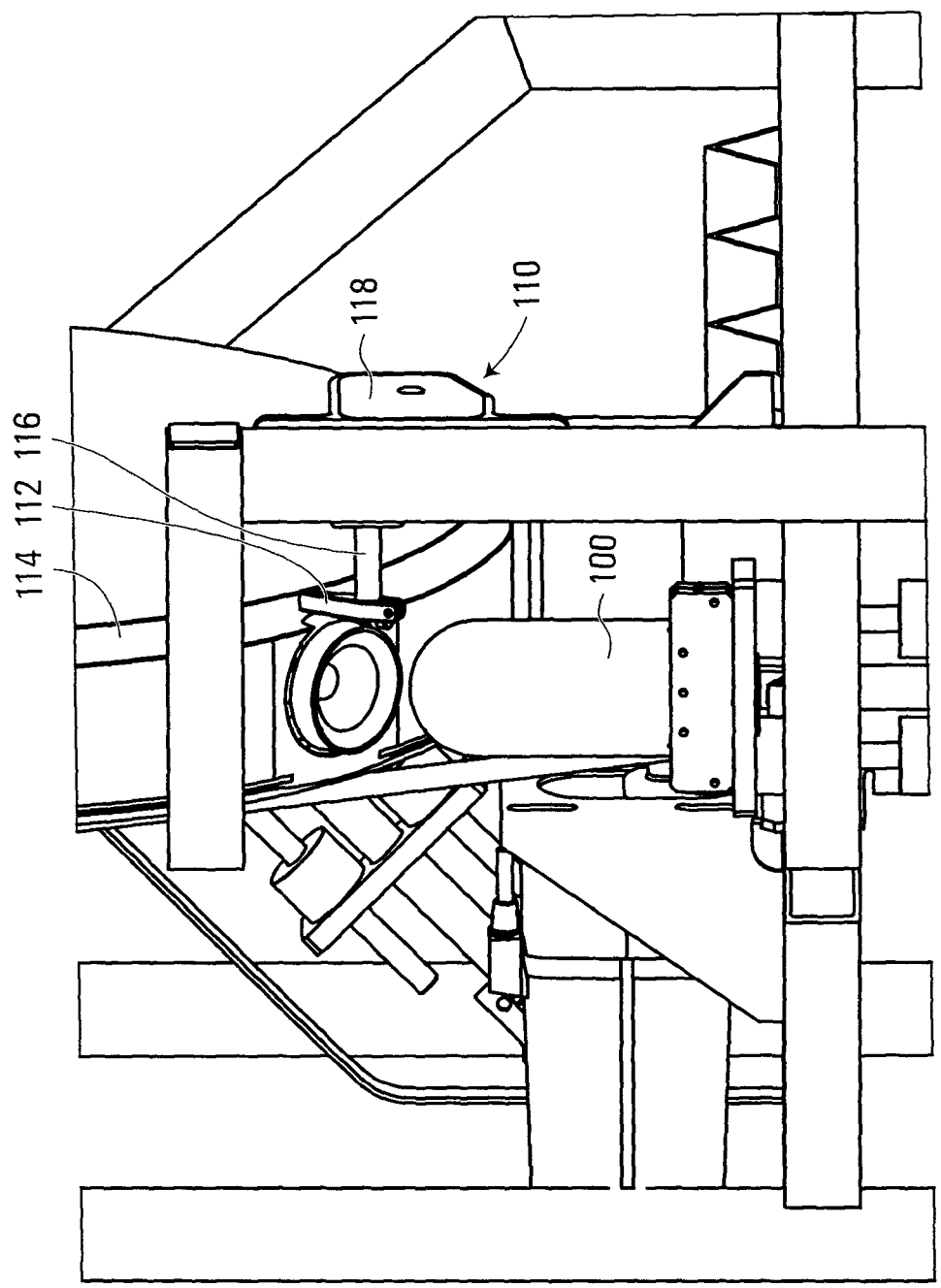

FIGS. 22 to 24 illustrate views of an example detector, which uses a trip mechanism to detect the shell of a scallop. This could be useful, for example, for preventing damage to the suction grips from the cutting blade 100 when no scallop is present. A scallop might have fallen from its suction grip during previous processing, for example.

The detector 110 shown in FIGS. 22 to 24 includes a single trip-lever 112 that rides in a groove or rabbet surface 114 along the edge of the holder arrangement 12. When a scallop is present and retained by a holder, its shell overhangs the edge of this groove, and trips the lever 112 as it passes by. This lever 112 turns a shaft 116 that enters a housing 118. Inside this housing 118, and attached to the same shaft 116, is another lever with a permanent magnet embedded into it in one embodiment. This internal lever, when pushed near a magnetic switch which is also inside the housing 118, provides a trigger signal to a solenoid valve to open and fire the second cutting blade 100.

A timer or similar latching/unlatching circuit could be provided to control the dwell time experienced by the second cutting blade 100. Retraction of the second cutting blade could instead be responsive to a retract signal or loss of the trigger signal when the shell passes the trip-lever 112 and the trip-lever returns to its rest position. If a more complex controller is provided, then this could be one of its output functions.

Components such as a scraper blade and water nozzles for wash-down streams could be provided to maintain a clean groove or surface 114 for the trip-lever 112 and thereby avoid false triggers of the second cutting blade 100 due to processing residues on this groove or surface. False triggers could damage the holders, other components of the holder arrangement such as the wheel which carries the holders, and possibly the second cutting blade 100. In the example machine 10, there is ample room to build in scrapers and wash-down points immediately after the shell has been ejected (as described below) and before the next scallop is loaded onto a holder.

Another possible control mechanism for the second muscle cut station involves both magnetically actuated switches and a detector. In one embodiment, a signal from a magnetically actuated switch at the second muscle cut station 24 is "AND"-ed with the trigger signal from the trip arm mechanism 110. This forces the second cutting blade 100 to fire only when both a shell is present and a holder is positioned directly over the blade 100. In this fashion, as the holder arrangement in the example machine 10 rotates, a signal from the magnetically actuated switch goes low and the "AND" signal also goes low. This signal transition could be used to retract the cutting blade 100 after the second muscle cut.

After the second muscle cut, the cutting blade 100 is retracted. The remaining shell should also be released from its holder, so that the holder can be loaded with another scallop for processing. Shell release could be provided at the second muscle cut station 24 or at a separate shell release station. Where venturi suction grips are used to hold scallops, air flow in each venturi arrangement could be altered at some point after the second muscle cut to release the empty shells from the suction grips. A venturi outlet blocker or compressed air outlet on the frame 30 (FIG. 1) at a position in the path of travel of the holder arrangement 12 following the second muscle cut station 24, for example, could be used to release shells where suction grip venturi arrangements are fed by compressed air and the openings 54 (FIG. 8) act as outlets.

Figure 25:
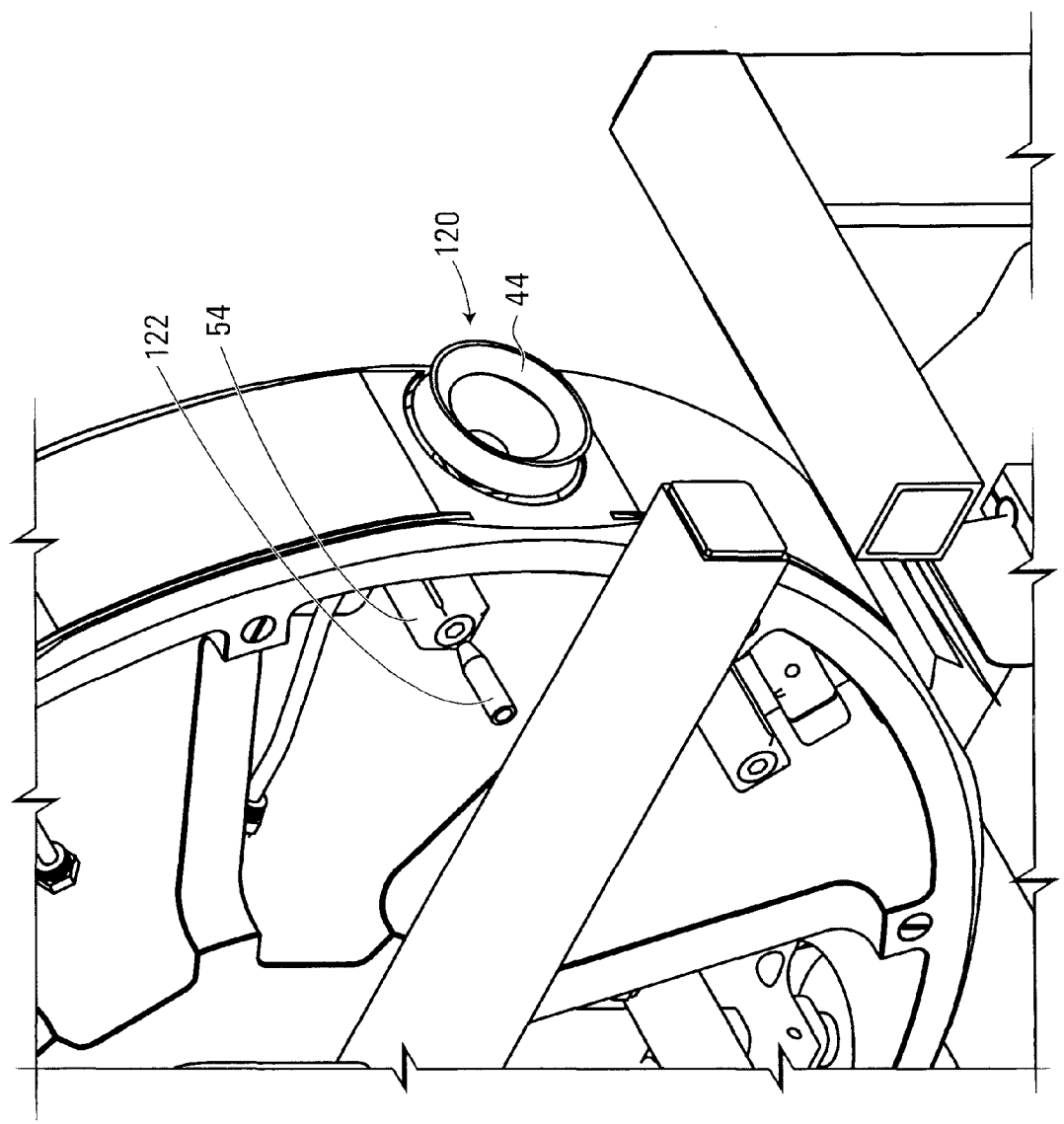
FIG. 25 is a view of a shell release station.
Figure 26A:
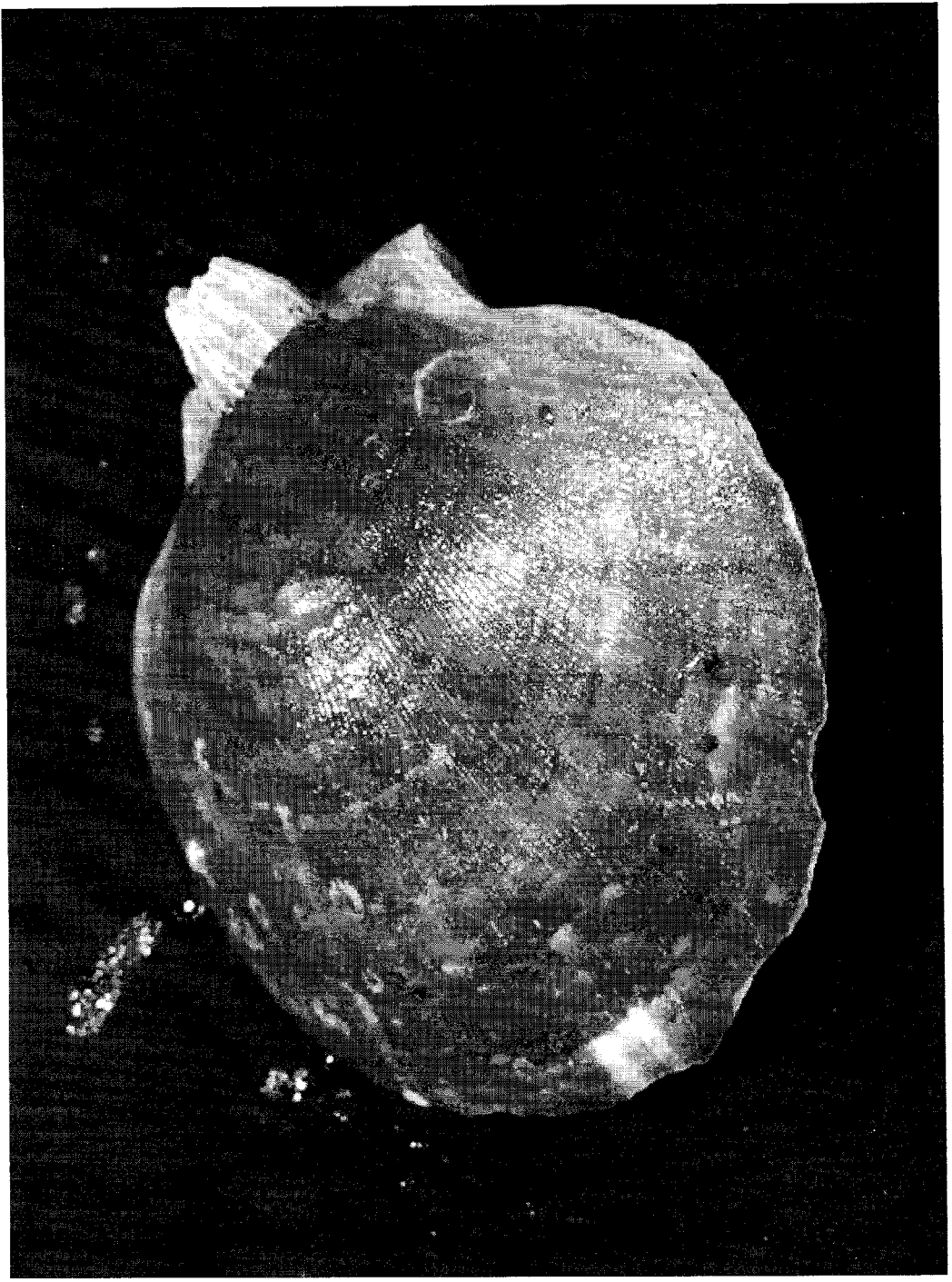
FIG. 26 includes FIGS. 26A through 26G, which are images of a scallop before processing and following processing at various processing stations.
Figure 26B:
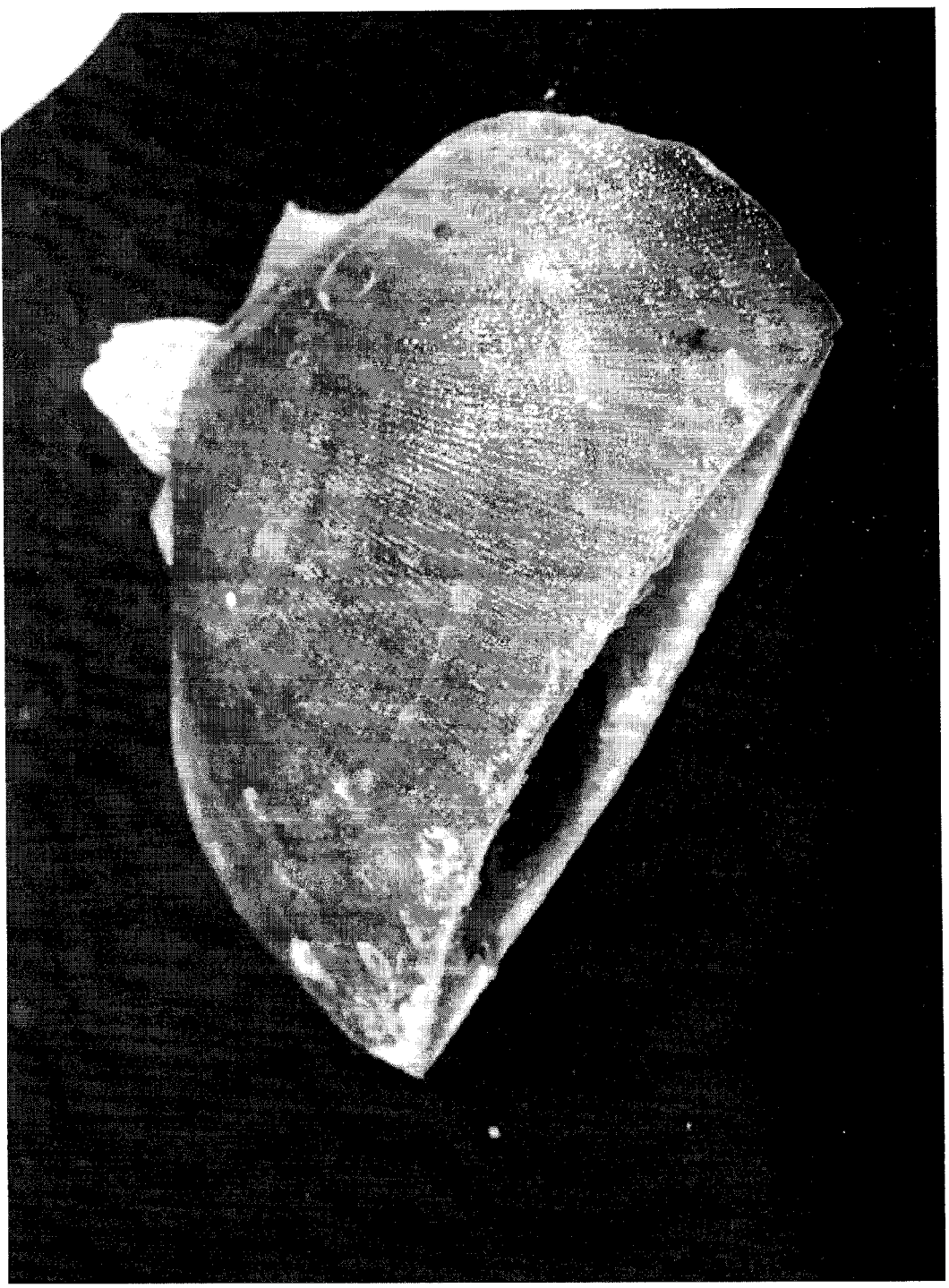
Figure 26C:
Figure 26D:
Figure 26E:
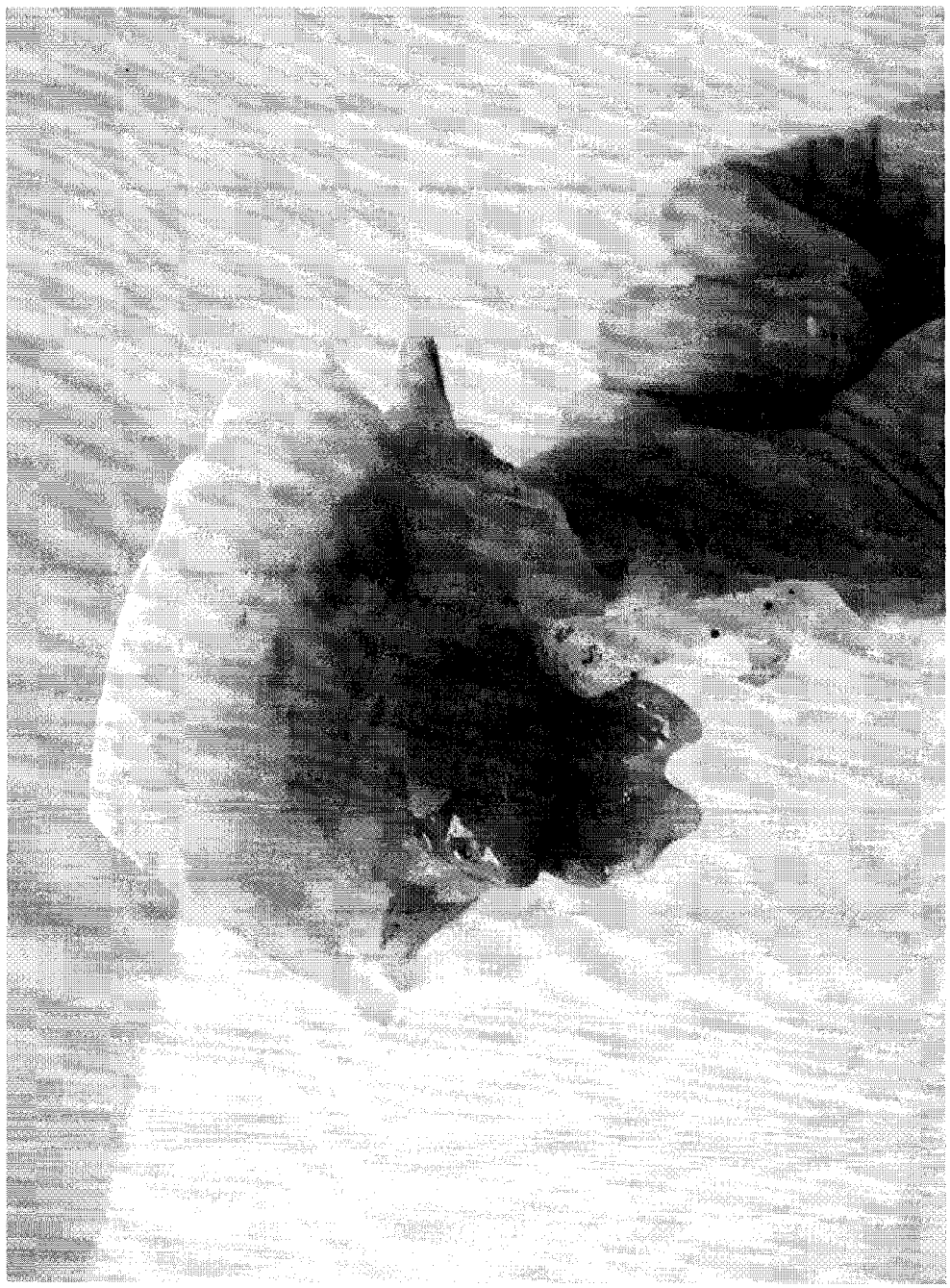
Figure 26F:
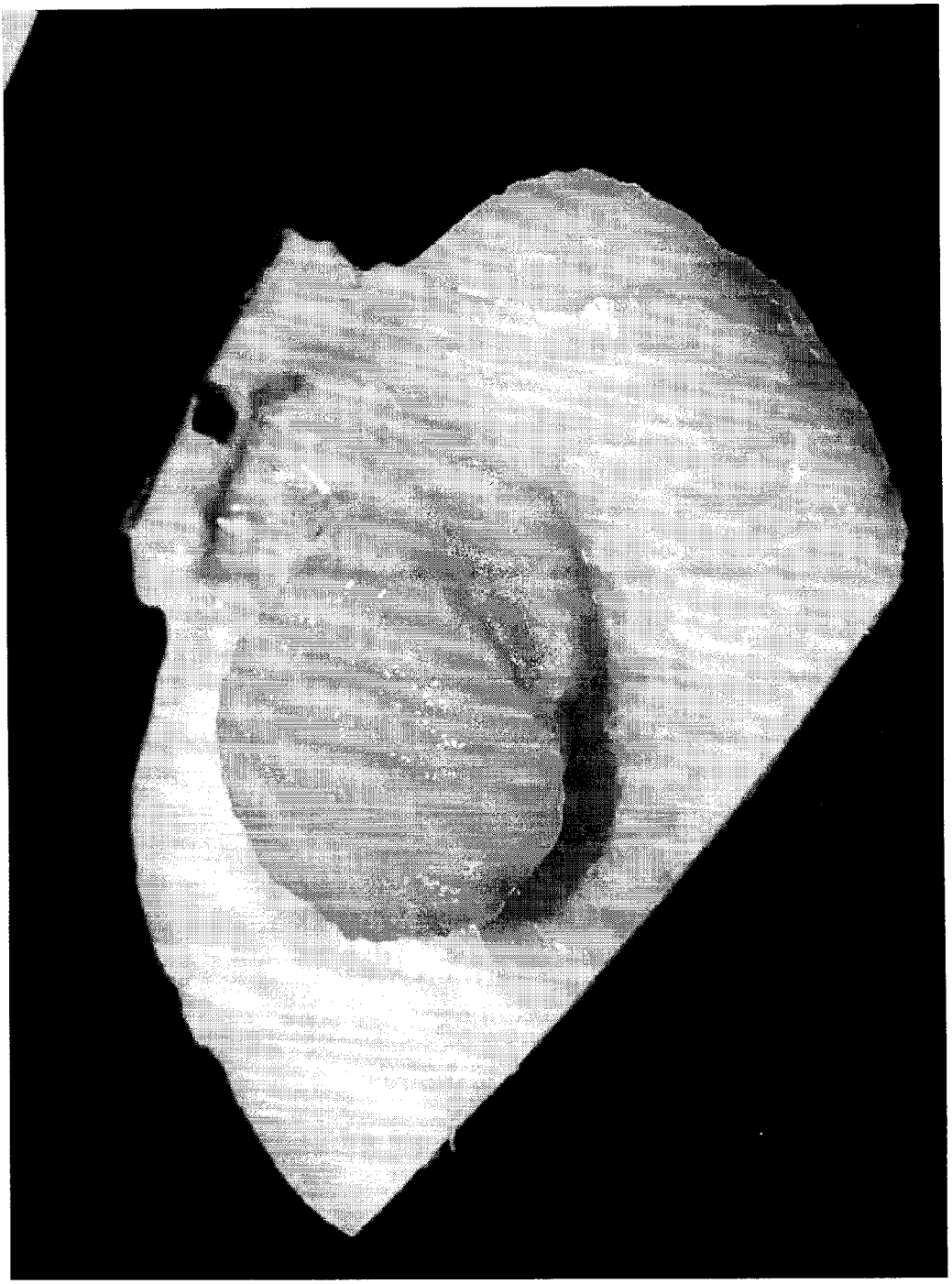
Figure 26G:

This type of arrangement 120 is shown in FIG. 25, in which an air nozzle 122, which might provide a continuous or intermittent air stream, is positioned such that each opening 54 will pass the air nozzle as the holder arrangement 12 rotates and after each holder has passed through the second muscle cut station 24. The air stream provided by the nozzle 122 affects the air flow in each venturi arrangement as it passes, and thus reduces the suction force by which the remaining scallop shell is held and allows the shell to fall from the holder.

Where the openings 54 act as inlets, a vacuum inlet arranged in this way would alter the air flow that creates a suction force and release shells.

FIG. 26 shows images of scallops at various stages of processing by the example processing machine 10, and serve to further clarify how the machine and its various stages operate. These images respectively show an unprocessed scallop (FIG. 26A) and scallops after processing by the shell cut station 14 (FIG. 26B), the first muscle cut and shell detach station 16 (FIG. 26C), the first air blast station 18 (FIG. 26D), the second air blast station 20 (FIG. 26E), the vacuum station 22 (FIG. 26F), and the second muscle cut station 24 (FIG. 26G).

During processing of scallops, processing waste including shells and viscera is generated. When implemented on board a vessel, shells could be directed overboard using chutes, conveyors, and/or other means. Viscera might present a further challenge.

One possible option would be to collect viscera at the vacuum station 22 and periodically empty a collection container. FIGS. 27 and 28 show another possible processing waste handling arrangement, which could be coupled to the vacuum station 22.

The example processing waste handling arrangement 150 includes a blower 152 at the top of a standpipe 154, which is coupled to a vacuum tube 156. The standpipe 154 is coupled at its bottom to a fluid line 158 through a reducer and valve arrangement. The vacuum tube 156 would be coupled to the vacuum station, through the coupling 94 in the example shown in FIG. 18, to receive the viscera that is pulled from the remaining shell.

In operation, the blower 152 pulls air through the vacuum tube 156. Viscera enters the standpipe 154 from the vacuum tube 156 and falls toward the bottom of the standpipe and into a fluid column that is maintained in the standpipe. The fluid line 158, which could be a part of an existing water pumping system or wastewater handling system of a vessel on which a scallop processing system is installed, draws the viscera from the standpipe 154 into a fluid flow in the wastewater line, which is directed overboard. The fluid flow might include other material such as additional waste as well. This type of arrangement avoids the need for collection containers for viscera and any associated emptying and other maintenance of those containers and could exploit an existing water supply that is pumped onboard in factory vessels.

As more clearly shown in FIG. 28, the standpipe 154 need not be the same size as the fluid line 158. In one embodiment, the standpipe is 4 inches in diameter, and is coupled to a 2.5 inch diameter fluid line 158 through a reducer 151, a valve 153, and a T-joint 159. Additional valves 155, 157 are also provided in the example shown. While the valves 153, 155, 157 would normally be open during operation, one or more of the valves could be closed during maintenance or to shut down the waste handling system, for example.

In the example waste handling system 150, the vertical holding tube or standpipe 154 has a mechanical resistance that allows a specific level of static head (water column height) to be present under steady-state operating vacuum conditions. When the vacuum tube 156 is momentarily occluded by the presence of viscera, in the vacuum tube itself or at an inlet at the vacuum station to which the tube is coupled, less air can be pulled through the vacuum tube, air pressure inside the standpipe 154 is reduced, and the static head level rises. Make-up fluid, which in most implementations is likely to be water, is ingested up into the standpipe 154 from the steady flow in the fluid line 158.

Once the vacuum tube 156 is cleared of the blockage, by the viscera travelling through the tube and being deposited into the standpipe 154, it is again open for air flow through the vacuum tube, the air pressure inside the standpipe increases (less vacuum), and the water head in the standpipe is now more than the blower 152 can sustain, and it drops away again. This exhausts a surge of water back down through the reducer 151 and into the flow in the fluid line 158. Since the viscera is heavier than water and is forcibly ejected in a downward direction into the fluid flow in the line 158, it is easily and quickly swept along through the restriction at the reducer 151 and into the fluid flow, to be vented overboard, or to a capture basin if this by-product is to be harvested as well.

The restriction between the vertical standpipe 154 and the fluid stream at 158 is sized to control the dynamics of this event, i.e., to prevent too little or too much of a surge inside the standpipe under the occlusion and release pattern of the evisceration. Fluid pressure in the fluid line 158 and differences in sizes between that line and the standpipe 154 can also be determined to ensure that a head column of at least a minimum depth is provided in the standpipe under steady state conditions.

FIGS. 29 to 32 show an example float valve 160 that could be implemented in a waste handling system such as the system 150 (FIG. 27). The float valve 160 is shown in a closed position in FIGS. 29 and 31 and in an open position in FIGS. 30 and 32. The float valve 160 includes a mounting plate 165 for mounting to a standpipe 164. A vacuum inlet 166 for coupling to a vacuum tube is formed in the mounting plate 165 in the example shown, although this could be provided separately from the float valve 160, as part of the standpipe 164, for example, in some embodiments. A valve cover assembly 168 is mounted on the mounting plate 165, and can pivot between the closed and open positions shown in FIGS. 29 and 30, respectively. In the closed position, the valve cover 168 covers a valve opening 170 in the mounting plate 165.

Figure 31:
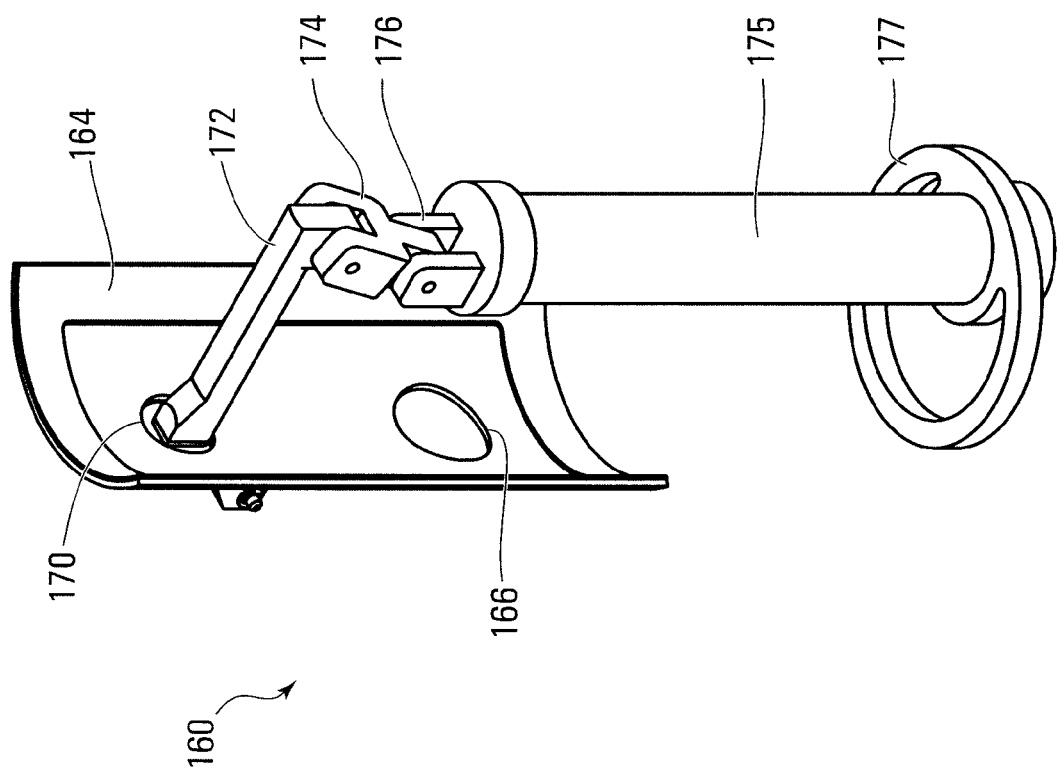
Figure 32:
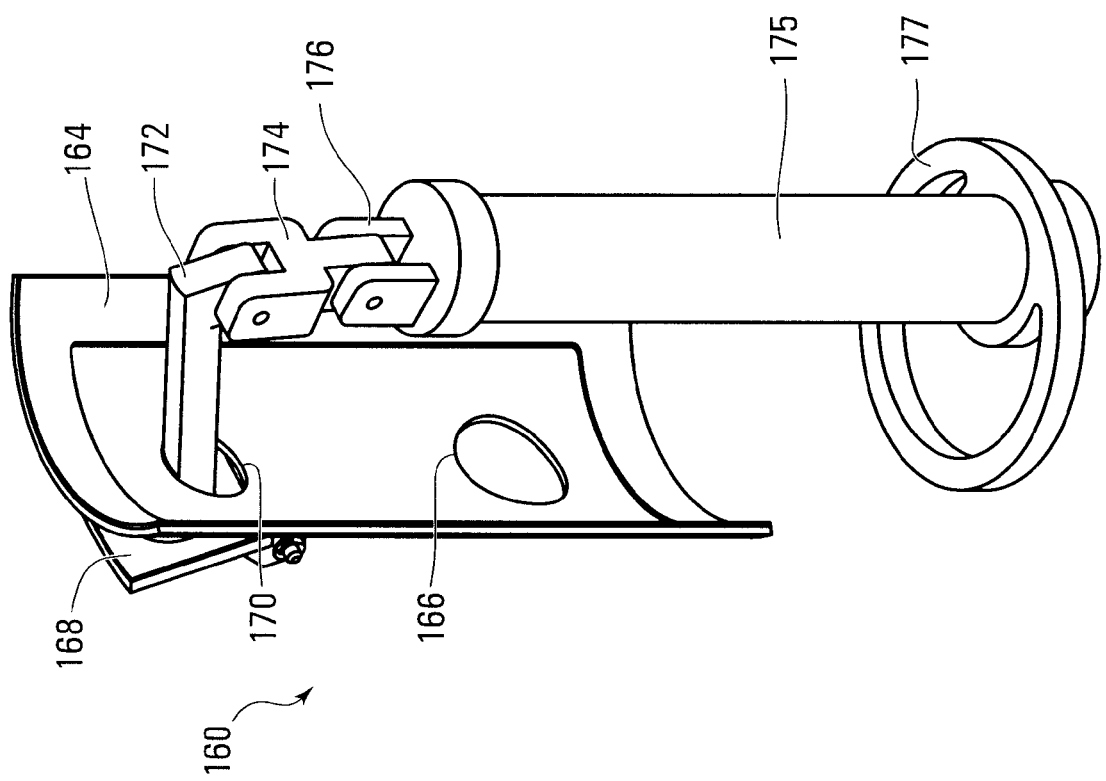

Internal details of the example float valve 160 are shown in FIGS. 31 and 32. The valve cover 168 is coupled to an arm 172, which in turn is coupled to a float assembly through two brackets 174, 176 in the example shown. The float assembly includes two components, which in the illustrated example are an elongate component 175 and an attached component 177 having a shape which corresponds to the interior shape of the standpipe 164 and aids in maintaining the elongated component in a vertical orientation within the standpipe.

The example float valve 160 prevents the standing height of the fluid column within the standpipe 164 from rising beyond a maximum height in the event that the vacuum tube gets blocked for an extended period of time. When the fluid column rises in the standpipe 164 as described above, the float assembly 175/177 also rises, which actuates the valve and moves the valve cover 168 from its closed position in FIGS. 29 and 31 to its open position in FIGS. 30 and 32. This uncovers the valve opening 170, which increases the air pressure (by decreasing the vacuum) in the standpipe 164 and thus prevents the fluid column from rising any further.

The maximum height of the fluid column which actuates the float valve 160 is influenced by a number of factors, including the total weight of the internal components shown in FIGS. 31 and 32, the buoyancy of the float assembly components 175, 177, the force needed to move the valve cover 168, and the lengths of the arm 172 and the elongate float assembly component 175. Setting this maximum fluid column height above the height that is expected during normal operation of a waste handling system would allow the fluid column height to be limited without impacting normal operation.

Figure 33:
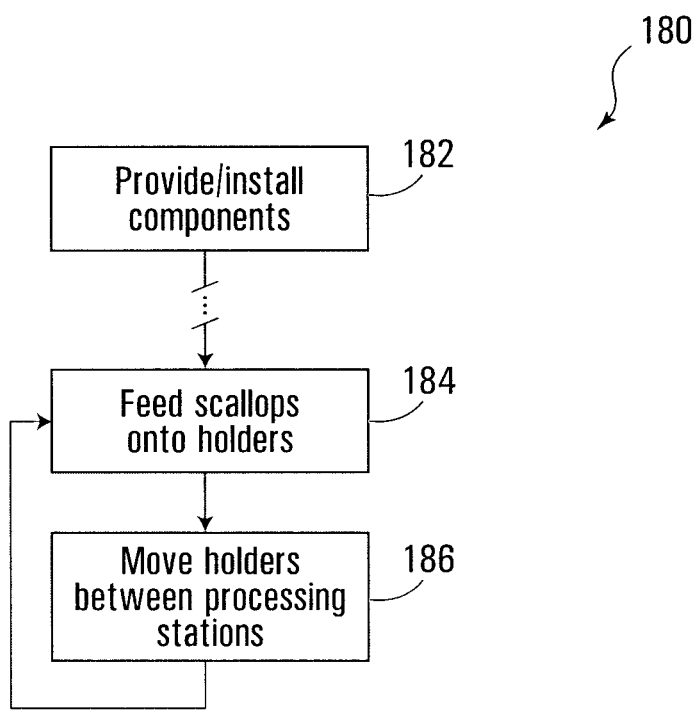
FIG. 33 is a flow diagram illustrating a method according to an embodiment of the invention.

Although described above primarily in the context of a machine and components thereof, aspects of the invention may be embodied in other forms, such as methods. FIG. 33 is a flow diagram illustrating a method according to an embodiment of the invention.

The example method 180 includes task 182 of providing and installing components of a scallop processing machine. This might involve providing such components as holders to hold scallops, stations for processing the scallops, and a driving arrangement to move the holders between the processing stations. The processing stations could include one or more of the stations described above, such as a shell cut station, a first muscle cut and shell detach station, an air blast station or multiple air blast stations in the example machine 10 (FIG. 1), a vacuum station, and a second muscle cut station. A control arrangement to control at least the first muscle cut and shell detach station, the air blast station, and the second muscle cut station is also provided in some embodiments.

As noted above, a detector could be provided at the second muscle cut station to detect presence of a scallop, and a shell release station could be provided at the second muscle cut station or as a separate station.

Installation of machine components might involve connecting electrical components to an electrical power supply. In some embodiments, several machine components are air or vacuum powered. Venturi arrangements of each holder in a suction grip implementation could be coupled to a source of compressed air during installation, and at least the air blast station(s) and/or the vacuum station could be coupled to the same compressed air source.

A vacuum source could similarly be shared in other embodiments by coupling that source not only to the vacuum station, but also to the air blast station and/or venturi arrangements of each holder.

Once the machine installation is complete, scallops are fed onto the holders at 184. Actual usage of the machine beginning at 184 need not immediately follow the machine installation. There may be some time between installation of a machine and usage of the machine. There could also be some delay between building and installation of a machine. More generally, building, installation, and use of a machine could potentially be performed by different entities and/or at different times.

The holders are moved between the processing stations at 186 to process the scallops that have been fed onto the holders. The feeding and processing of scallops may be an ongoing process, as represented in FIG. 20 by the return path from 186 to 184.

The example method 180 is illustrative of one embodiment of the invention. Variations are possible. For example, different parties could be responsible for providing machine components, assembling those components into a machine, installing the machine, and/or using the machine. Therefore, only parts of a method might be performed by a particular party at any time.

Embodiments of the invention provide for automated processing of scallops using a machine modular design which also facilitates cleaning and maintenance.

A machine of the type disclosed herein could potentially be lifted or wheeled into place aboard a ship by one or two people, installed within minutes, and operated right away with higher output yields (quality) and quantities than existing shucking approaches. There is minimal interruption in existing onboard equipment, and the machine has a very small energy and physical footprint. The design is modular in overall and sub-part construction, to allow for ease of troubleshooting, maintenance, and part inventory and replacement.

A modular design might also allow substantially the same base machine to be adapted for processing other types of products. For example, different shapes of suction grips could be used for bivalve molluscs such as scallops, oysters, mussels, clams, etc., to provide for automated shucking of other species in addition to or instead of scallops. A vessel or processing facility could include multiple machines having different types of holders for processing different products, for instance. Also, depending on the product being processed, different collections of processing stations could be provided. In the case of mussels, for example, the viscera is actually part of the edible product and therefore the air blast stations and vacuum station might not be installed in a mussel processing machine. When mussels are cooked, their shells open, and therefore a machine for processing cooked mussels might not include a shell cut station. These options are intended to be illustrative of how a modular processing machine could be adapted for processing different species. Knife blade shapes and/or sizes could be different for different types of products as well. Other types of adaptations may be or become apparent to those skilled in the art.

The overall equipment envelope is small enough to allow a processing vessel to carry multiple fully operational spare machines, and swap them in or out of a scalable production line to deal with break-downs, process increases or decreases, maintenance issues etc. Machines could also be arranged in parallel or even stacked vertically and operated simultaneously to increase production.

What has been described is merely illustrative of the application of principles of embodiments of the invention. Other arrangements and methods can be implemented by those skilled in the art without departing from the scope of the present invention.

For instance, the example machine 10 is implemented with a holder arrangement 12 in the form of a vertically oriented wheel. In another embodiment, a horizontal wheel could be used, and this might allow for easier and more reliable automatic loading of scallops and therefore higher throughput. A horizontal orientation might also be less size constricted and able to handle a larger range of scallop sizes than a vertical arrangement.

It might also be possible to implement embodiments of the invention using a linear chain conveyor style drive that achieves the same goals in a smaller (or more convenient) overall form factor.

The example machine 10 might embody additional features which could be or become apparent to a skilled person. For example, a "mechanical fuse" or clutch function might allow for the wheel which carries the holders to stop turning under relatively light pressure. This could be useful, for example, to prevent harm to product, the machine, or the operator should something get jammed, or to allow an operator to momentarily stop the wheel with one hand as a holder is loaded with a scallop with the other hand. In the example machine 10, this function could be inherent by letting the drive belt 79 (FIG. 11) slip. The slip pressure is determined by such parameters as belt tension and the type of drive coupling used to allow the belt 79 to drive the spindle 42 (FIG. 8). Other types of clutch arrangements, such as a magnetic slip clutch, are also contemplated.

Other contemplated variations relate to the size, guide, and angle or path of travel of the striking element at the first muscle cut and shell detach station.

For example, while the cutting blade at this station might be made from spring steel to allow the cutting blade to follow the inside surface of a scallop shell as described above, the striking blade could be made from stiffer material. A guide block for the cutting blade has been described above as being plastic in one embodiment. This guide block is a spring stainless steel piece in another embodiment.

Regarding the angle or path of travel of the striking element, the cutting blade and the striking element at the first muscle cut and shell detach station have different paths of travel in an embodiment described in detail above. According to a further embodiment, the striking element runs directly through the same guide slot as the cutting blade. This tends to enable the leading edge of the striking element to enter or at least engage an edge of the opening that has been cut into a scallop shell. Reliability of the shell detach operation is increased, since the striking element contacts the shell in a more controllable manner, rather than being deflected outside and over the shell after initial contact.

In order to assist with fully detaching the first shell, a water blast nozzle could be added between the first muscle cut station and the air blast station. This nozzle might provide a continuous stream of water, illustratively in a direction that is substantially parallel to the axis of the holder arrangement in the embodiments described above. A continuous stream would be directed to contact a shell of a scallop only when the shell has been at least partially detached from the held shell, and otherwise to clear the held shell and the adductor muscle if the shell has been completely detached, to avoid damage to the adductor muscle or knocking the held shell from its holder. An intermittent blast could instead be used. A water blast would be useful in the event that the striking element partially but does not fully detach the top shell after the first muscle cut, for example.

Figure 34:
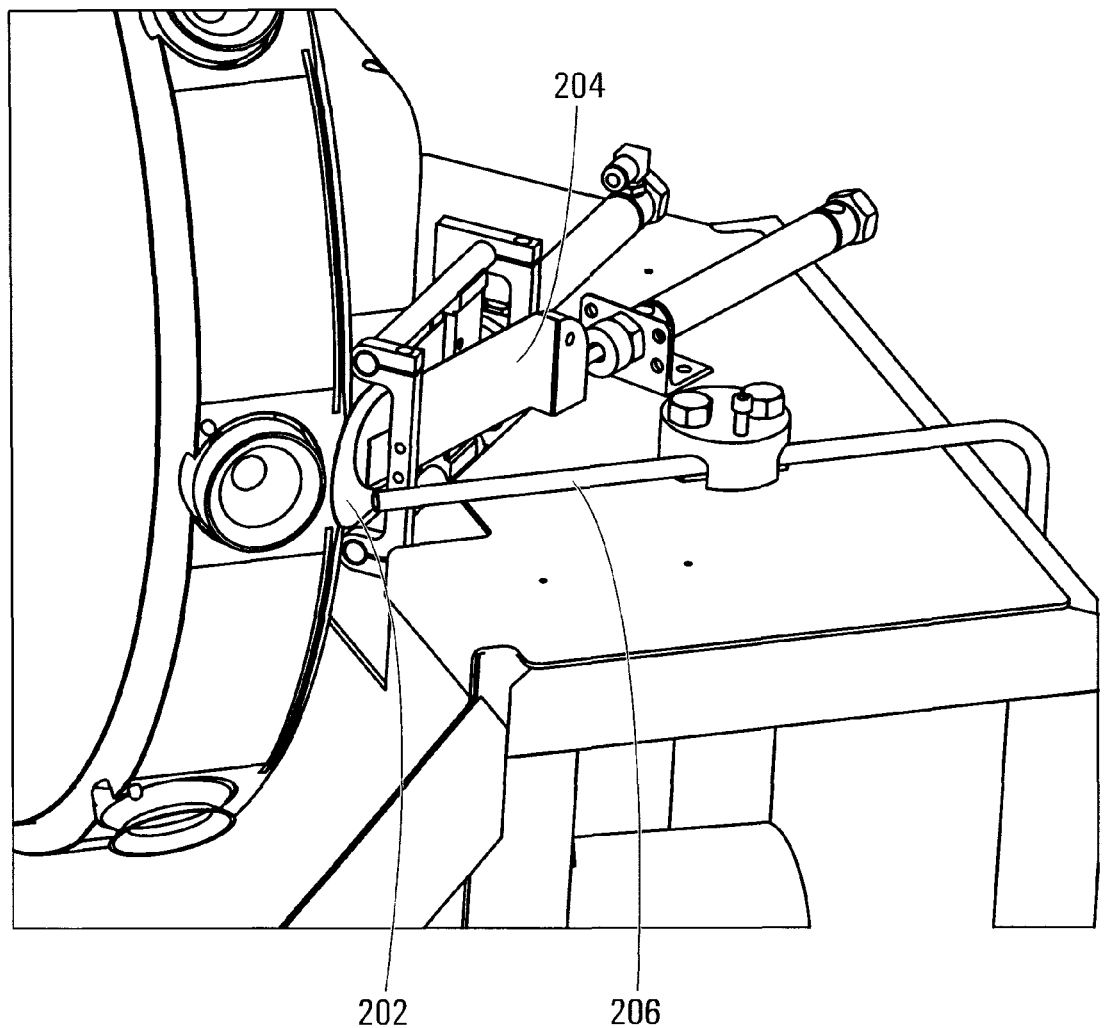
FIGS. 34 to 36 are views of another example first muscle cut and shell detach station.
Figure 35:
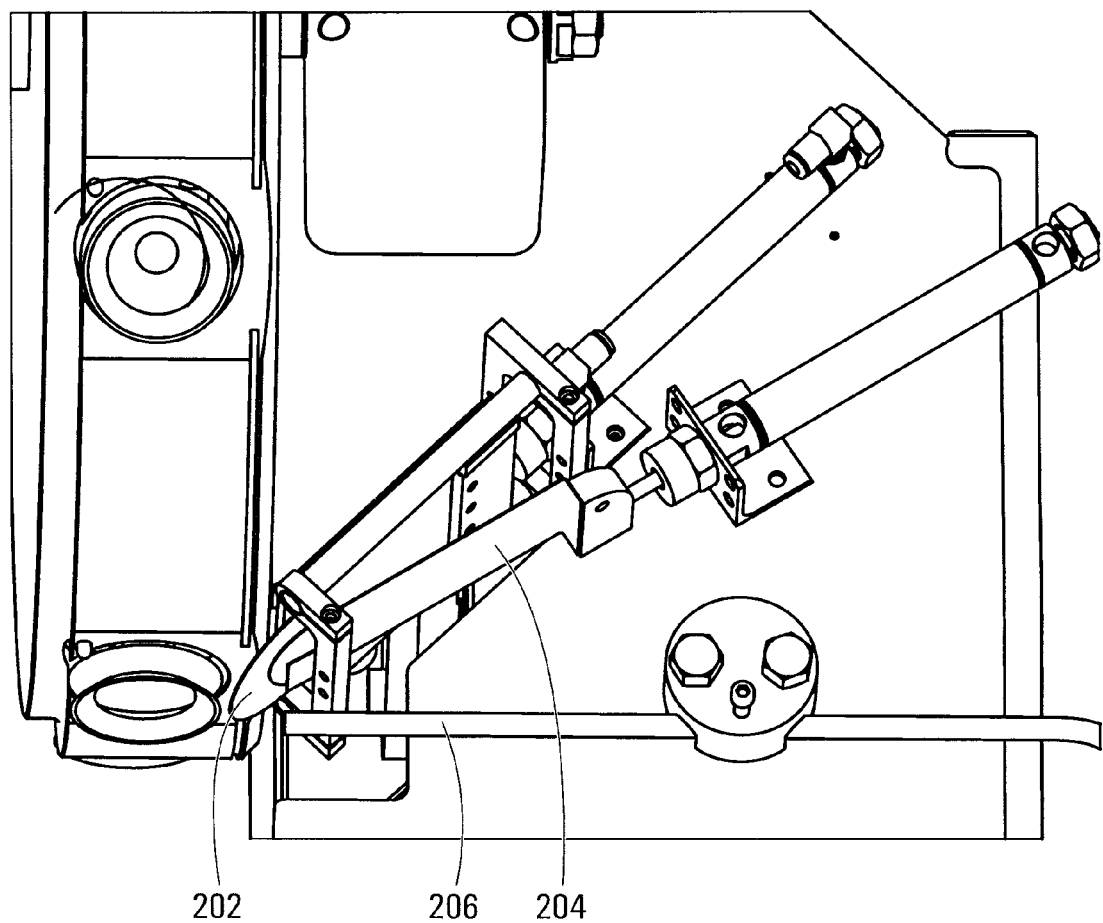
Figure 36:
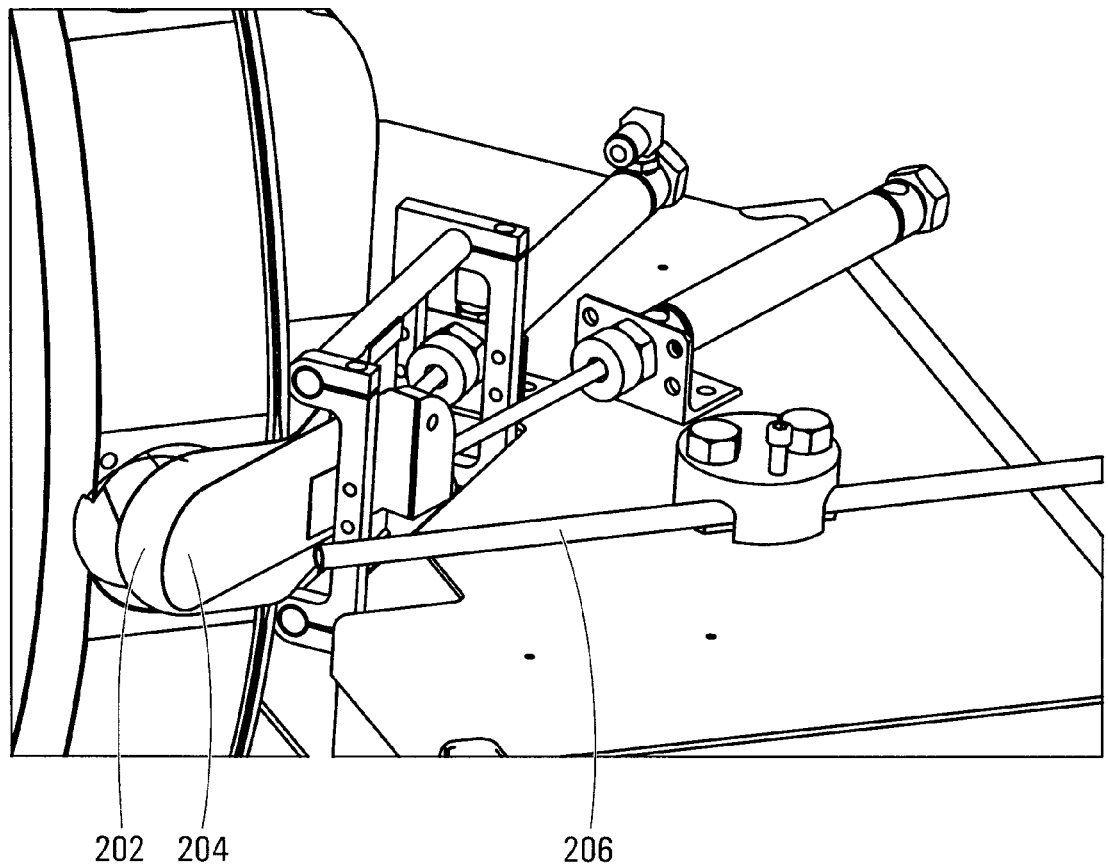

Variations relating to the striking element and shell knock-off are shown in FIGS. 34 to 36, which include views of another example first muscle cut and shell detach station. In this example, the cutting blade 202 and the striking element 204 are shown as moving through the same guide slot. In FIGS. 34 and 35, both the cutting blade 202 and the striking element 204 are in their retracted positions, and in FIG. 36 both are extended. The cutting blade 202 is shown in FIG. 36 in a bent position which reflects the position that the blade would take inside a shell following the first muscle cut. As described above, the cutting blade 202 remains extended while the striking element 204 is fired, to protect the cut adductor muscle from damage by the striking element.

FIGS. 34 to 36 also show a water blast line 206 next to the striking element 204, but substantially parallel to an axis of the holder arrangement. Although not explicitly shown, this water blast line 206 could be fitted with a nozzle. It is also contemplated that the position of the water blast line 206 and/or a nozzle could be adjustable to allow the direction of the water blast to be changed, depending on the size of scallops to be processed, for example.

A stationary bar is another example of an element that could be added after the first muscle cut and shell detach station, to remove a knocked off shell that is nearly fully detached but hanging from the held shell by viscera. A bar that runs in a direction parallel to the axis of the holder arrangement described above but is offset radially from the holders, for instance, could be used to catch hanging shells, which would be pulled from the held shells as the holder arrangement moves. This would avoid the hanging shells interfering with subsequent processing stations. Such a bar could be positioned, for example, toward the bottom of the machine, to catch partially detached shells before a holder moves to the vacuum station. The bar could have a serrated edge or other edge profile to aid in catching and detaching partially detached shells.

In the example waste handling arrangement shown in FIG. 27, water feeds into the standpipe 154 from the bottom. Another embodiment includes a feed-water arrangement for feeding water into the standpipe 154 from a higher location, such as above the maximum level of the fluid column. This can provide for more reliable flushing of the standpipe 154 even when a large amount of viscera has collected in the standpipe.

The example float valve shown in FIGS. 29 to 32 could also be subject to variations in design. For example, a larger vacuum inlet 166 would enable vacuum pressure to be "dumped" faster and by a larger amount. This results in a greater and faster increase in air pressure inside the standpipe 154, and thus a more reliable flush of the standpipe when the vacuum inlet 166 opens. The float valve itself could be modified from the design shown to increase its tolerance to the presence of viscera. Viscera would be better able to move past the float assembly component 177, for instance, if that component had greater clearance from the inside surface of the standpipe 154.

Large amounts of viscera in the standpipe 154 or the float valve becoming stuck open can affect operation of the vacuum station. A stuck valve results in less suction and thus less effective removal of viscera prior to the second muscle cut station. It is contemplated to add a visual indicator to alert an operator of these conditions. The operator can then check the waste handling system instead of continuing to load scallops for processing, which can actually worsen operational issues with waste handling and/or result in lower quality end product.

It should be appreciated that simpler waste handling systems are also contemplated. Viscera and possibly other waste could be collected in one or more hoppers or holding tanks, for example, which could be emptied and/or cleaned periodically such as between operator shifts.

At the vacuum station, it could be useful to enable tuning in respect of the location of the vacuum inlet relative to the holder arrangement and thus scallops which are being processed. An adjustable mounting system would allow the vacuum tube to be moved by an operator closer to or further from the holder arrangement, depending on the size of scallops to be processed.

For shell release after processing of a scallop, the manner in which air flow in the venturi arrangements is altered could be varied, for example, by altering the air flow to a larger degree and/or for a longer period of time, illustratively by changing the size and/or shape of an air nozzle at the release station, to improve reliability of the shell release.

Figure 37:
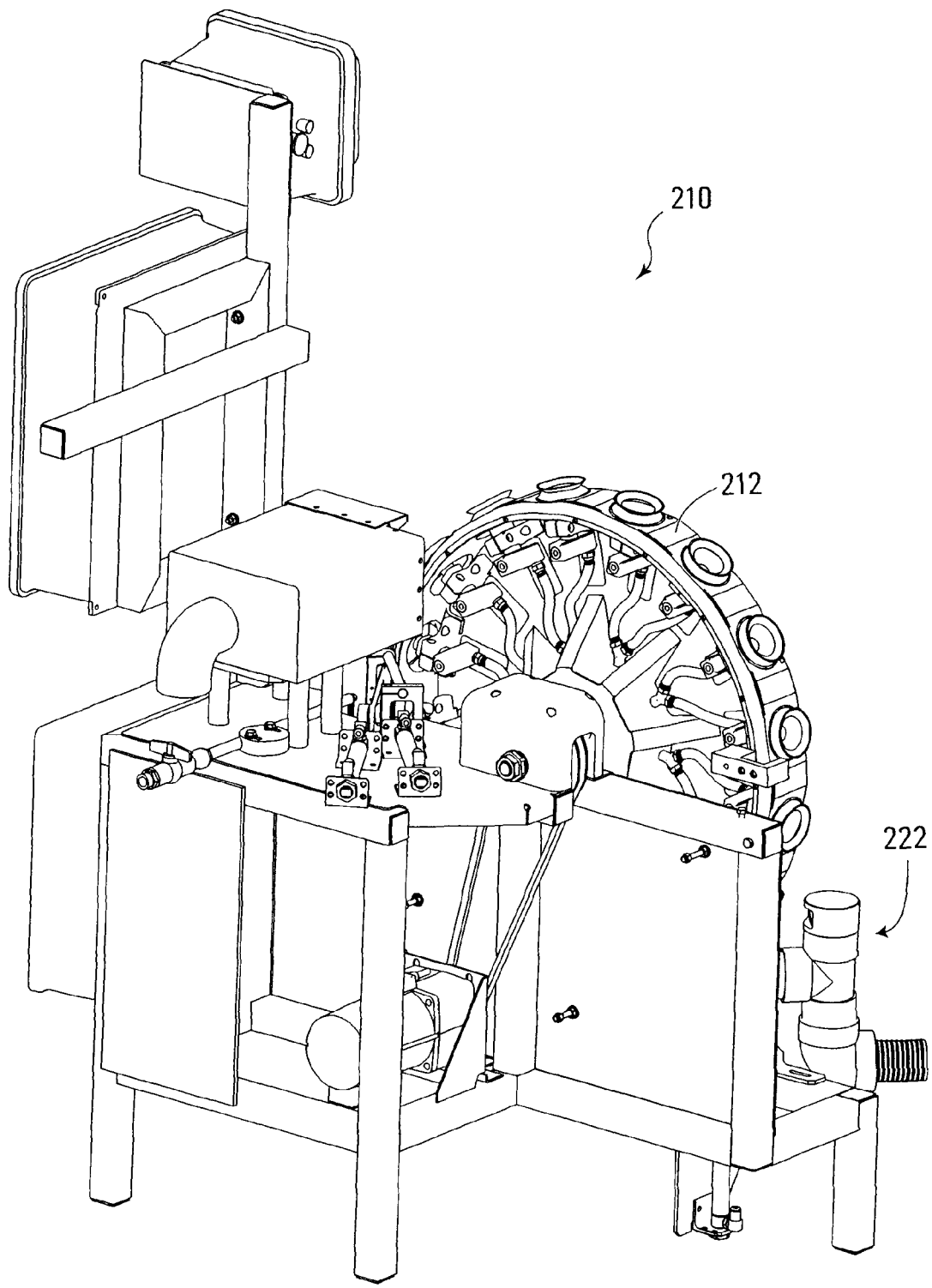
FIG. 37 shows a scallop processing apparatus according to another embodiment of the invention.
Figure 38:
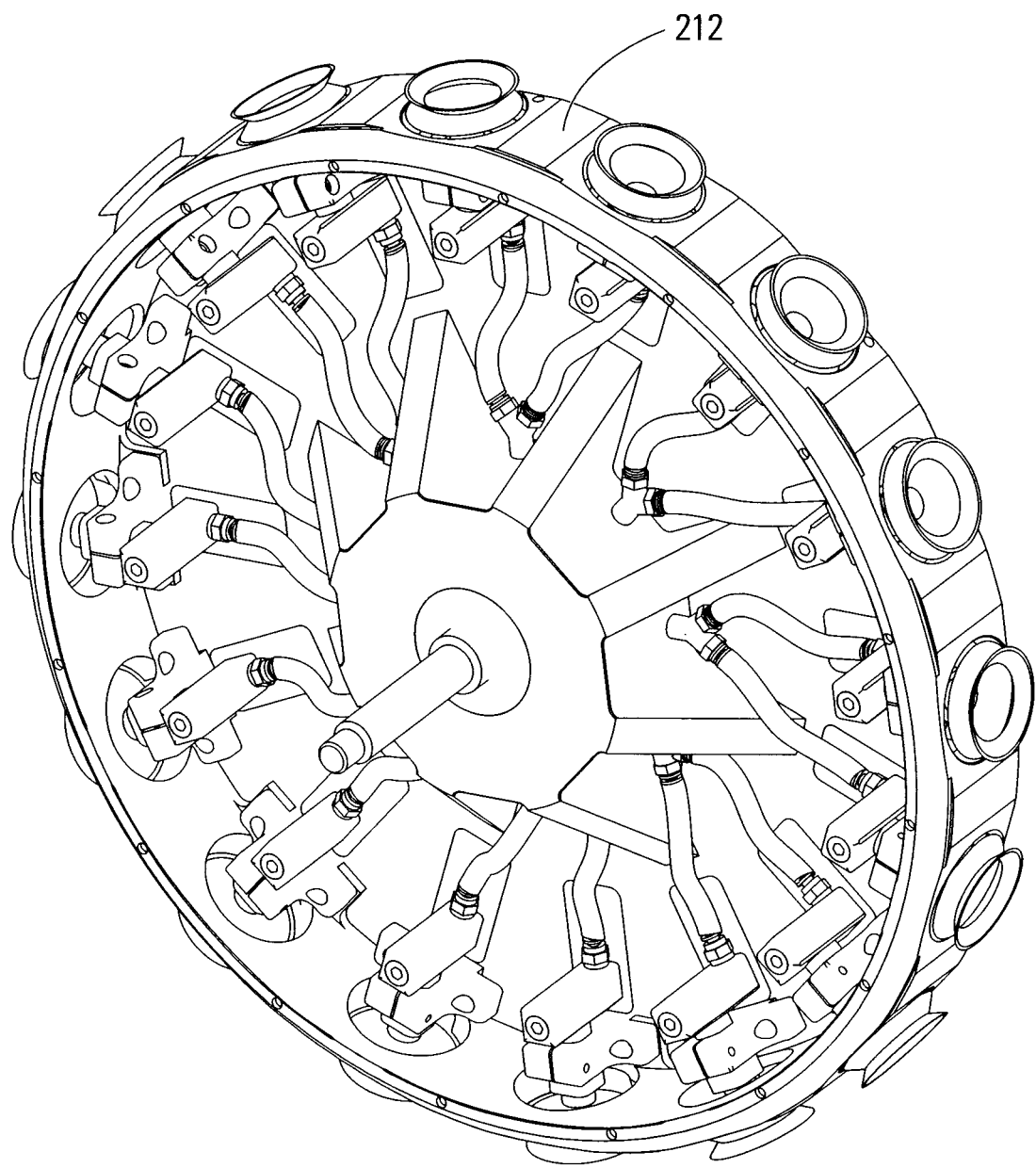
FIG. 38 shows a holder arrangement in the example apparatus of FIG. 37.

Additional variations are also contemplated. As noted above, the example vertical wheel 12 represents one possible embodiment of a holder arrangement. In other embodiments, a wheel-type holder arrangement could provide more or fewer than the 8 holders shown, for example, in FIG. 1. FIG. 37 shows a scallop processing apparatus 210 according to another embodiment of the invention, and FIG. 38 shows the holder arrangement 212 in detail. The example holder arrangement 212 includes 16 holders instead of the 8 holders in the example holder arrangement 12. A 16-holder arrangement 212 could be rotated more slowly than an 8-holder arrangement 12 while still processing the same number of scallops. This might make loading of scallops onto each holder somewhat easier since the holders are moving at a lower speed. Other parameters, such as air supply pressure and/or flow, could be adjusted to accommodate the different number of holders in the example holder arrangement 212.

From a comparison of FIGS. 7 and 38, it will also be apparent that the example holder arrangement 212 does not include the indexing pins 43 of the example holder arrangement 12. While the indexing pins 43 are provided in some embodiments, these pins are optional. Loading of scallops onto each holder might be faster where the scallops can be placed in roughly the same orientation rather than a more exact orientation that is set by the indexing pins 43.

Figure 39:
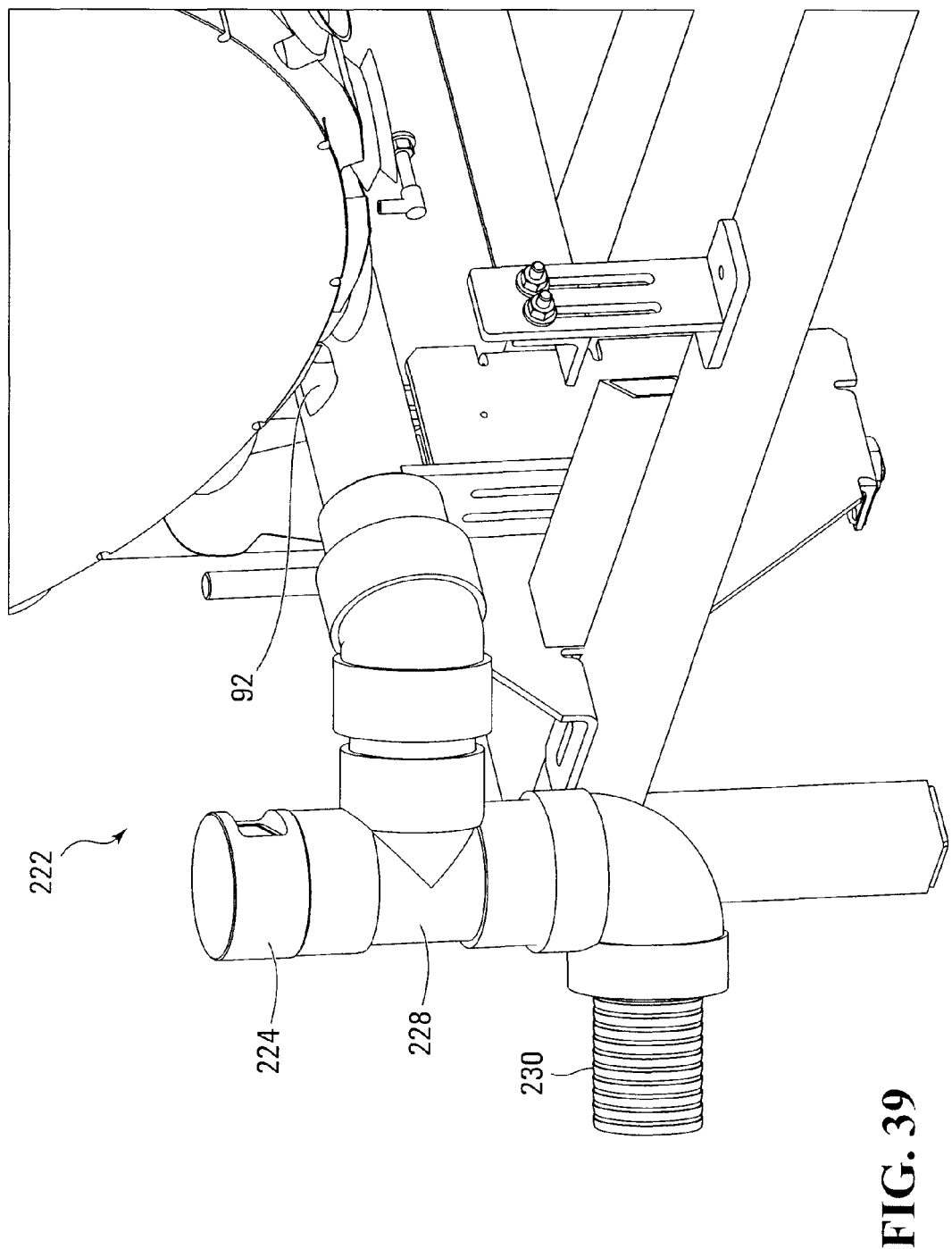
FIGS. 39 to 41 show views of a vacuum station in the example apparatus of FIG. 37.
Figure 40:
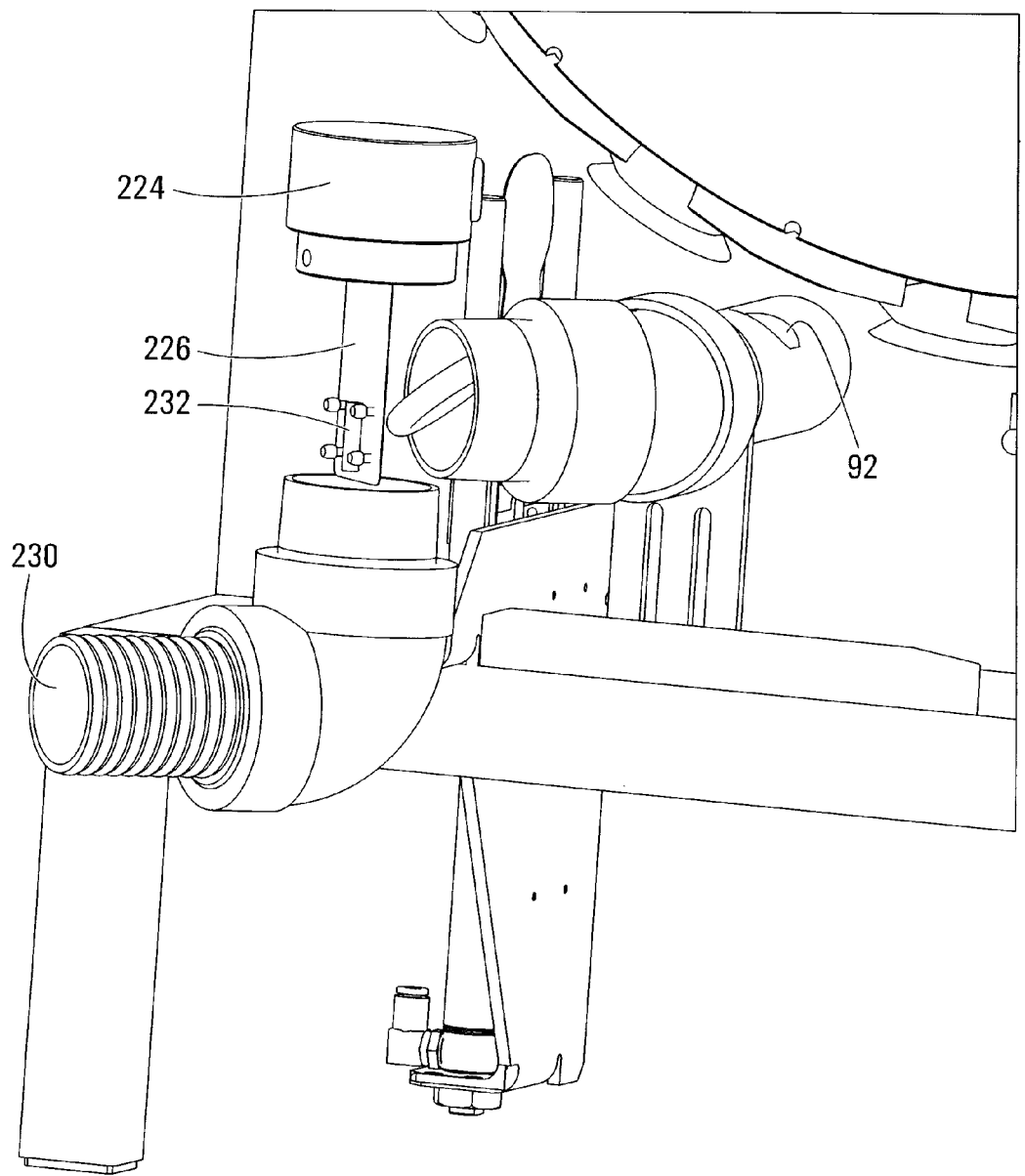
Figure 41:
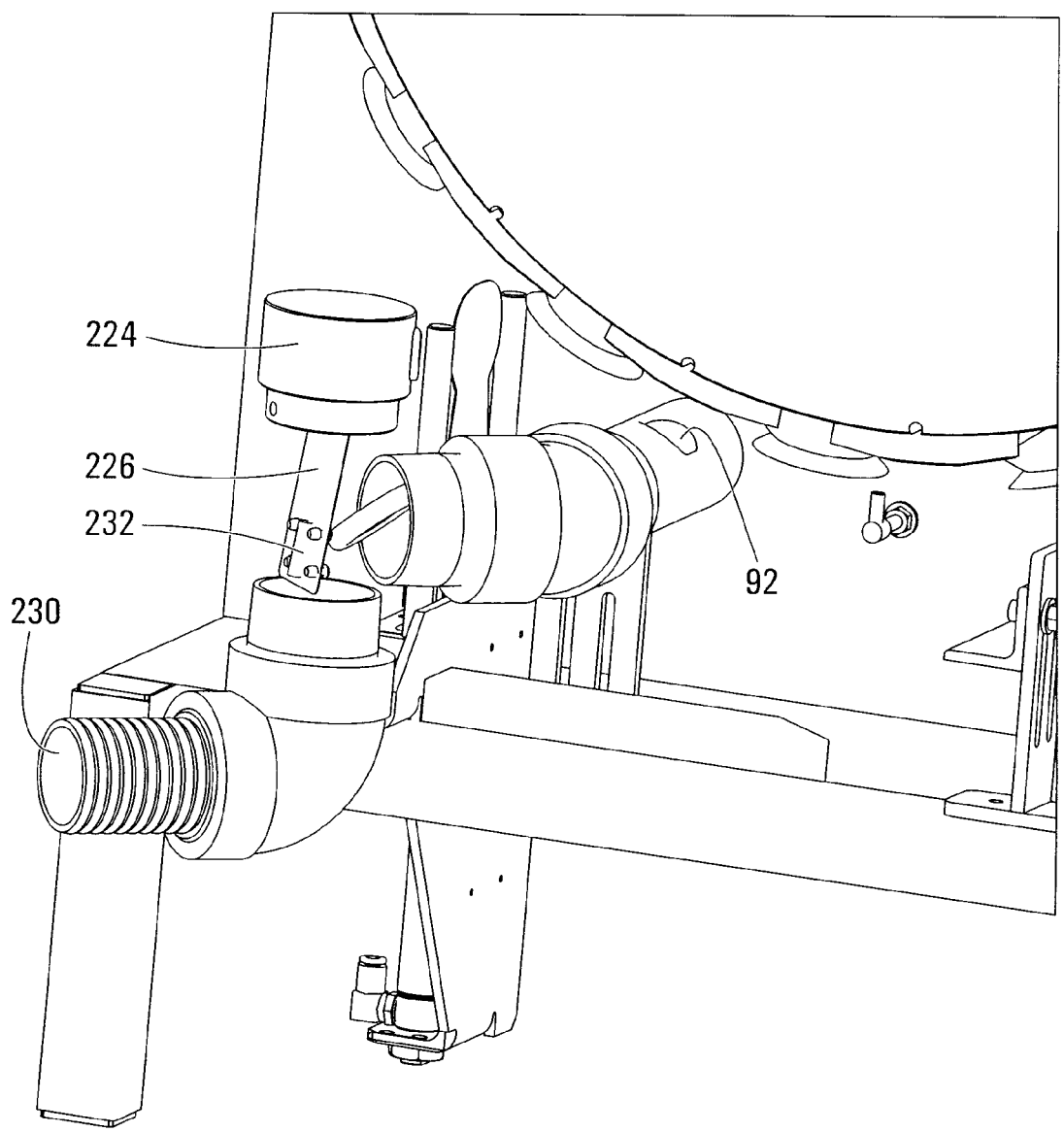
Figure 42:
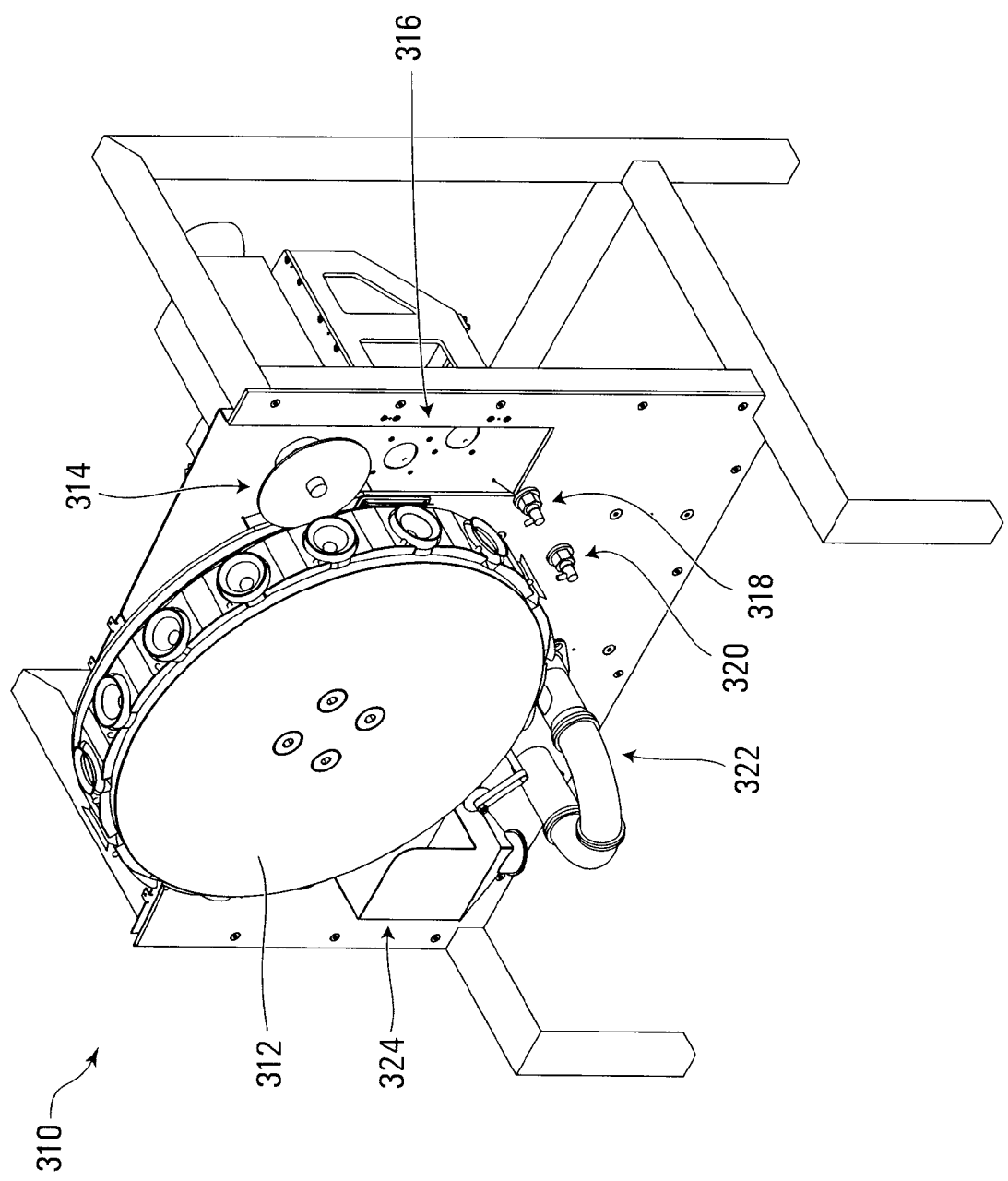
FIGS. 42 to 52 are views of a scallop processing apparatus according to a further embodiment of the invention.
Figure 43:
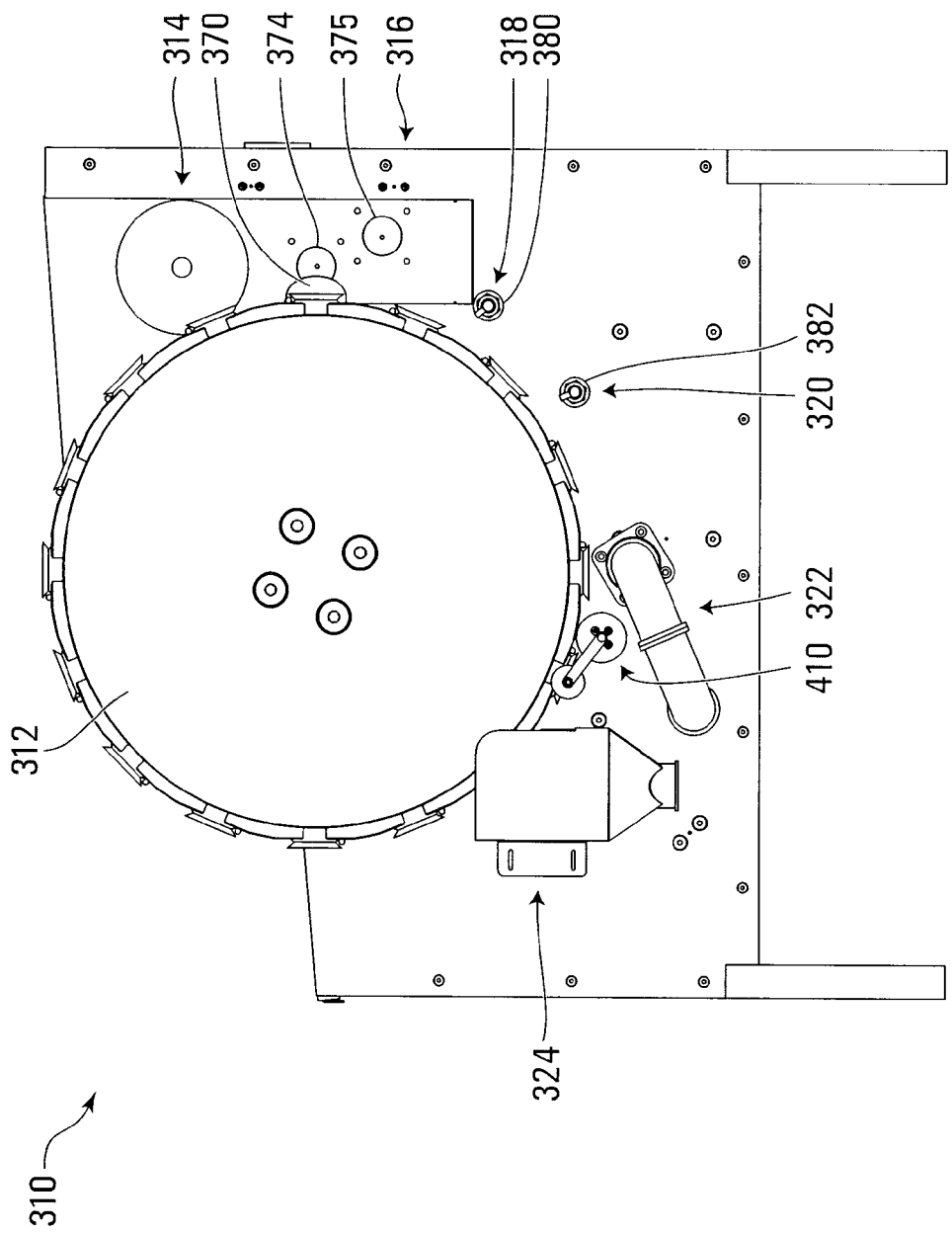
Figure 44:
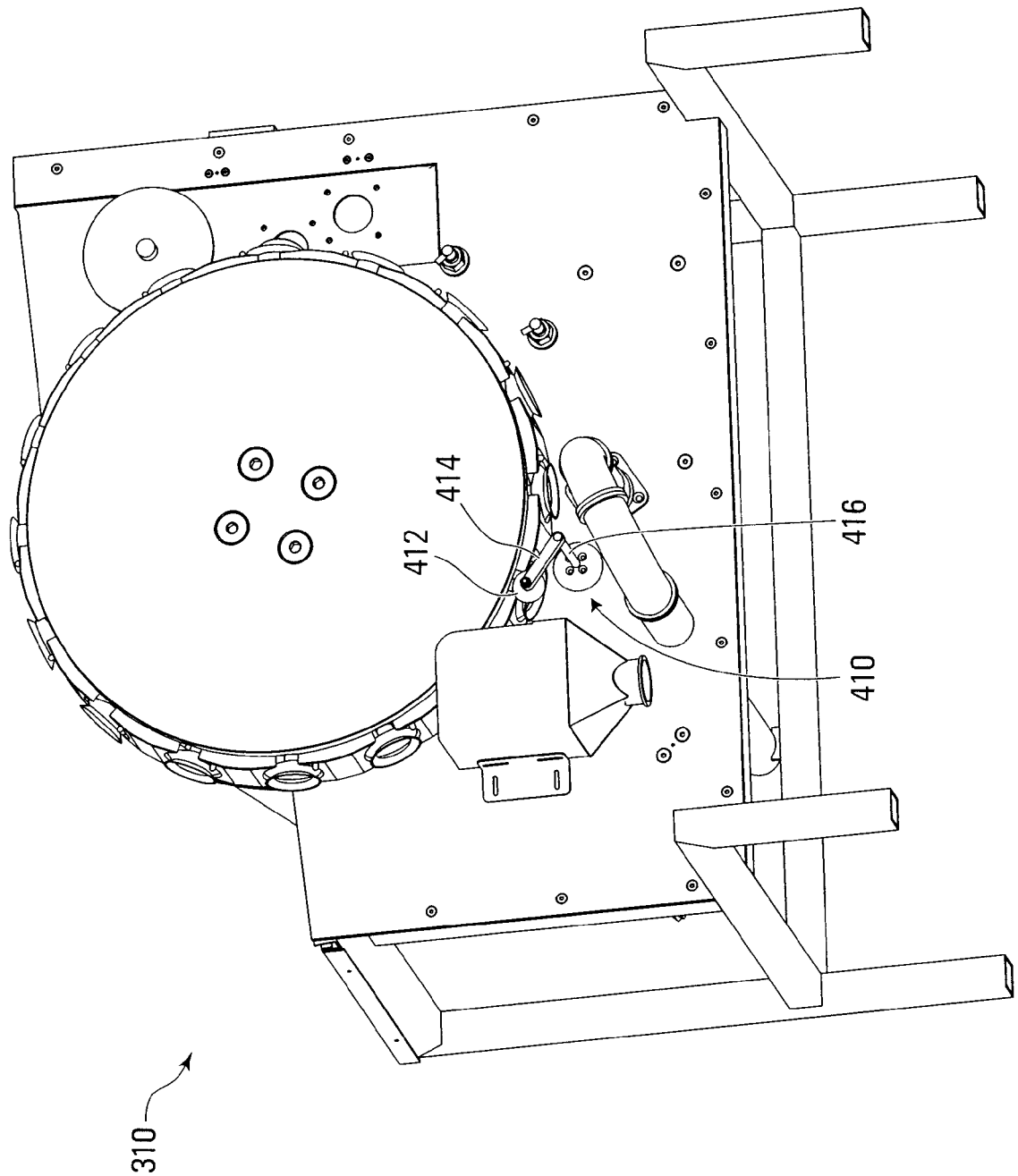
Figure 45:
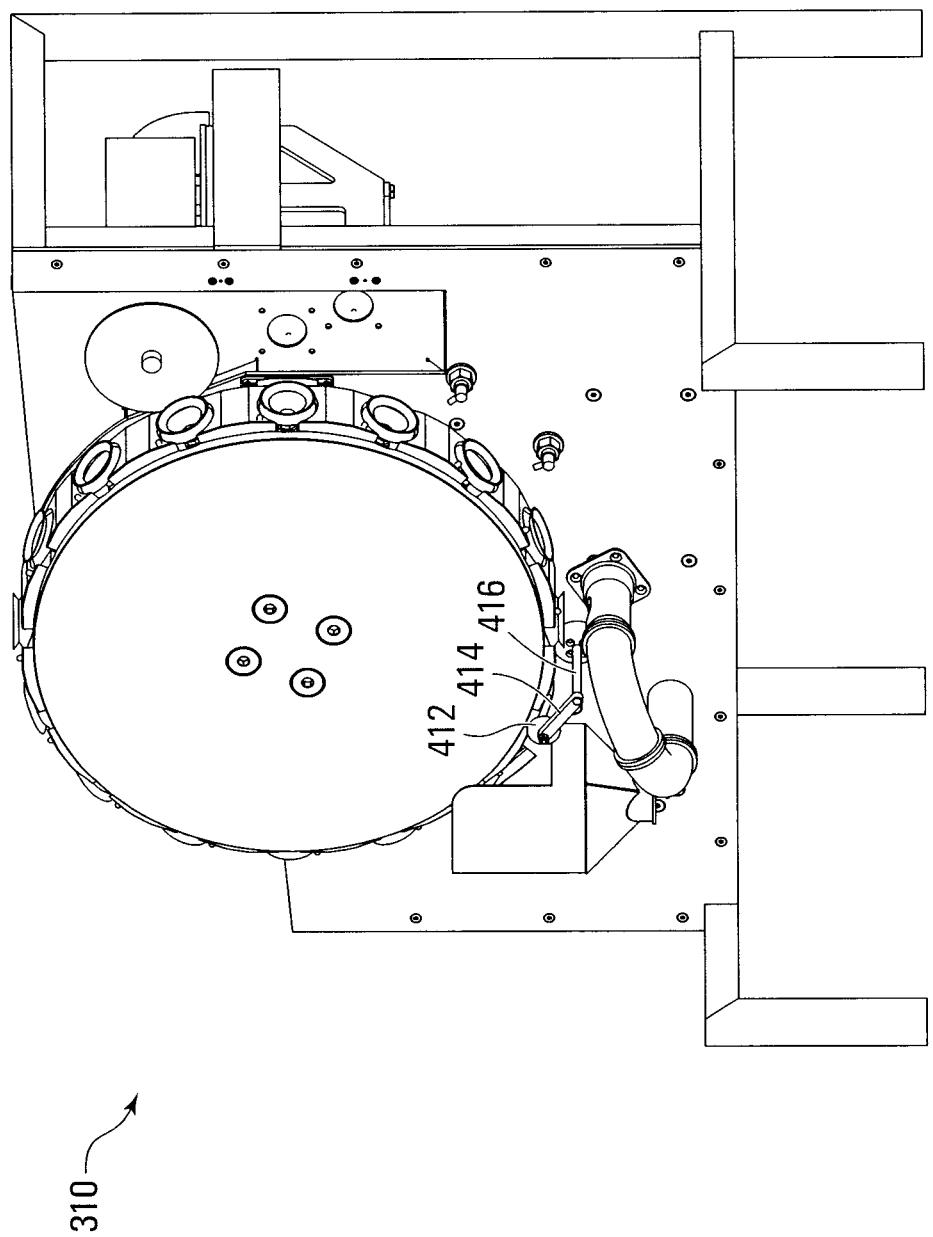
Figure 46:
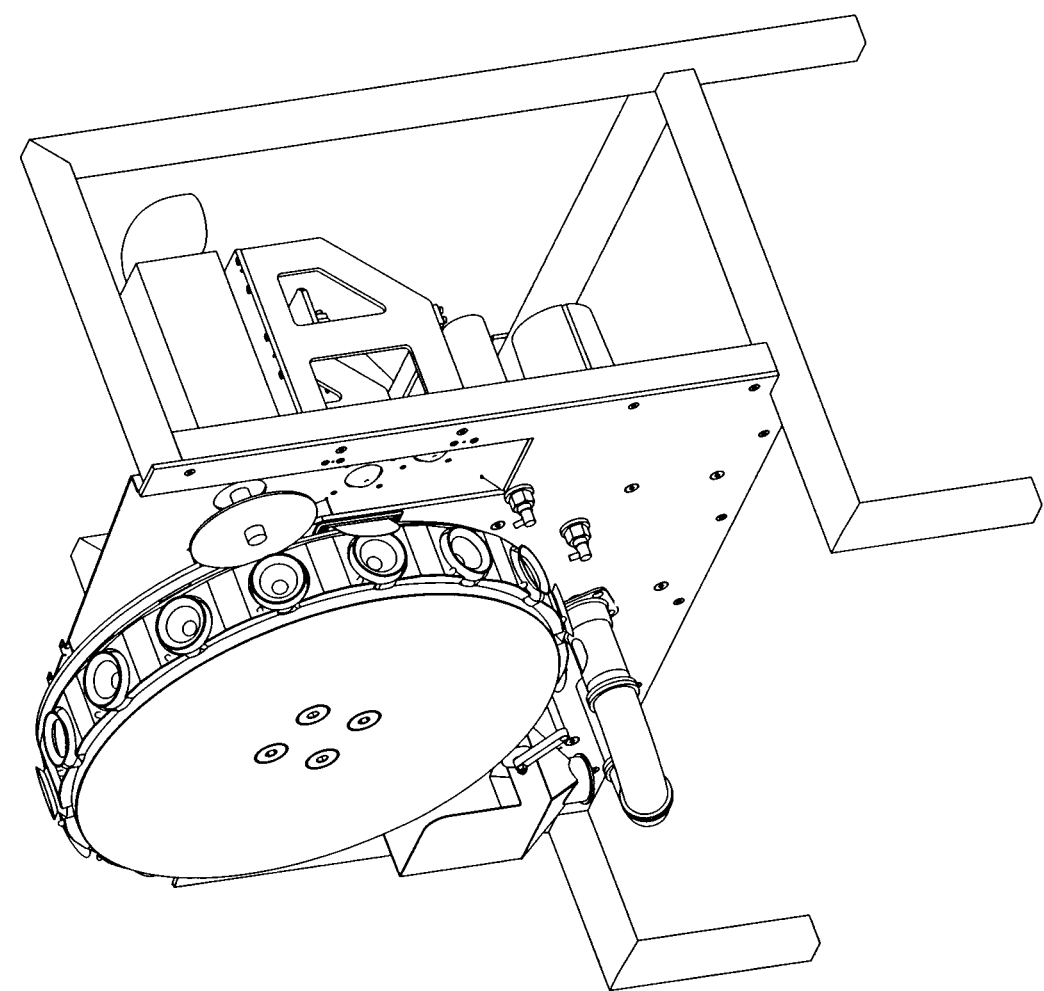
Figure 47:
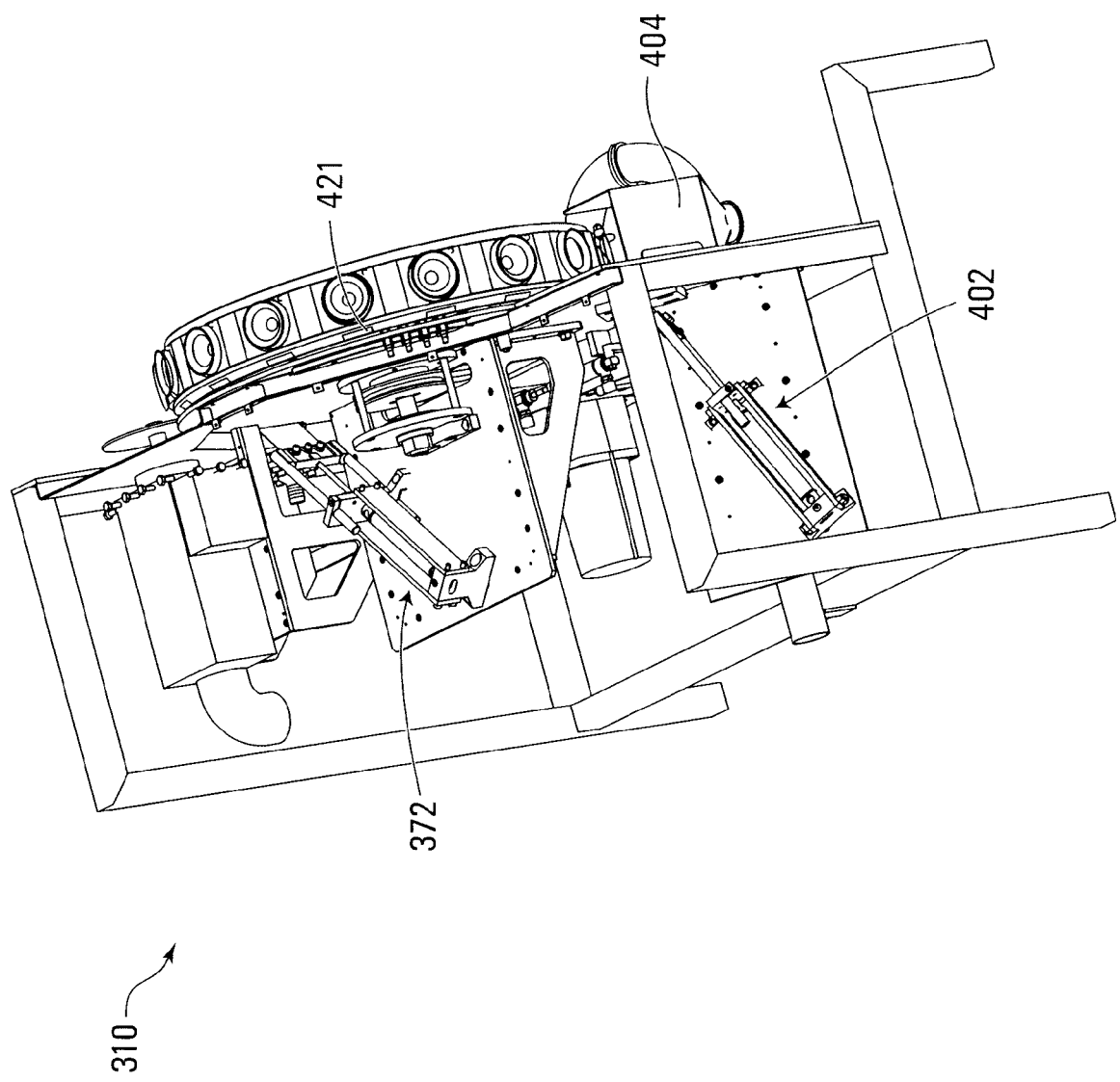

The example scallop processing apparatus 210 also includes an impulse sensor at the vacuum station 222. FIGS. 39 to 41 show views of the vacuum station 222, in which additional elements are provided between the vacuum inlet 92 and a vacuum source.

As shown, a T-joint 228 is used to couple the vacuum station 222 to a vacuum source through the tube or hose 230. Inside the T-joint 228 (See FIGS. 40 and 41) is a blade 226 which carries a magnet 232. The blade 226 is anchored to a cap 224, which includes an opening that provides access to the blade anchor or mount. During operation, this opening can be covered to avoid air leakage, which in turn could affect operation of the vacuum station 222.

The T-joint 228 is shown in FIG. 39 but not in FIGS. 40 and 41 in order to more clearly illustrate internal components of the example impulse sensor. This element could be implemented, for example, as a modified white PVC T-joint, and would be in place as shown in FIG. 39 during operation of the vacuum station 222.

Operation of the example impulse sensor is perhaps best illustrated in FIGS. 40 and 41. The ring-shaped (toroid) object in these Figures is a representation of viscera being drawn toward the vacuum source from the vacuum station 222. Viscera that is removed from a scallop shell collides with the blade 226, illustratively a metal blade, and pushes the blade and the magnet 232 toward the wall of the T-joint 228. This brings the magnet 232 closer to a reed switch mounted outside the T-joint 228, illustratively on an outside wall of the T-joint, and actuates the switch. The viscera then drops off the blade 226 and continues toward the vacuum source and a waste management system.

In this way, a signal can be provided from the reed switch to a latching relay, to indicate that viscera has been removed from a scallop shell at the vacuum station 222, and that there is likely a shell and meat present. The cutting blade at the second muscle cut station can then be activated by timing magnets around the periphery of the holder arrangement 212, as described above. If no impulse is sensed (i.e., no viscera flow), then there is no latching and the cutting blade at the second muscle cut station does not fire. In some embodiments, a signal from the impulse sensor could also control the shell release station such that a shell, and its viscera and meat if there are any, remain in a holder and thus come into view of an operator. This provides the operator with visual feedback of a potential problem during processing, and retains a scallop for a second round of processing. A second cycle through the processing machine will often remove stubborn viscera, but if it does not, then the operator has a clear indication that something could be wrong. A series of empty shells remaining in holders could also be indicative of problems earlier in a processing cycle, such as where both viscera and meat are detaching from shells before the vacuum station 222.

Control of the second muscle cut station based on successful evisceration at the vacuum station 222 can also substantially reduce the number of adductor muscles which are cut from held shells that still contain viscera, thereby addressing potential quality issues associated with viscera entering a product stream.

An impulse sensor at the vacuum station 222 represents one possible alternative to a trigger assembly or detector 110 (FIGS. 22 to 24). Thus, such an impulse sensor could be implemented instead of a trigger assembly or detector, which might be more prone to reliability issues as a result of variations in shell sizes and/or orientations, buildup of processing by-products on a holder arrangement or trigger assembly elements, etc.

A reed switch and latching relay implementation as described above represents one example of an impulse sensor-based control arrangement. When the reed switch picks up for a current scallop, a signal can be sent to the latching relay, which latches a signal at an active (high or low) signal level. This latched impulse sensor signal can then be logically combined in an AND function with a holder position detection signal, where active high signals are used for instance, to control firing of the cutting blade at the second muscle cut station. The latching relay could then be reset for the next scallop at the vacuum station 222. Where the shell release station is also to be controlled based on evisceration, a second latch could be set by the impulse sensor or when the cutting blade at the second muscle cut station fires for instance, to ensure that an impulse sensing signal does not remain latched when a next scallop is ready for processing by the vacuum station 222.

Impulse sensor-based control could potentially be implemented in other ways, using an electronic controller, for instance.

FIGS. 42 to 52 are views of a scallop processing apparatus 310 according to a further embodiment of the invention. The holder arrangement 312, the shell cut station 314, and the air blast stations 318, 320 are substantially the same as in other embodiments described above.

The first muscle cut and shell detach station 316, like the station 16 for example, includes a blade 370 driven by an air cylinder 372. However, instead of a striking element, the first muscle cut and shell detach station 316 includes water nozzles 374, 375 to direct water streams or blasts toward the shell from which the muscle has been cut by the blade 370, to detach that shell from the shell that is held by the holder arrangement 312.

The blade 370 might remain in an extended or fired position to protect the cut muscle from the first water stream or blast by the nozzle 374, which is located next to the blade in the example shown. In one embodiment, the nozzle 374 directs a water stream or blast in a direction to catch an inside surface of the shell from which the muscle has been cut, and the blade 370 remains in its extended or fired position to protect the cut muscle during contact between the water stream and the shell. The direction of the water stream might be substantially parallel to a direction of travel of a shaft of the knife cylinder 372, for example, or more generally in a direction that enables the shell to be opened by the water stream or blast from the nozzle 374.

In the example apparatus 310, a second water nozzle 375 is located "downstream" of the nozzle 374. At this position, the shell from which the muscle has been cut should be at least partially detached from the held shell. The water stream or blast from the nozzle 375 is directed substantially across the face of the holder arrangement 312 in one embodiment, toward an expected position of the non-held shell if it has not already been detached from the held shell, to catch and complete detachment of the non-held shell from the held shell.

The water blasts from the nozzles 374, 375 could be at substantially the same or different pressures.

Although not explicitly shown in the drawings, shields could be provided to shield an operator of the apparatus 310 from the water blasts or streams at the first muscle cut and shell detach station 316.

The striking elements 74 (FIGS. 11 to 14) and 204 (FIGS. 34 to 36), and the nozzles 374, 375 (FIG. 43) represent examples of a shell detach mechanism to detach non-held shells from held shells following a first muscle cut.

Each air blast station 318, 320 includes a nozzle 380, 382 to direct an air stream or blast toward viscera which remains on the held shell after processing by the first muscle cut and shell detach station 316.

The vacuum station 322 may also be substantially the same as in other embodiments, with viscera being drawn into the vacuum intake 392. In the example apparatus 310, however, the vacuum tube is turned away from a front side of the holder arrangement, where an operator might stand to load scallops for processing.

The example apparatus 310 also includes a different type of detector 410 than in other embodiments. The detector 410 includes a wheel 412 coupled to a shaft 416 by a link 414. A driving and sensing arrangement 418 drives the shaft 416 to move the wheel 412 toward the holder arrangement 312 and senses whether the wheel encounters an obstruction, which would be a shell in a holder if a scallop has been processed by preceding stations and has not been dislodged from the holder.

Figure 48:
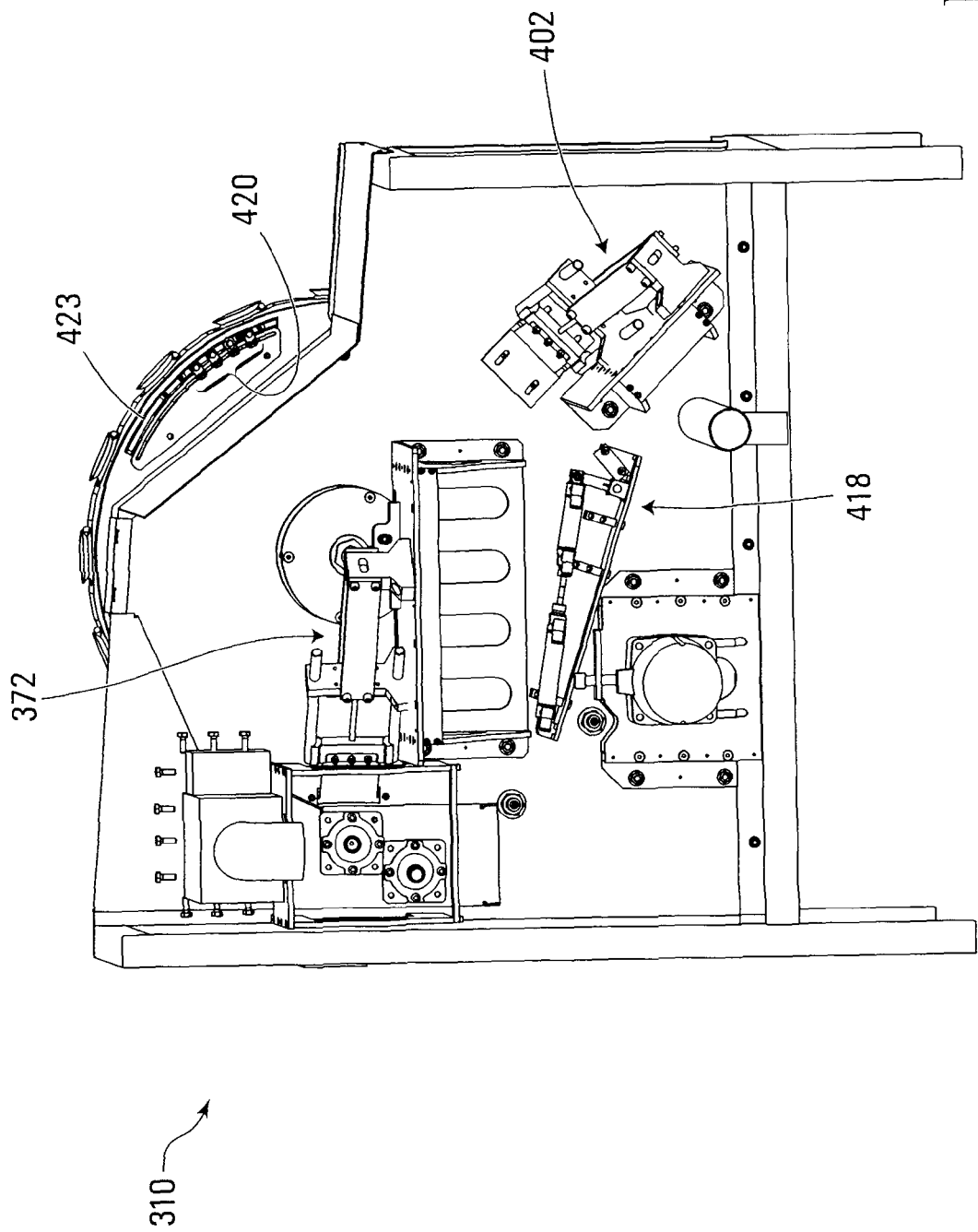
Figure 49:
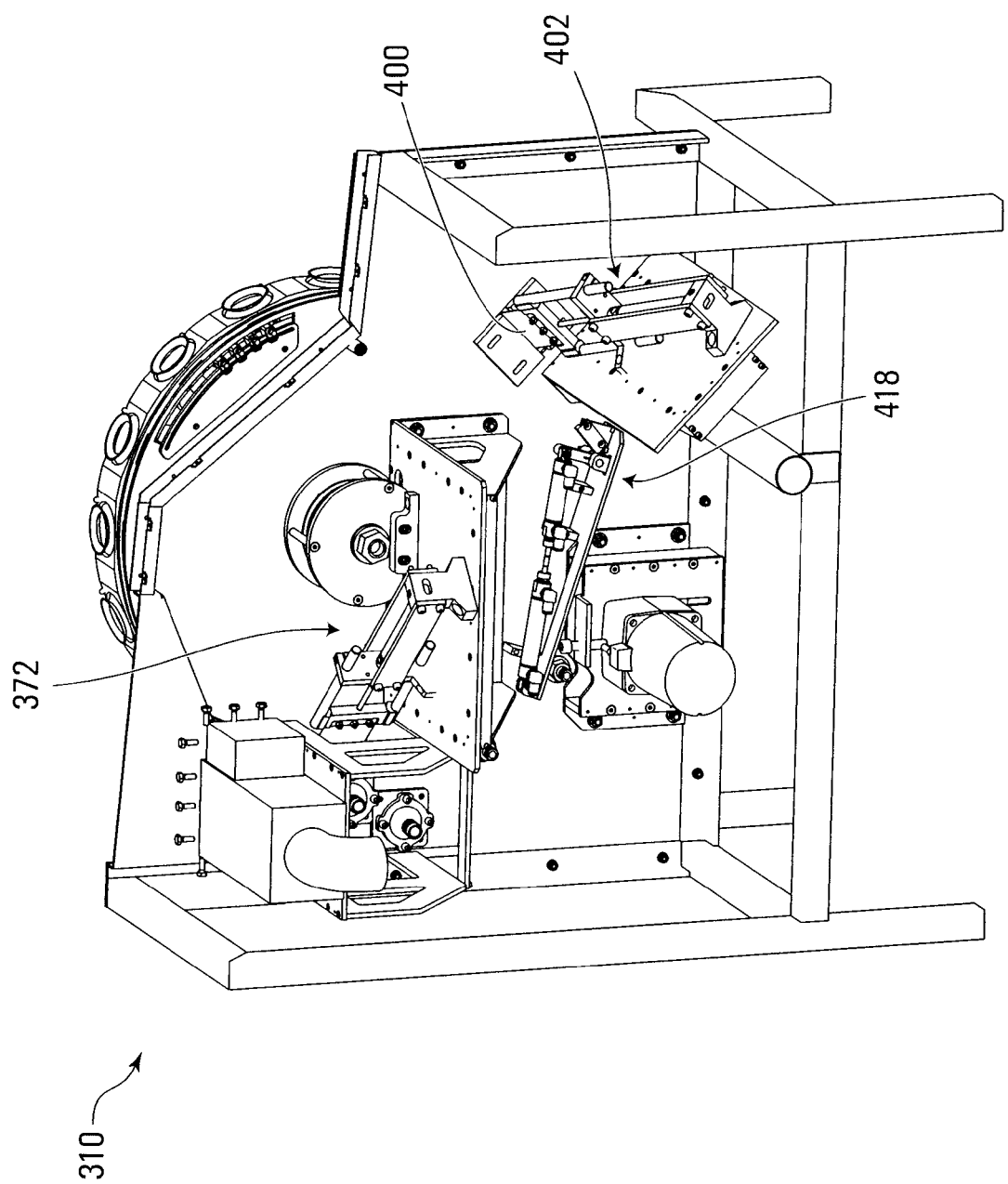
Figure 50:
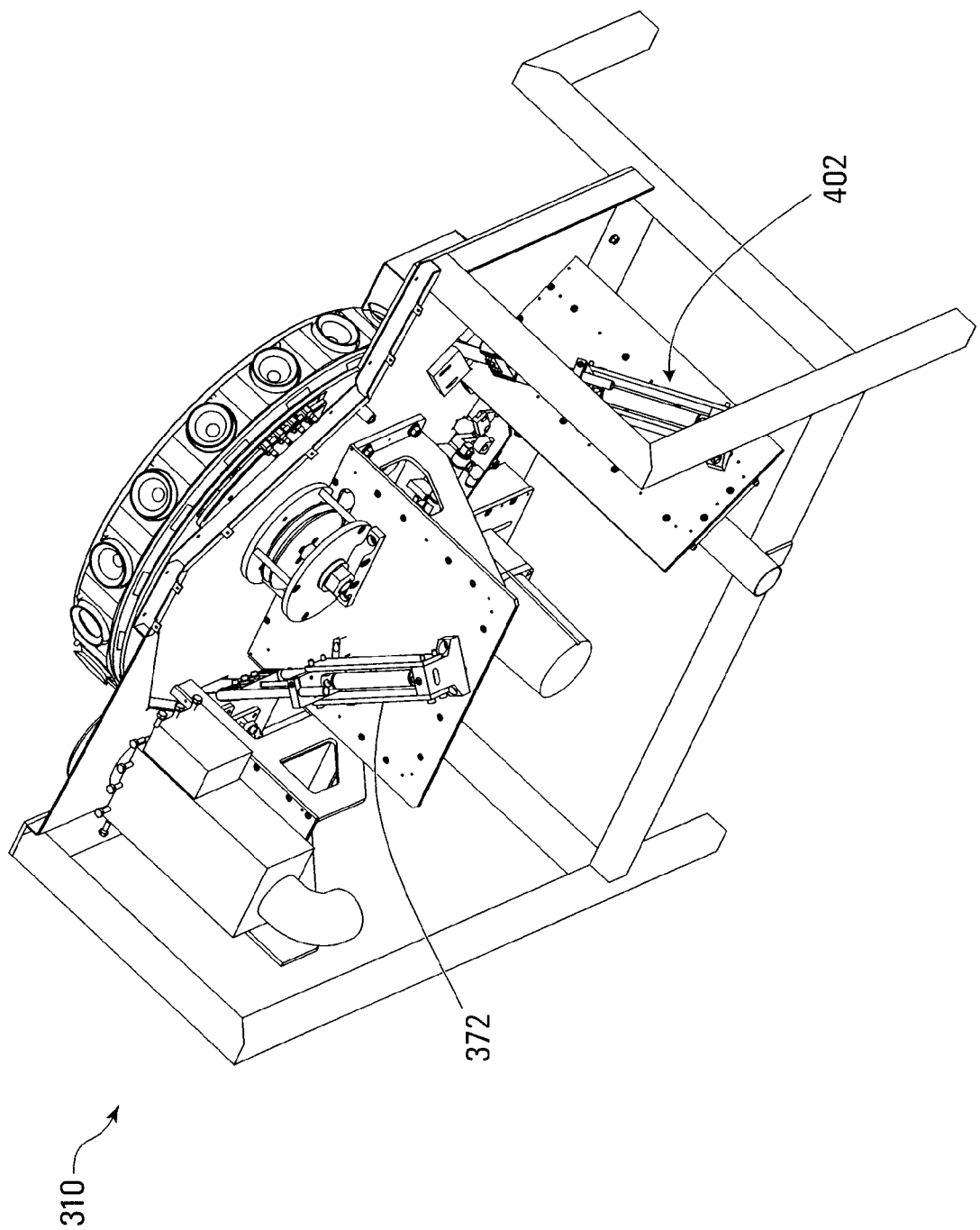
Figure 51:
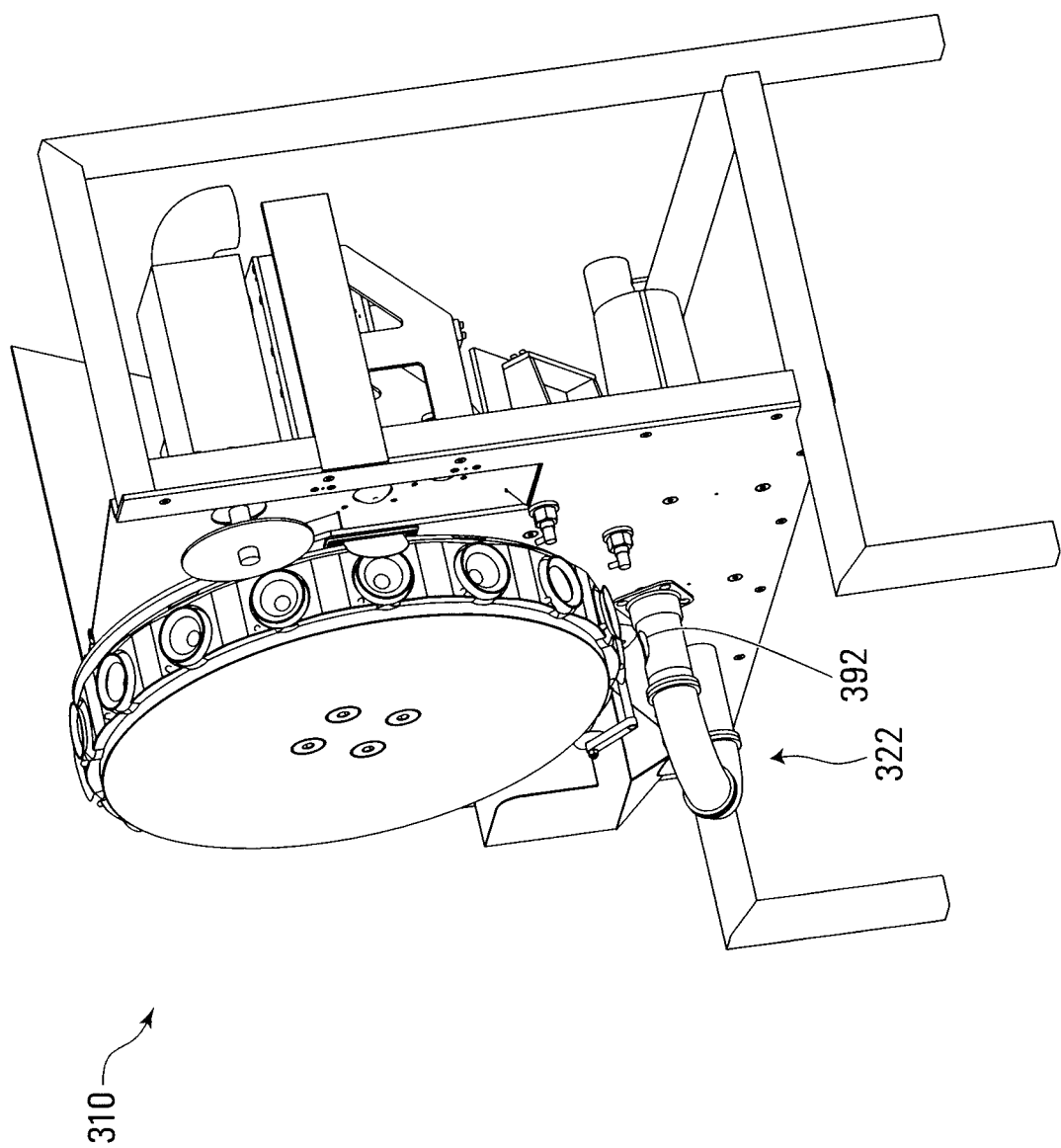
Figure 52:
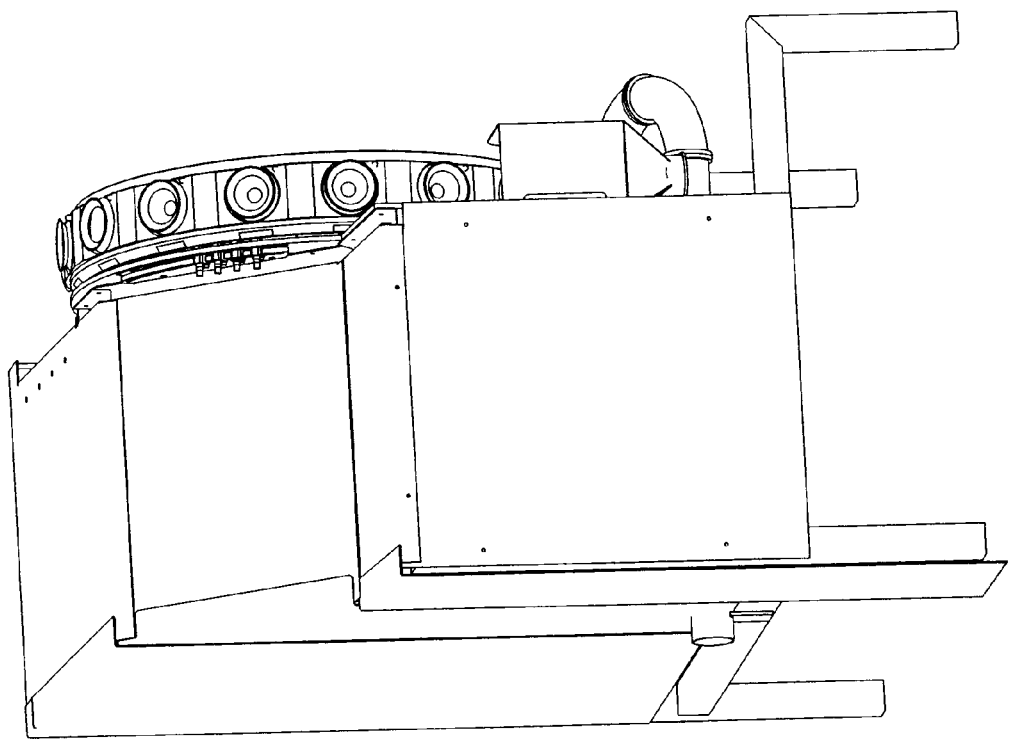

In one embodiment, the driving and sensing arrangement 418 includes two cylinders. One cylinder controls driving of the shaft 416, and thus movement of the wheel 412 toward and away from the holder arrangement 312. The other cylinder has a reed switch, which will activate if the driving cylinder is not able to complete its full cycle movement because of something in front of the wheel in its path of travel toward the holder arrangement 312. Two cylinders are shown in FIGS. 48 and 49. Functionally, it does not matter in which order the cylinders are arranged. One acts as an air spring or sensor and the other acts as a driving cylinder. In one embodiment, the right-hand (shorter) cylinder in FIGS. 48 and 49 is used as the driver and the left-hand (longer) cylinder is used as the spring. This driving and sensing can be timed with operations of other stations in one embodiment, or by a more complex controller such as the controller described below.

If the wheel 412 is impeded in its motion toward the holder arrangement 312 by a shell in a holder, then it will exert a force on the shaft 416 through the link 414, and this will be sensed by the driving and sensing arrangement 418, illustratively by the second cylinder and reed switch described above. In the absence of a shell in a holder, the wheel 412 completes its path of travel toward the holder arrangement 312, and there would be no back pressure and thus no shell would be sensed. The cutting blade 400 at the second muscle cut station 324 would then not be fired for that holder, to avoid damaging the cutting blade and/or the holder arrangement 312.

In some cases, the non-held shell might not be detached from the held shell in a first processing cycle. In order to avoid firing the cutting blade 400 at the second muscle cut station 324 when the non-held shell is still in place, a sense point of the driving and sensing arrangement 418 could be set to sense a held shell only if the wheel 412 completes at least a minimum distance of travel. This avoids triggering the second muscle cut if the non-held shell has not been detached.

Figure 53:
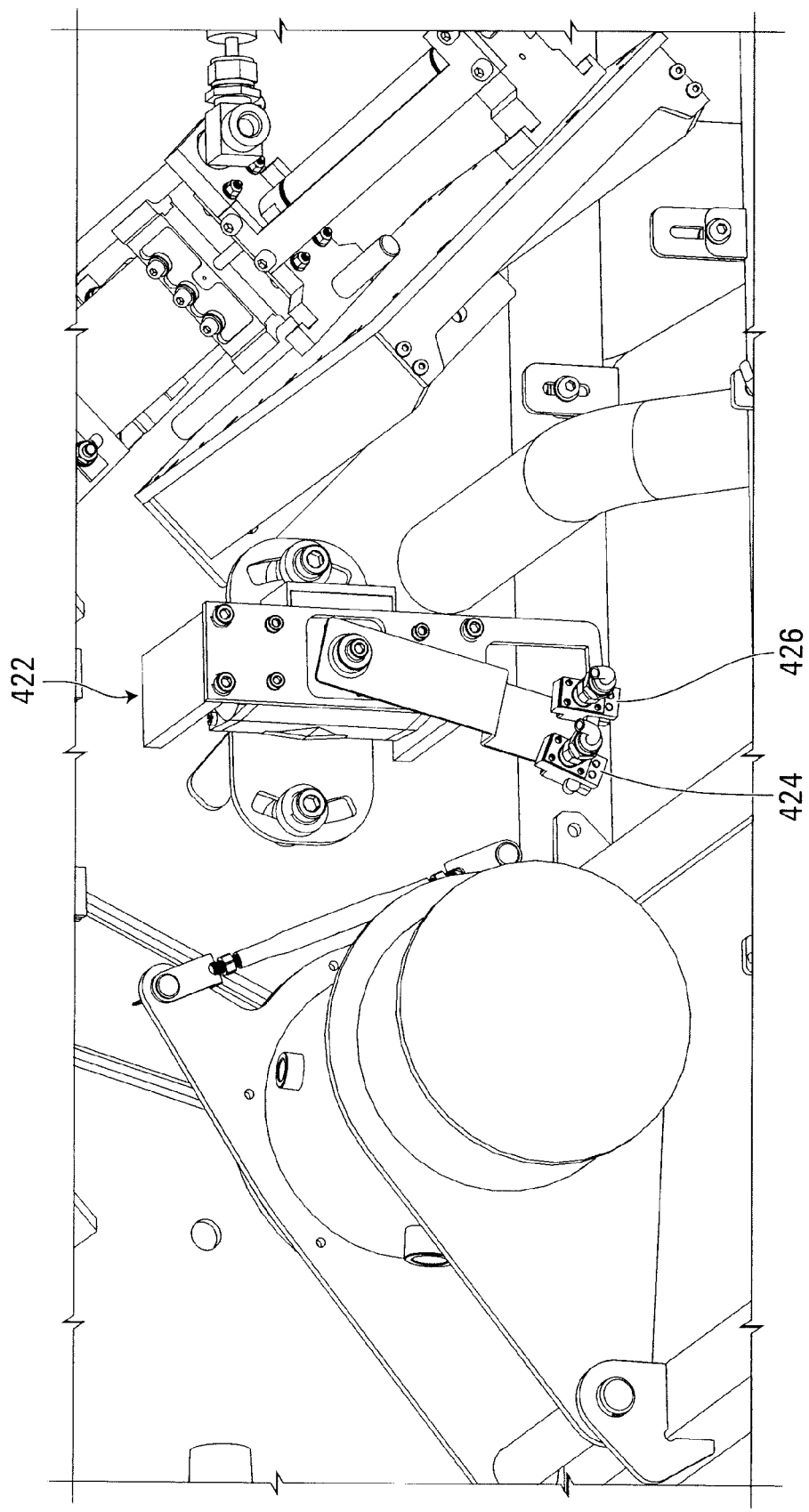
FIG. 53 shows an example detector driving and sensing arrangement.

Another embodiment of a detector driving and sensing arrangement is shown in FIG. 53. The arrangement 418 described above includes two pistons. The arrangement 422 in FIG. 53 could be coupled to the same type of detector as the arrangement 418, including a wheel 412, a link 414, and a shaft 416, but uses a pneumatic rotary device to turn the shaft 416. The presence of a shell in a holder will alter the final angular position of the wheel 412 and thus the shaft 416 when the pneumatic device rotates, and will trigger the cutting blade at the second muscle cut station 324. Angular position is detected by two proximity sensors 424, 426 in the example shown.

At the second muscle cut station 324, the cutting blade 400 and its air cylinder and guide arrangement 402 are aligned differently than in the embodiments described above. The air cylinder and guide arrangement 402 are located behind a bulkhead which separates the holder arrangement 312 and other components of the apparatus 310, and a collection trough 404 which would be below the second cutting blade 400 in its extended position collects each adductor muscle when the second muscle cut is complete.

The example apparatus 310 may otherwise appear to be structurally similar to other embodiments. FIG. 48, however, illustrates proximity sensors 420, which are fastened to the frame of the machine 310 and sense metal slugs or plates 421 (FIG. 47) on the holder arrangement 312, which can be detected and used in various control operations. The proximity sensors 420 slide along the adjustment slot 423 to allow for fine tuning of trigger points on the machine 310 in the example shown. The metal plates 421 are fastened around the perimeter of holder arrangement 312. The sensors could be eddy current-based sensors, for example. In some embodiments, the slugs or plates 421 enable sensors to sense both leading and trailing edges and to control operations of the apparatus 310 accordingly. A sensing slug or plate as shown at 421, or a set of slugs or plates, could be provided for each holder.

In some embodiments a hardwired control system is provided. Other types of control system, such as a microprocessor Programmable Logic Controller (PLC) based system, are also contemplated.

A microprocessor PLC based control system could enable enhanced control of various aspects of a processing apparatus. For example, a delay start timer and an on timer could be provided for each station. This would allow each station to be finely tuned for the best cuts and operation possible, instead of having to locate each station at specific intervals around the holder arrangement 312 and operate each station at the same time based on a presumption that a scallop is in the proper position at each station for processing.

An operator interface could provide an operator or maintenance personnel with a "window" into the PLC. Personnel might have access to view and change start timers and/or on timers for each station. Such information as run time on the motor at the shell cut station 314, run time on the main drive motor for the holder assembly 312, and cycle times on each knife assembly could be displayed in an operator interface. Alarms could also or instead be provided to an operator, to alert the operator to a blockage in an evisceration system when vacuum pressure is below or above a normal operating range, for example.

Figure 54:
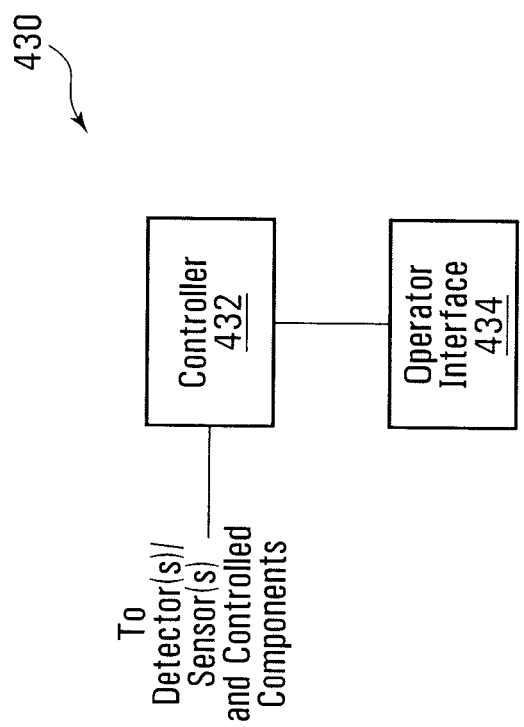
FIG. 54 is a block diagram of a control system.

FIG. 54 is a block diagram of a control system 430 which includes an operator interface 434 operatively coupled to a controller 432. The operator interface 434 could include any of various input/output devices to accept inputs from and provide outputs to an operator. Although represented as a direct connection in FIG. 54, the controller 432 could actually be located remotely from the operator interface 434. The operator interface 434 could include both local components, to display alerts and/or other information to an operator of an apparatus, and remote components at a remote or central monitoring location, for example.

In some embodiments, a proximity sensor is provided at each station to sense the slugs or plates 420, to allow each timing cycle to be tuned to an exact start time at each station. These sensors, or additional sensors, could also be used to generate a tachometer to display machine RPM and/or to detect the direction of rotation of the holder arrangement 312. This detection of rotation direction could be used to enable triggering of the stations in a forward rotation direction only.

On each knife assembly at the stations 316, 324 and in the driving and sensing arrangement 418 for the detector 410, reed switches are installed on the air cylinders in some embodiments. This allows a control system to monitor the fully extended position of each cylinder. When fully extended, the control system returns the cylinder to its home position. The addition of these reed switches increases the speed of each station by allowing the cylinders to return to their home positions on a sensed condition rather than after a certain period of time.

Another possible variation in control is the addition of controls to separate the air blasts at the stations 318, 320. This allows the air blasts to be fired at different times and/or to remain on for different periods of time.

In some embodiments, different air pressures can be provided at each station that uses compressed air. This can be accomplished by using flow regulators on each solenoid valve for each station. This enables each station to be controlled to use only the amount of force required for a task at that station, and can also provide flexibility in operation and allow for the proper air pressure adjustments on cylinders to increase the number of machine cycles before cylinder failures.

Figure 6:
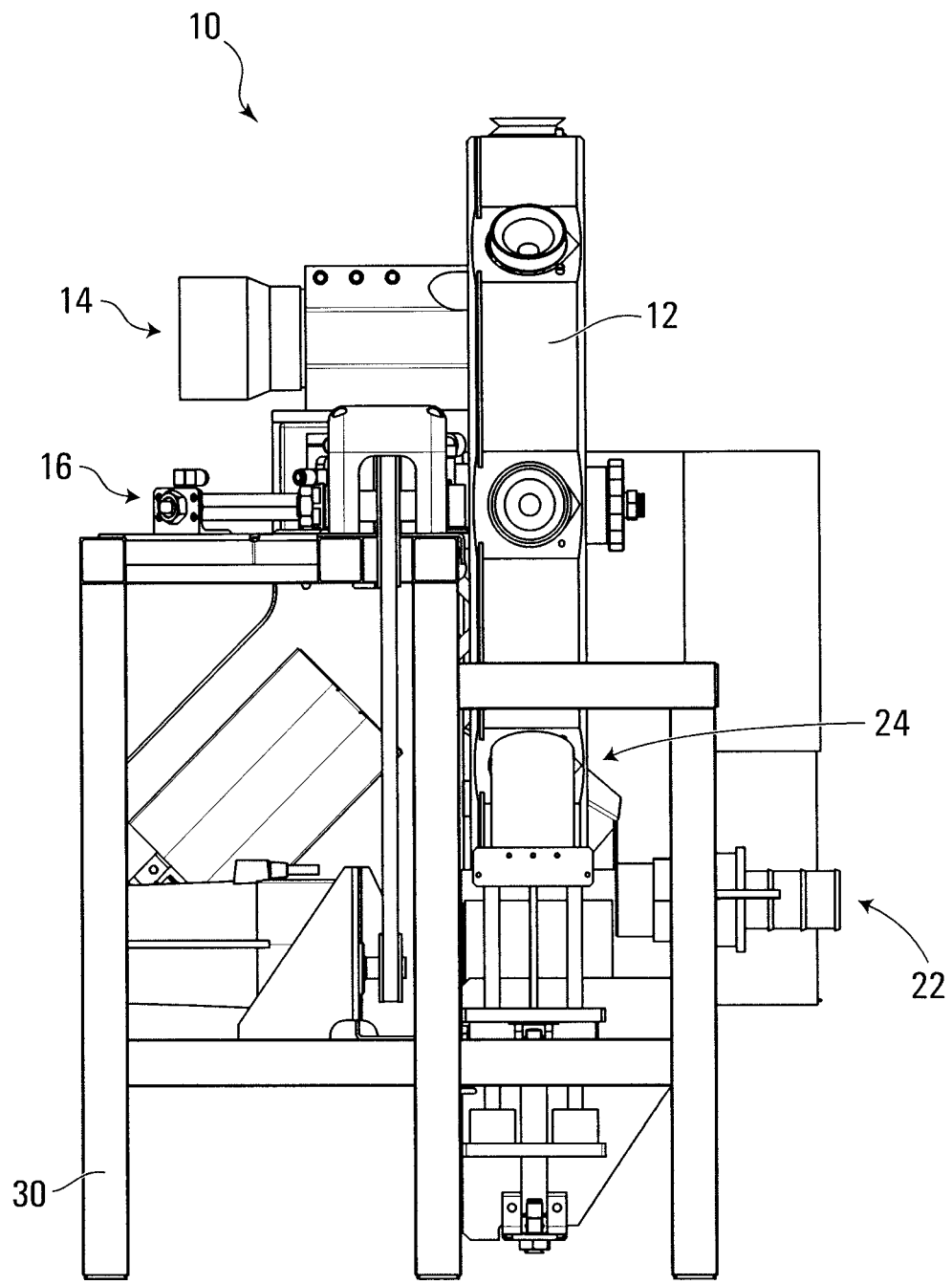

Considering a processing machine as a whole, some further variations could include, for example:

clearing the space under the holder arrangement to avoid collection of processing by-products, which can affect operation of the machine;

providing a bulkhead between wet and dry sides of the machine—with reference to FIG. 6, for example, the wet side would be the front or wheel 12 side, and the dry side would be toward the rear, where the motor and belt drive are located;

using a sealed motor mount to contain the motor drive for the holder arrangement (as shown in to the left of the driving and sensing arrangement 422 in FIG. 53—such a sealed mount could be pressurized with air so as to minimize the motor's exposure to the harsh environment, in which case belt tension could be adjusted by pivoting the entire sealed about a pin welded to the machine frame for instance;

using a bent stainless plate at the second muscle cut station, instead of a catch tube or other arrangement, to catch larger adductor muscles which tend not to travel as far from the cutting blade after the second muscle cut;

opening up areas of friction on the meat knife trigger assembly or detector 110 (FIGS. 22 to 24)—the objective is to reduce friction in the trigger assembly. A traditional simple bearing can get loaded up with friction-creating material (e.g., seawater, scallop shell, pieces of viscera, etc.). Maintaining tight tolerances on the outside of the fits for the shaft 116, but opening up an interior cavity inside the outer seal on the housing 118 for the trigger unit shaft, for example, reduces the areas where friction can occur against the shaft;

providing the second cutting blade assembly as an identical assembly to the first cutting blade assembly for interchangeability—identical assemblies for the cutting blades at the first muscle cut and shell detach station and the second muscle cut station reduces differing part requirements, and enhances modularity of design.

providing water flows on both sides of shell cutting blade for dust control;

routing electrical, water, air, and/or suction supplies to avoid interference with an operator;

providing a guard/guide structure to contain travel of shells when detached.

Further variations may be or become apparent to a skilled person.

We claim:

1. Apparatus comprising:
   a holder to hold a bivalve mollusc by a first shell, the mollusc having a pair of shells, including the first shell and a second shell, and an adductor muscle attached to the shells;
   a cutting blade, movable from a first position out of contact with the mollusc to a second position in which at least a portion of the cutting blade is between the shells, to cut the adductor muscle from the second shell;
   a shell detach mechanism to detach the second shell from the first shell; and
   a controller to control movement of the cutting blade and operation of the shell detach mechanism, the controller causing the cutting blade to remain in its second position, protecting the adductor muscle that has been cut from the second shell against damage by the shell detach mechanism.

2. The apparatus of claim 1, the shell detach mechanism comprising:
   a striking element, movable from a first position out of contact with the mollusc to a second position, to strike an outside surface of the second shell and detach the second shell from the first shell.

3. The apparatus of claim 2, wherein the shells are further connected at a hinge, the striking element striking the second shell in an oblique direction relative to a longitudinal axis of the hinge as the striking element is moved from its first position to its second position.

4. The apparatus of claim 2, wherein the striking element contacts a surface of the cutting blade as the striking element is moved from its first position to its second position.

5. The apparatus of claim 1, the shell detach mechanism comprising:
   a water nozzle located relative to the cutting blade to direct a water stream toward the second shell.

6. The apparatus of claim 5, the shell detach mechanism further comprising:
   a further water nozzle located relative to the cutting blade and the water nozzle to direct a further water stream toward an expected position of the second shell if not detached from the first shell by the water stream.

7. The apparatus of claim 5, wherein the cutting blade remains in its second position during contact between the water stream and the second shell.

8. The apparatus of claim 1, wherein the holder comprises a suction grip to hold the first shell.

9. The apparatus of claim 8, further comprising:
   a venturi arrangement coupled to the suction grip.

10. The apparatus of claim 1, wherein the cutting blade comprises a flexible cutting blade.

11. The apparatus of claim 1, wherein the portion of the cutting blade contacts and follows an inside surface of the second shell as the cutting blade is moved from its first position to its second position.

12. The apparatus of claim 11, wherein the cutting blade comprises a flared edge.

13. The apparatus of claim 11, wherein the portion of the cutting blade is inserted, through an opening cut into one or both of the shells, into contact with the inside surface of the second shell as the cutting blade is moved from its first position to its second position.

14. The apparatus of claim 1, wherein the holder is movable from a first position, in which the mollusc is located relative to the cutting blade and the shell detach mechanism to have the adductor muscle cut from the second shell by the cutting blade and the second shell detached from the first shell by the shell detach mechanism, to a second position away from the cutting blade and the shell detach mechanism, after the cutting blade is returned to its first position.

15. The apparatus of claim 14, wherein the controller comprises a metal plate and a proximity sensor, the metal plate and the sensor being located relative to the holder such that the sensor is actuated when the holder is in its first position.

16. Apparatus comprising:
    a holder to hold a bivalve mollusc from which one shell has been removed, the mollusc having a remaining shell to be held by the holder and an adductor muscle and viscera attached to the remaining shell;
    an air outlet located relative to the holder to direct an air stream toward the viscera;
    an air supply, coupled to the air outlet, to supply a blast of air toward the viscera through the outlet; and
    a vacuum intake to pull the viscera from the remaining shell, the vacuum intake being located relative to the holder to pull the viscera from the remaining shell initially in a first direction and subsequently in a second different direction,
    the holder holding the mollusc in an inverted position above the vacuum intake.

17. The apparatus of claim 16, wherein the holder comprises a suction grip to hold the remaining shell.

18. The apparatus of claim 17, further comprising:
    a venturi arrangement coupled to the suction grip.

19. The apparatus of claim 18, further comprising:
    a source of pressurized air,
    wherein the venturi arrangement and the air supply are coupled to the source.

20. The apparatus of claim 16, wherein the air outlet is located relative to the holder to direct the air stream toward the viscera by directing the air stream onto an inside surface of the remaining shell.

21. The apparatus of claim 16, wherein the holder is movable from a first position, in which the mollusc is located proximate the air outlet, to a second position away from the air outlet and toward the vacuum intake, after the air blast.

22. The apparatus of claim 21, further comprising:
    a controller to control the air supply, the controller comprising a metal plate and a proximity sensor, the metal plate and the sensor being located relative to the holder such that the sensor is actuated when the holder is in its first position.

23. The apparatus of claim 16, further comprising:
a vacuum tube coupled to a vacuum source,
the vacuum intake being formed as an opening in a side wall of the vacuum tube, the first direction being through the opening, the second direction being along a longitudinal direction of the vacuum tube.

24. The apparatus of claim 23, wherein a position of the vacuum intake relative to the holder is adjustable.

25. The apparatus of claim 23, further comprising:
a standpipe coupled to the vacuum intake to receive the viscera that is pulled from the remaining shell; and
a fluid line coupled to the standpipe to receive the viscera from the standpipe into a fluid flow in the fluid line.

26. An apparatus comprising:
a plurality of holders to hold bivalve molluscs by a first shell, each mollusc when fed onto a holder having a pair of shells, including the first shell and a second shell, and an adductor muscle attached to the shells; and
a driving arrangement to move the plurality of holders between processing stations for processing the molluscs, the processing stations comprising:
a shell cut station to cut an opening into one or both of the shells;
a first muscle cut and shell detach station comprising:
a cutting blade, movable from a first position, out of contact with the mollusc in one of the holders that has been moved to the first muscle cut and shell detach station, to a second position in which at least a portion of the cutting blade is between the shells of the mollusc, to cut the adductor muscle from the second shell of the mollusc;
a shell detach mechanism to detach the second shell from the first shell of the mollusc; and
a controller to control movement of the cutting blade and operation of the shell detach mechanism, the controller causing the cutting blade to remain in its second position, protecting the adductor muscle that has been cut from the second shell of the mollusc against damage by the shell detach mechanism;
an air blast station and a vacuum station comprising the apparatus of claim 16; and
a second muscle cut station to cut the adductor muscle from the first shell.

27. The apparatus of claim 26, further comprising:
a second air blast station between the first muscle cut and shell detach station and the vacuum station.

28. The apparatus of claim 26, further comprising:
a control arrangement to control at least the first muscle cut and shell detach station, the air blast station, and the second muscle cut station.

29. The apparatus of claim 28, wherein the control arrangement comprises a plurality of metal plates located relative to the holders and a plurality of proximity sensors located relative to each of the first muscle cut and shell detach station, the air blast station, and the second muscle cut station such that the sensors are actuated when the holders are in respective positions for processing of molluscs by the first muscle cut and shell detach station, the air blast station, and the second muscle cut station.

30. The apparatus of claim 28,
the holders and the processing stations being located relative to each other such that the holders hold molluscs in respective positions for substantially simultaneous processing by the processing stations,
the control arrangement comprising a plurality of metal plates and a proximity sensor,
the plurality of metal plates being located relative to the holders and to the sensor such that a respective one of the plates actuates the sensor when the holders and molluscs are in the respective positions for substantially simultaneous processing by the processing stations.

31. The apparatus of claim 26, further comprising:
a detector at the second muscle cut station to detect presence of a mollusc.

32. The apparatus of claim 26, wherein each holder of the plurality of holders comprises a suction grip to hold the first shell and a venturi arrangement coupled to the suction grip, the apparatus further comprising:
a shell release station to alter air flow in the venturi arrangement and release the first shell from each suction grip after the adductor muscle is cut from the first shell.

33. The apparatus of claim 32, further comprising:
a source of compressed air coupled to the venturi arrangement of each holder and to at least one of the air blast station and the vacuum station.

34. The apparatus of claim 32, further comprising:
a vacuum source coupled to the vacuum station and to at least one of the air blast station and the venturi arrangement of each holder.

35. A method comprising:
feeding bivalve molluscs onto a plurality of holders that hold the molluscs by a first shell, each mollusc when fed onto a holder having a pair of shells, including the first shell and a second shell, and an adductor muscle attached to the shells;
moving the plurality of holders between processing stations; and
processing the molluscs at the processing stations, the processing stations comprising:
a shell cut station to cut an opening into one or both of the shells;
a first muscle cut and shell detach station comprising:
a cutting blade, movable from a first position, out of contact with the mollusc in one of the holders that has been moved to the first muscle cut and shell detach station, to a second position in which at least a portion of the cutting blade is between the shells of the mollusc, to cut the adductor muscle from the second shell of the mollusc;
a shell detach mechanism to detach the second shell from the first shell of the mollusc; and
a controller to control movement of the cutting blade and operation of the shell detach mechanism, the controller causing the cutting blade to remain in its second position, protecting the adductor muscle that has been cut from the second shell of the mollusc against damage by the shell detach mechanism;
an air blast station and a vacuum station comprising the apparatus of claim 16; and
a second muscle cut station to cut the adductor muscle from the first shell.

36. A method comprising:
providing a plurality of holders to hold bivalve molluscs by a first shell, each mollusc when fed onto a holder having a pair of shells, including the first shell and a second shell, and an adductor muscle attached to the shells;
providing processing stations for processing the molluscs, the processing stations comprising:

a shell cut station to cut an opening into one or both of the shells;

a first muscle cut and shell detach station comprising;

a cutting blade, movable from a first position, out of contact with the mollusc in one of the holders that has been moved to the first muscle cut and shell detach station, to a second position in which at least a portion of the cutting blade is between the shells of the mollusc, to cut the adductor muscle from the second shell of the mollusc;

a shell detach mechanism to detach the second shell from the first shell of the mollusc; and a controller to control movement of the cutting blade and operation of the shell detach mechanism, the controller causing the cutting blade to remain in its second position, protecting the adductor muscle that has been cut from the second shell of the mollusc against damage by the shell detach mechanism;

an air blast station and a vacuum station comprising the apparatus of claim 16; and a second muscle cut station to cut the adductor muscle from the first shell; and providing a driving arrangement to move the plurality of holders between the processing stations.

37. The method of claim 36, further comprising:
providing a second air blast station between the first muscle cut and shell detach station and the vacuum station.

38. The method of claim 36, further comprising:
providing a control arrangement to control at least the first muscle cut and shell detach station, the air blast station, and the second muscle cut station.

39. The method of claim 36, further comprising:
providing a detector at the second muscle cut station to detect presence of a mollusc.

40. The method of claim 36, wherein each holder of the plurality of holders comprises a suction grip to hold the first shell and a venturi arrangement coupled to the suction grip, the method further comprising:
providing a shell release station to alter air flow in the venturi arrangement and release the first shell from each suction grip after the adductor muscle is cut from the first shell.

41. The method of claim 40, further comprising:
coupling the venturi arrangement of each holder and at least one of the air blast station and the vacuum station to a source of compressed air.

42. The method of claim 40, further comprising:
coupling the vacuum station and at least one of the air blast station and the venturi arrangement of each holder to a vacuum source.

\* \* \* \* \*